(12) United States Patent  
Stojanovic et al.

(10) Patent No.: US 9,000,803 B2
(45) Date of Patent: *Apr. 7, 2015

(54) HIGH SPEED SIGNALING SYSTEM WITH ADAPTIVE TRANSMIT PRE-EMPHASIS

(71) Applicant: Rambus Inc., Sunnyvale, CA (US)

(72) Inventors: Vladimir M. Stojanovic, Lexington, MA (US); Andrew C. Ho, Atherton, CA (US); Anthony Bessios, Fremont, CA (US); Fred F. Chen, Boston, MA (US); Elad Alon, El Cerrito, CA (US); Mark A. Horowitz, Menlo Park, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,156

(22) Filed: Jun. 7, 2013

(65) Prior Publication Data

US 2013/0272446 A1 Oct. 17, 2013

Related U.S. Application Data

(60) Continuation of application No. 13/476,247, filed on May 21, 2012, now Pat. No. 8,564,328, which is a continuation of application No. 12/693,285, filed on Jan. 25, 2010, now Pat. No. 8,183,887, which is a (Continued)

(51) Int. Cl.
*H03K 19/0175* (2006.01)
*H04B 1/04* (2006.01)

(Continued)

(52) U.S. Cl.
CPC ............ *H04B 1/0475* (2013.01); *H04L 25/028* (2013.01); *H04L 25/03343* (2013.01);

(Continued)

(58) Field of Classification Search
CPC .................. H03K 19/00346; H03K 19/00369
USPC ...................... 326/21, 26, 27, 82–87
See application file for complete search history.

(56) References Cited

U.S. PATENT DOCUMENTS 3,534,273 A 10/1970 Thomas
3,582,879 A 6/1971 Sullivan
(Continued)

FOREIGN PATENT DOCUMENTS

EP 0180066 A2 5/1986
EP 0365257 A2 4/1990
(Continued)

OTHER PUBLICATIONS 802.3i Standard, "Part 3: Carrier sense multiple access with collision detection (CSMA/CD) access method and physical layer specifications," 1996 Edition, Archive IEEE Standard, International Standard ISO/IEC 8802-3:1996. 544 pages.

(Continued)

*Primary Examiner* — Don Le
(74) *Attorney, Agent, or Firm* — Lance Kreisman; Peninsula Patent Group

(57) ABSTRACT

A high-speed signaling system with adaptive transmit pre-emphasis. A transmit circuit has a plurality of output drivers to output a first signal onto a signal path. A receive circuit is coupled to receive the first signal via the signal path and configured to generate an indication of whether the first signal exceeds a threshold level. A first threshold control circuit is coupled to receive the indication from the receive circuit and configured to adjust the threshold level according to whether the first signal exceeds the threshold level. A drive strength control circuit is coupled to receive the indication from the receive circuit and configured to adjust a drive strength of at least one output driver of the plurality of output drivers according to whether the first signal exceeds the threshold level.

25 Claims, 19 Drawing Sheets

Related U.S. Application Data continuation of application No. 12/206,629, filed on Sep. 8, 2008, now Pat. No. 7,656,981, which is a continuation of application No. 11/538,333, filed on Oct. 3, 2006, now Pat. No. 7,423,454, which is a division of application No. 10/740,087, filed on Dec. 17, 2003, now Pat. No. 7,126,378.

(51) Int. Cl.
| | | |
|---|---|---|
| *H04L 25/02* | (2006.01) | |
| *H04L 25/03* | (2006.01) | |
| *H04L 25/06* | (2006.01) | |
| *H04L 25/49* | (2006.01) | |

(52) U.S. Cl.
CPC ........ *H04L25/03885* (2013.01); *H04L 25/061* (2013.01); *H04L 25/4917* (2013.01); *H04B 1/04* (2013.01); *H04L 25/0282* (2013.01); *H04L 2025/03363* (2013.01); *H04L 2025/03802* (2013.01)

(56) References Cited

U.S. PATENT DOCUMENTS

| | | |
|---|---|---|
| 3,775,688 A | 11/1973 | Hinoshita et al. |
| 3,980,826 A | 9/1976 | Widmer |
| 3,992,616 A | 11/1976 | Acker |
| 4,584,559 A | 4/1986 | Penney |
| 4,615,038 A | 9/1986 | Lim et al. |
| 4,639,681 A | 1/1987 | Hasegawa |
| 4,709,376 A | 11/1987 | Kage |
| 4,719,369 A | 1/1988 | Asano et al. |
| 4,730,343 A | 3/1988 | Kanemasa et al. |
| 4,777,612 A | 10/1988 | Tomimitsu |
| 4,970,609 A | 11/1990 | Cunningham et al. |
| 4,992,677 A | 2/1991 | Ishibashi et al. |
| 5,008,903 A | 4/1991 | Betts et al. |
| 5,014,226 A | 5/1991 | Horstmann et al. |
| 5,036,525 A | 7/1991 | Wong |
| 5,122,690 A | 6/1992 | Bianchi |
| 5,122,890 A | 6/1992 | Makow |
| 5,191,462 A | 3/1993 | Gitlin et al. |
| 5,194,462 A | 3/1993 | Hirasaka et al. |
| 5,254,883 A | 10/1993 | Horowitz et al. |
| 5,268,927 A | 12/1993 | Dimos et al. |
| 5,268,930 A | 12/1993 | Sendyk |
| 5,402,378 A | 3/1995 | Min |
| 5,402,445 A | 3/1995 | Matsuura |
| 5,425,033 A | 6/1995 | Jessop et al. |
| 5,444,697 A | 8/1995 | Leung et al. |
| 5,448,200 A | 9/1995 | Fernandez et al. |
| 5,455,844 A | 10/1995 | Ishikawa |
| 5,459,762 A | 10/1995 | Wang et al. |
| 5,465,093 A | 11/1995 | Kusumoto et al. |
| 5,490,169 A | 2/1996 | Blackwell |
| 5,546,424 A | 8/1996 | Miyake |
| 5,596,285 A | 1/1997 | Marbot et al. |
| 5,659,581 A | 8/1997 | Betts et al. |
| 5,668,830 A | 9/1997 | Georgiou |
| 5,675,394 A | 10/1997 | Choi |
| 5,675,588 A | 10/1997 | Maruyama et al. |
| 5,742,798 A | 4/1998 | Goldrian |
| 5,757,297 A | 5/1998 | Ferraiolo |
| 5,757,857 A | 5/1998 | Buchwald |
| 5,778,217 A | 7/1998 | Kao |
| 5,802,105 A | 9/1998 | Tiedemann, Jr. |
| 5,852,630 A | 12/1998 | Langberg et al. |
| 5,875,177 A | 2/1999 | Uriu et al. |
| 5,877,647 A | 3/1999 | Vajapey et al. |
| 5,881,108 A | 3/1999 | Herzberg et al. |
| 5,896,067 A | 4/1999 | Williams |
| 5,898,321 A | 4/1999 | Ilkbahar et al. |
| 5,917,340 A | 6/1999 | Manohar et al. |
| 5,940,442 A | 8/1999 | Wong et al. |
| 6,108,801 A | 8/2000 | Malhotra et al. |
| 6,118,824 A | 9/2000 | Smith et al. |
| 6,122,757 A | 9/2000 | Kelley |
| 6,212,144 B1 | 4/2001 | Asano |
| 6,262,591 B1 | 7/2001 | Hui |
| 6,266,379 B1 | 7/2001 | Dally |
| 6,288,563 B1 | 9/2001 | Muljono et al. |
| 6,304,071 B1 | 10/2001 | Popplewell et al. |
| 6,377,076 B1 | 4/2002 | Gauthier |
| 6,380,758 B1 | 4/2002 | Hsu et al. |
| 6,417,700 B1 | 7/2002 | Hirata et al. |
| 6,448,806 B1 | 9/2002 | Roth |
| 6,496,911 B1 | 12/2002 | Dixon et al. |
| 6,509,756 B1 | 1/2003 | Yu et al. |
| 6,541,966 B1 | 4/2003 | Keene |
| 6,541,996 B1 | 4/2003 | Rosefield et al. |
| 6,542,555 B2 | 4/2003 | Dally |
| 6,574,758 B1 | 6/2003 | Eccles |
| 6,587,917 B2 | 7/2003 | Simmons |
| 6,628,621 B1 | 9/2003 | Appleton |
| 6,707,325 B2 | 3/2004 | Taguchi et al. |
| 6,717,985 B1 | 4/2004 | Poon |
| 6,721,356 B1 | 4/2004 | Cole et al. |
| 6,724,329 B2 | 4/2004 | Casper |
| 6,760,389 B1 | 7/2004 | Mukherjee et al. |
| 6,760,574 B1 | 7/2004 | Lu et al. |
| 6,839,861 B2 | 1/2005 | Hoke et al. |
| 6,885,691 B1 | 4/2005 | Lyu |
| 6,897,712 B2 | 5/2005 | Ficken et al. |
| 6,928,107 B1 | 8/2005 | Olafsson et al. |
| 6,941,483 B2 | 9/2005 | Brown et al. |
| 6,970,681 B2 | 11/2005 | Darabi |
| 6,979,987 B2 | 12/2005 | Kernahan et al. |
| 7,016,445 B2 | 3/2006 | Bronfer et al. |
| 7,054,402 B2 | 5/2006 | Muellner |
| 7,092,472 B2 | 8/2006 | Stojanovic |
| 7,099,400 B2 | 8/2006 | Yang et al. |
| 7,099,404 B2 | 8/2006 | Dally |
| 7,200,180 B2 | 4/2007 | Verbin et al. |
| 7,281,079 B2 | 10/2007 | Bains et al. |
| 7,339,990 B2 | 3/2008 | Hidaka |
| 7,359,443 B2 | 4/2008 | Straussnigg |
| 7,397,848 B2 | 7/2008 | Stojanovic et al. |
| 7,526,046 B2 | 4/2009 | Dally |
| 7,564,920 B1 | 7/2009 | Dally |
| 7,580,474 B2 | 8/2009 | Dally |
| 7,602,857 B2 | 10/2009 | Dally |
| 7,602,858 B2 | 10/2009 | Dally |
| 7,639,736 B2 | 12/2009 | Farjad-rad |
| 7,706,464 B2 | 4/2010 | Dally |
| 7,715,494 B2 | 5/2010 | Dally |
| 8,238,467 B2 | 8/2012 | Dally |
| 8,238,470 B2 | 8/2012 | Dally |
| 8,243,847 B2 | 8/2012 | Dally |
| 8,254,491 B2 | 8/2012 | Dally |
| 8,259,841 B2 | 9/2012 | Dally |
| 8,311,147 B2 | 11/2012 | Dally |
| 2001/0026578 A1 | 10/2001 | Ando |
| 2001/0043649 A1 | 11/2001 | Farjad-Rad |
| 2002/0057101 A1 | 5/2002 | Tang et al. |
| 2002/0150184 A1 | 10/2002 | Hafeez et al. |
| 2002/0184564 A1 | 12/2002 | Muellner |
| 2003/0002602 A1 | 1/2003 | Kwon et al. |
| 2003/0016091 A1 | 1/2003 | Casper |
| 2003/0063664 A1 | 4/2003 | Bodenschatz |
| 2003/0070126 A1 | 4/2003 | Werner et al. |
| 2003/0084385 A1 | 5/2003 | Zerbe et al. |
| 2003/0093713 A1 | 5/2003 | Werner et al. |
| 2003/0108096 A1 | 6/2003 | Steinbach |
| 2003/0142740 A1 | 7/2003 | Haunstein et al. |
| 2003/0159094 A1 | 8/2003 | Smith et al. |
| 2003/0208707 A9 | 11/2003 | Zerbe et al. |
| 2004/0001567 A1 | 1/2004 | Wei |
| 2004/0022311 A1 | 2/2004 | Zerbe et al. |
| 2004/0071203 A1 | 4/2004 | Gorecki |
| 2004/0071204 A1 | 4/2004 | Gorecki |
| 2004/0071205 A1 | 4/2004 | Gorecki |
| 2004/0076192 A1 | 4/2004 | Zerbe et al. |
| 2004/0141567 A1 | 7/2004 | Yang et al. |

(56) References Cited

U.S. PATENT DOCUMENTS

| | | | |
|---|---|---|---|
| 2004/0203559 | A1 | 10/2004 | Stojanovic et al. |
| 2007/0046347 | A1 | 3/2007 | Lee |
| 2007/0047677 | A1 | 3/2007 | Son et al. |
| 2007/0280384 | A1 | 12/2007 | Hidaka |
| 2008/0212606 | A1* | 9/2008 | Batty .......................... 370/464 |

FOREIGN PATENT DOCUMENTS

| | | |
|---|---|---|
| EP | 1331779 A1 | 7/2003 |
| JP | 60-176324 | 10/1985 |
| JP | 2000-035831 A2 | 2/2000 |
| JP | 2000-332574 | 11/2000 |
| JP | 2004-242327 | 8/2004 |
| WO | WO-00/11830 A2 | 3/2000 |
| WO | WO-03/025599 | 3/2003 |
| WO | WO-03/032652 | 4/2003 |
| WO | WO-2004/008490 | 1/2004 |
| WO | WO-2004/093144 | 10/2004 |

OTHER PUBLICATIONS

Aboulnasr et al., "Characterization of a Symbol Rate Timing Recovery Technique for a 2B1Q Digital Receiver," IEEE Trans. on Communications, vol. 42, Nos. 2/3/4, pp. 1409-1414, Feb.-Apr. 1994.

Armstrong, Jean, "Symbol Synchronization Using Baud-Rate Sampling and Data-Sequence-Dependent Signal Processing," IEEE Trans. on Communications, vol. 39, No. 1, pp. 127-132, Jan. 1991.

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.

Dally et al., "Transmitter Equalization for 4-Gbps Signaling," IEEE Micro, vol. 17, No. 1, Jan./Feb. 1997, pp. 48-56. 9 pages.

Douglas, Scott C., "Fast Implementations of the Filtered-X LMS and LMS Algorithms for Multichannel Active Noise Control, " IEEE Transactions on Speech and Audio Proc., vol. 7, No. 4, Jul. 1999, pp. 454-465.

EP Communication re Extended European Search Report with mail date of Nov. 30, 2009 for EP 9165754.4. 10 pages.

EP Extended Search Report with mail date of Nov. 30, 2009 re EP Divisional Patent Application No. 09 165 754.4. 10 pages.

EP Office Action dated Jun. 6, 2013 in EP Application No. 09165754. 4. 7 pages.

EP Office Action with mail date of Mar. 22, 2010 re EP Application No. 09155838.7. 4 pages.

EP Official Communication dated Nov. 23, 2009, for Application No. 04 814 386.1-2415. 8 pages.

EP Response dated Apr. 8, 2010 to Official Communication dated Nov. 23, 2009 re EP Application No. 04814386.1-2415 . . . 26 Pages.

EP Search Report/Declaration and Abstract with mail date of Mar. 16, 2010 re EP Application No. 09155838.7. 4 Pages.

Harashima et al., "Matched-Transmission Technique for Channels With Intersymbol Interference," IEEE Transactions on Communications, vol. COM-20, No. 4, Aug. 1972, pp. 774-780. 7 pages.

Hoke, J. M. et al, Self-timed Interface for S/390 I/O Subsystem Interconnection, IBM J.Res. Develop., vol. 43, No. 5/6, Sep./Nov. 1999, pg. 829-846.

JP Argument and Amendment in Response dated Jun. 21, 2010 to the Office Action re JP Application No. 2006-545411 (no translation). 9 Pages.

JP Argument dated Sep. 15, 2010 for JP Patent Application No. 2006-509855 (no translation). 2 pages.

JP Office Action with mail date of Nov. 26, 2010 re JP Application No. 2006-545411. 8 Pages.

JP Office Action with mail date of Mar. 16, 2010 re Notice of Reasons for Rejection for JP Application No. 2006-509855 with translation. 4 Pages.

JP Office Action with mail date of Nov. 30, 2009 in JP Application No. 2006-545411. 6 pages.

PCI-SIG, "PCI Express Base Specification," Revision 1.0, Apr. 29, 2002. 416 pages.

JP Response dated Apr. 25, 2011 to the Office Action re JP Application No. 2006-545411 (no translation). 9 Pages.

Kasturia et al., "Techniques for High-Speed Implementation of Nonlinear Cancellation", IEEE Journal on Selected Areas in Communications, vol. 9, No. 5, Jun. 1991, pp. 711-717.

Martin et al., "8Gb/s Differential Simultaneous Bidirectional Link with 4 mV 9ps Waveform Capture Diagnostic Capability", ISSCC 2003/Session 4/Clock Recovery and Backplane Transceivers/Paper 4.5, 2003 IEEE International Solid State Circuits Conference.

Mueller et al., "Timing Recovery in Digital Synchronous Data Receivers," IEEE Trans. on Communications, vol. COM-24, No. 5, pp. 516-531, May 1976.

Muller et al., "IEEE 802 10GBASE-T Tutorial," Slide Presentation, Nov. 10, 2003, Albuquerque, NM. 56 pages.

Parhi, Keshab K., "High-Speed Architectures for Algorithms with Quantizer Loops", IEEE, 1990, pp. 2357-2360.

Parhi, Keshab K., "Pipelining in Algorithms with Quantizer Loops", IEEE Transactions on Circuits and Systems, vol. 38, No. 7, Jul. 1991, pp. 745-754.

Response to the Official Communication of Jul. 22, 2010, dated Aug. 12, 2010 (Includes both highlighted and New claims, as well as New Description pages) in EP Application No. 09165754.4-2415. 39 pages.

Response to the Official Communication of Mar. 22, 2010, dated Jul. 30, 2010, re EP Application No. 09155838.7-1525. 1 page.

Serial ATA Workgroup, "Serial ATA: High Speed Serialized AT Attachment," Revision 1.0a, Jan. 7, 2003. 311 pages.

Solarflare Communications, "10GBASE-T Tutorial," IEEE 802.3, Slide Presentation, Kauai, Hawaii, Nov. 11, 2002. 48 pages.

Stojanovic et al., "Transmit Pre-emphasis for High-Speed Time-Division-Multiplexed Serial-Link Transceiver," International Conference on Communications, New York, NY, May 2, 2002, pp. 1-6.

Stojanovic, Vladimir M., U.S. Appl. No. 12/403,340, filed Mar. 12, 2009 re Office Action mailed Nov. 13, 2009. 9 pages.

Stojanovic, Vladimir, U.S. Appl. No. 13/476,247, filed May 21, 2012, re Preliminary Amendment dated Aug. 1, 2012. 7 pages.

Stojanovic, Vladimir, U.S. Appl. No. 12/693,285, filed Jan. 25, 2010, Notice of Allowance and Fee(s) Due mailed Jan. 23, 2012. 8 pages.

Tomlinson, M., "New Automatic Equaliser Employing Modulo Arithmetic," Electronics Letters, Mar. 25, 1971, vol. 7, Nos. 5/6, pp. 138-139. 2 pages.

Wesel et al., "Achievable Rates for Tomlinson-Harashima Precoding," IEEE Transactions on Information Theory, vol. 44, No. 2, Mar. 1998, pp. 824-831. 8 pages.

Widmer et al., "Single-Chip 4 x 500-MBd CMOS Transceiver," IEEE Journal of Solid-State Circuits, vol. 31, No. 12, Dec. 1996, pp. 2004-2014. 11 pages.

Winters et al., "Adaptive Nonlinear Cancellation for High-Speed Fiber-Optic Systems", Journal of Lightwave Technology, vol. 10, No. 7, Jul. 1992, IEEE, pp. 971-977.

Yeh et al., "Adaptive Minimum Bit-Error Rate Equalization for Binary Signaling," IEEE Transactions on Communications, vol. 48, No. 7, Jul. 2000 pp. 1226-1235.

Zerbe, Jared et al., "Equalization and Clock Recovery for a 2.5-10-Gb/s 2-PAM/4-PAM Backplane Transceiver Cell." IEEE Journal of Solid-State Circuits, vol. 38, No. 12, Dec. 2003. 10 Pages.

EP Response dated Dec. 16, 2013 to Office Communication of Jun. 10, 2013 re EP Application No. 09165754.4, with markups and claims. 17 pages.

Ewen et al., "Single-Chip 1062Mbaud CMOS Transceiver for Serial Data Communication" ISSCC95/Session 2/Data Communications/ Paper WP 2.1 dated Feb. 15, 1995. 3 pages.

* cited by examiner

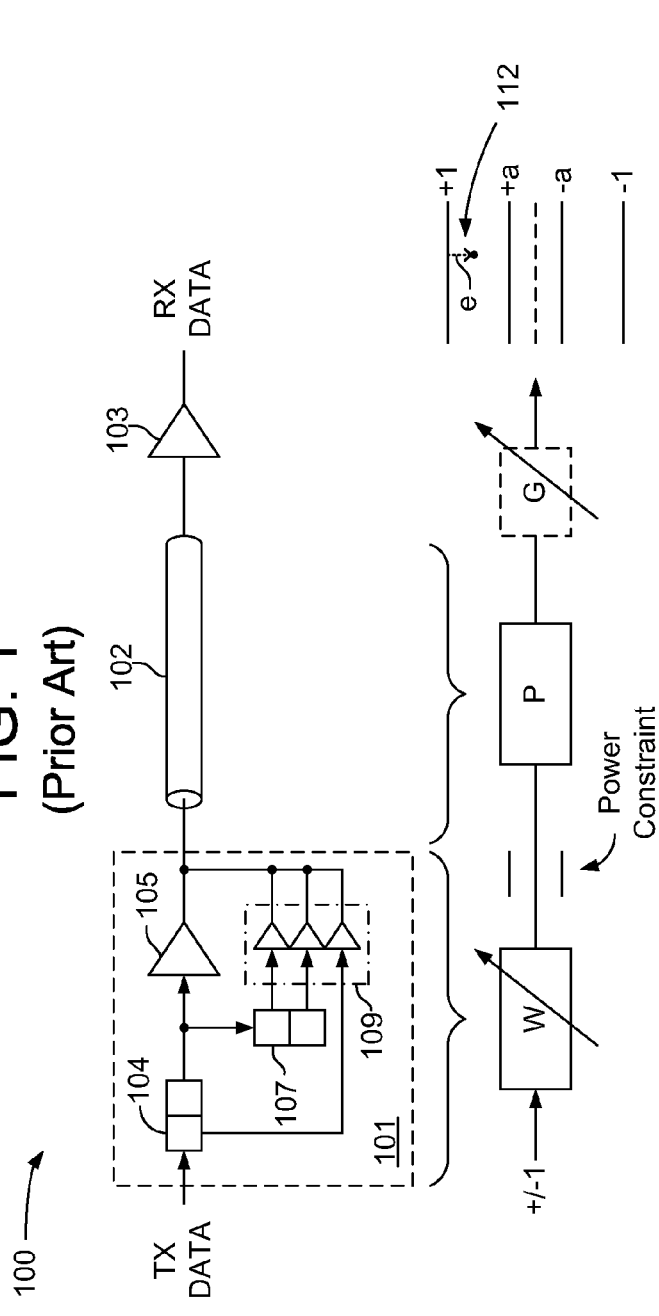
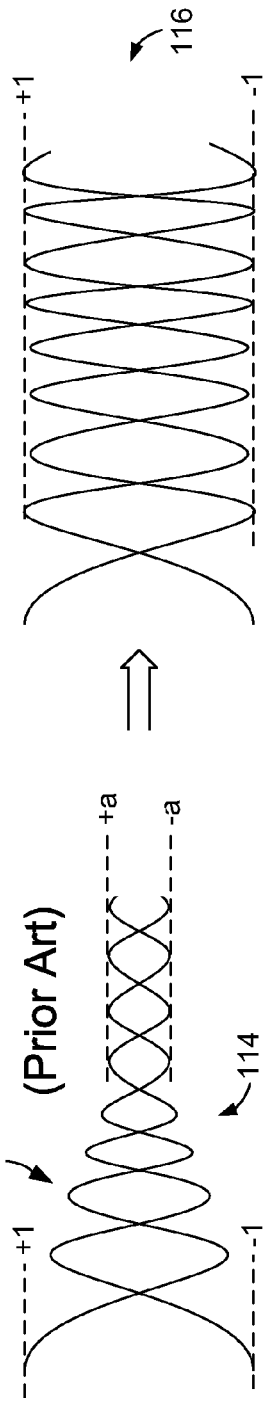
FIG. 1 (Prior Art)
FIG. 2 (Prior Art)

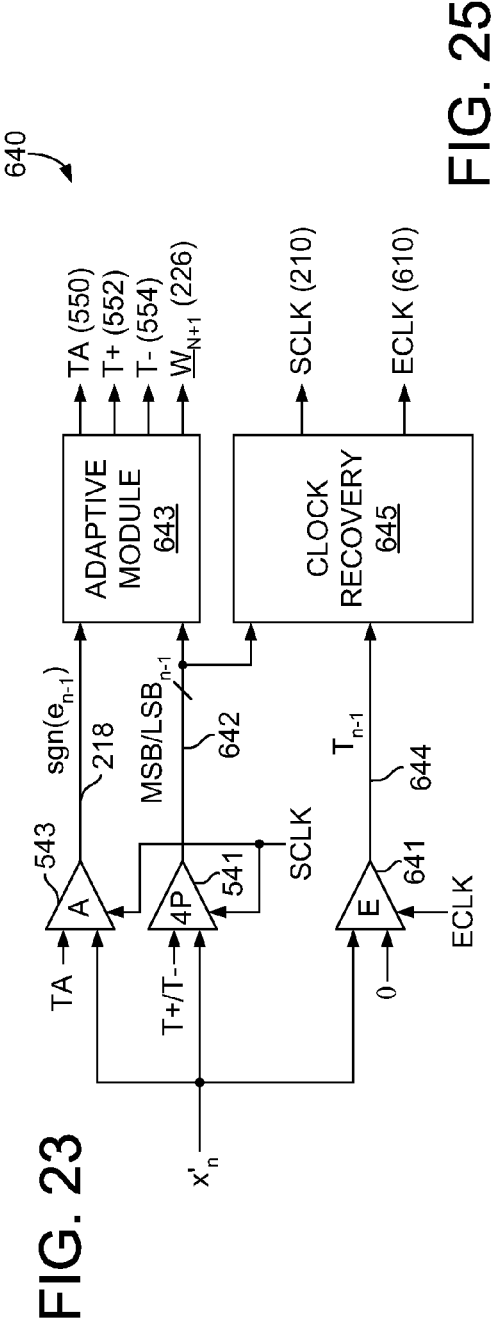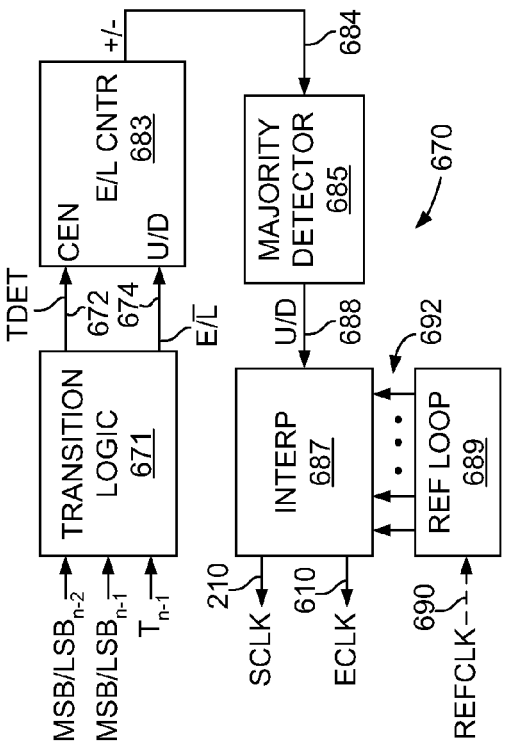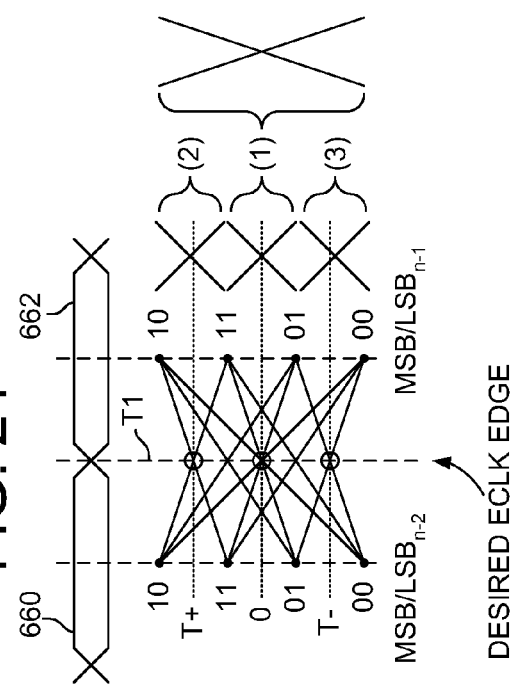

HIGH SPEED SIGNALING SYSTEM WITH ADAPTIVE TRANSMIT PRE-EMPHASIS

CROSS-REFERENCE TO RELATED APPLICATIONS

This application is a continuation of U.S. patent application Ser. No. 13/476,247, filed May 21, 2012, which is a continuation of U.S. patent application Ser. No. 12/693,285, filed Jan. 25, 2010, now U.S. Pat. No. 8,183,887, which is a continuation of U.S. patent application Ser. No. 12/206,629 filed Sep. 8, 2008, now U.S. Pat. No. 7,656,981, which is a continuation of U.S. patent application Ser. No. 11/538,333 filed Oct. 3, 2006, now U.S. Pat. No. 7,423,454, which is a divisional of U.S. patent application Ser. No. 10/740,087 filed Dec. 17, 2003, now U.S. Pat. No. 7,126,378; all of the aforementioned applications are hereby incorporated by reference in their entireties.

FIELD OF THE INVENTION

The present invention relates generally to the field of communications, and more particularly to high speed electronic signaling within and between integrated circuit devices.

BACKGROUND

Electrical pulses transmitted on a band-limited signaling path disperse in time as they travel from source to destination. In systems in which data is transmitted as a sequence of level-encoded electrical pulses, such time-domain dispersion results in a blending of neighboring pulses; an effect known as dispersion-type inter-symbol interference (ISI). Dispersion-type ISI becomes more pronounced at faster signaling rates, ultimately degrading the signal quality to the point at which distinctions between originally transmitted signal levels may be lost.

FIG. 1 illustrates a prior-art signaling system having a transmitter 101, signal path 102 and receiver 103. The transmitter includes post- and pre-tap output drivers 109 that mitigate dispersion-type ISI by generating dispersion-countering, pre-emphasis signals based on previously transmitted values (post-tap data) and the next-to-be-transmitted data value (pre-tap data), stored in shift register elements 107 and 104, respectively. The pre-emphasis signals are wire-summed with a primary output signal, generated by primary output driver 105, that corresponds to the data value being transmitted.

In a low-noise system, the drive strengths of the post- and pre-tap output drivers would theoretically be adjusted based on errors between receiver-sampled signal levels and expected signal levels (e.g., as shown by error indication, "e" at 112) until the pre-emphasis signals generated by the transmitter effect a transfer function (W) that is an exact inverse of the transfer function (P) of the signal path 102, thereby yielding a waveform at the input of receiver 103 that is identical to the primary output signal (i.e., W*P=1). This effect is illustrated in the waveforms of FIG. 2, which illustrates received signal levels with and without pre-emphasis at 116 and 114, respectively. In practical high-speed signaling systems, however, the transmitter is usually peak power constrained and therefore unable to provide the level of pre-emphasis needed to restore received signals to originally transmitted levels, illustrated as normalized +/−1 signal levels in FIG. 2. Also, as shown at 118, in a level-encoded signaling protocol (e.g., pulse amplitude modulation (PAM)), the overall attenuation of the received signal is a function of the transmitted data pattern itself, with low frequency components (e.g., sequences of same-level transmissions) having a higher amplitude, approaching the +/−1 levels, than high frequency components (e.g., alternating sequences of different-level transmissions) which are attenuated to +/−a levels.

Together, the transmitter power constraint and the data-dependent attenuation present a number of challenges in the prior-art signaling system 100. A fundamental problem is how to generate the error signal used to adjust the drive strengths of the transmitter output drivers considering that no known data level can be reached for all data patterns. That is, if the known reference levels +/−1 cannot be reached in high-frequency data patterns, attempting to converge to such levels tends to produce non-optimal drive-strength settings from the stand point of link performance.

One prior-art solution for generating error signals that may be used to update the drive strengths of the transmitter output drivers is to provide a variable gain element, G (shown in dashed outline in FIG. 1), at the receive-side of the signaling path 102. In theory, the gain element may be used to restore the incoming signal to the desired signaling level. While some improvement may be realized by such an approach, as signaling rates progress deeper into the gigahertz range, signals are often attenuated 10 to 20 db and more. Consequently, the gain-bandwidth product required to restore such high data rate signals to originally transmitted levels is beyond the capability of most practical amplifiers.

In view of the challenges involved in dynamically updating drive strengths of transmit-side output drivers, many system designers opt for a simpler approach, setting the drive strengths based on empirical results obtained in particular system configurations. While such static drive strength settings work well in many systems, non-optimal settings often result in systems which are subject to post-production configuration changes (e.g., adding modules, circuit boards or other components that affect signaling system characteristics), and systems that are sensitive to process variations and to changes in environmental factors such as voltage and temperature.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a prior-art signaling system;

FIG. 2 illustrates an idealized amplification of a channel-attenuated waveform;

FIG. 23 illustrates an embodiment of a multi-sample, multi-level receiver that recovers both data and clocking information from an incoming multi-level signal;

FIG. 24 illustrates possible signal transitions between successive 4-PAM data transmissions received by the multi-level receiver of FIG. 23.

FIG. 25 illustrates an embodiment of a clock recovery circuit that may be used to implement the clock recovery circuit shown in FIG. 23;

DETAILED DESCRIPTION

Figure 3:
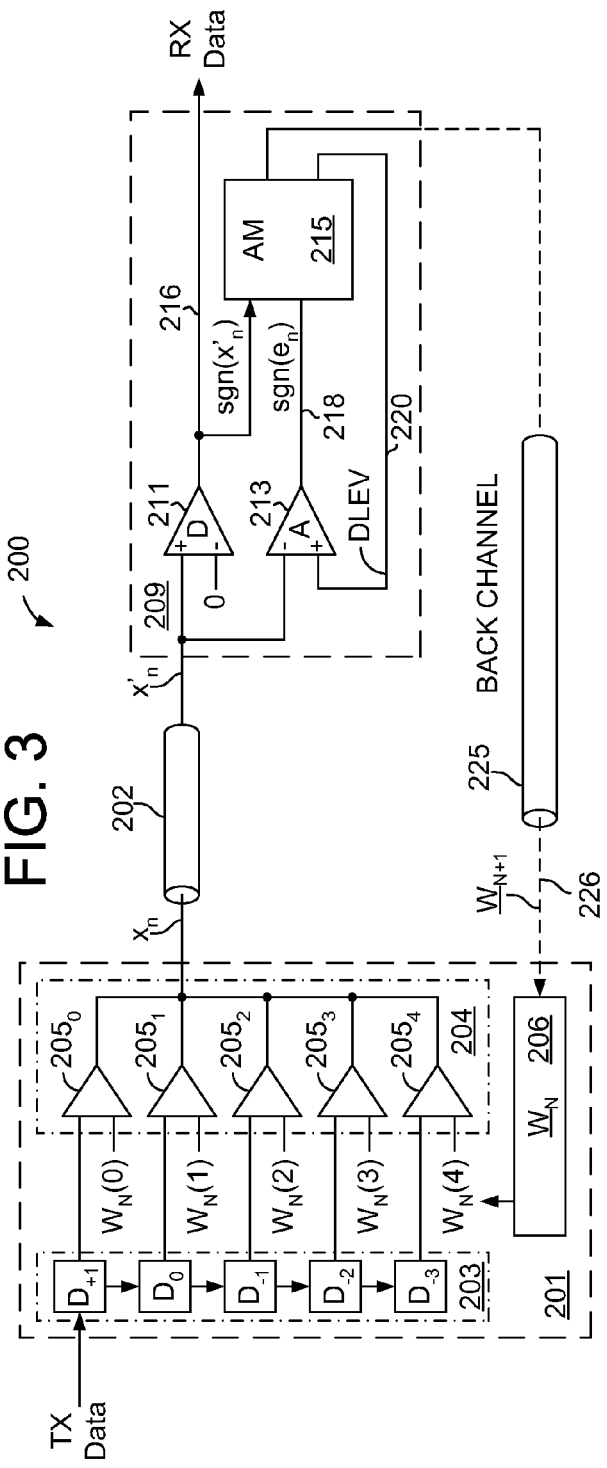
FIG. 3 illustrates a signaling system according to an embodiment of the invention.

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "terminal" is used to mean a point of electrical connection. The term "exemplary" is used to express but an example, and not a preference or requirement.

Signaling systems having a multiple-output driver transmit circuit are disclosed in various embodiments. In one embodiment, the drive strengths of output drivers within the transmit circuit are adaptively adjusted concurrently with adaptive determination of a target, receive-side signal level. Thus, even as adaptive determination of the target signal level is ongoing, the target signal level is compared with received signals to generate error signals that are used, in turn, to adjust the drive strengths of the output drivers. By this operation, a target signal level is determined and used to establish drive strength values that yield a substantially flattened channel response to different-frequency transmit data patterns.

In one embodiment, the error signals that result from comparison of received signals with the target signal level are input to a circuit that generates updated drive strength values, referred to herein as tap weights, in a manner that converges to a least-mean-square (LMS) error. In an alternative embodiment, the target signal level is used to establish a trap range, with signals falling within the trap range being used to update the drive strength values. In either embodiment, after being updated, the set of drive strength values may be scaled according to the transmit circuit power constraint. By this operation, the adaptive determination of the target signal level converges to a level that corresponds to the peak (or average) power available to the signal transmitter. Thus, a target level that corresponds to a substantially flattened frequency response at the peak or average power available to the signal transmitter is, in effect, learned by the system and used as an error reference for continued adjustment of output driver drive strengths.

In one implementation, a Taylor series approximation is used to simplify the power scaling of the drive strength values, enabling the scaling operation to be carried out in a relatively small logic circuit. In alternative implementation, drive strength values for pre- and post-tap output drivers of the transmit circuit are first updated and the drive strength of the data driver adjusted up or down to maintain the overall transmit power level within a predefined range.

In yet other embodiments of the invention, DC offsets within individual samplers of the receive circuit are adaptively canceled; multiplexing circuitry is provided to enable one or more samplers within the receive circuit to be temporarily removed from service and replaced by another sampler; and single- and two-phase techniques are applied to generate drive strength update values. These and other features and aspects of the invention are disclosed below.

Signaling System Overview

FIG. 3 illustrates a signaling system 200 according to an embodiment of the invention. The signaling system 200 includes a multi-output driver transmitter 201 (referred to herein as a multi-tap transmitter) and multi-sample receiver 209 coupled to one another via a high-speed signal path 202. In many of the embodiments described herein, the signal path 202 is a differential signal path having a pair of component signal lines to conduct differential signals generated by the transmitter 201. In all such embodiments, the signal path 202 may alternatively be singe-ended (i.e., single conductor path) for transmission of single-ended signals generated by the transmitter 201. The signal path 202 may be formed in multiple segments disposed on different layers of a circuit board and/or multiple circuit boards. For example, in one application the signal path 202 extends between two backplane-mounted daughterboards, and includes a printed trace segment on the backplane that extends between daughterboard connectors and counterpart trace segments on the daughterboards coupled to one another, via the daughterboard connectors and the backplane trace segment. The transmitter 201 and receiver 209 are implemented in respective integrated circuit (IC) devices that are mounted on a common circuit board or different circuit boards (e.g., as in the case of backplane-mounted daughterboards). In alternative embodiments, IC dice (i.e., chips) containing the transmitter 201 and receiver 209 may be packaged within a single, multi-chip module with the chip-to-chip signaling path formed by bond wires or other signal conducting structures. Also, the transmitter 201 and receiver may be formed on the same IC die (e.g., system on chip) and the signaling path 202 implemented by a metal layer or other conducting structure of the die.

Figure 4:
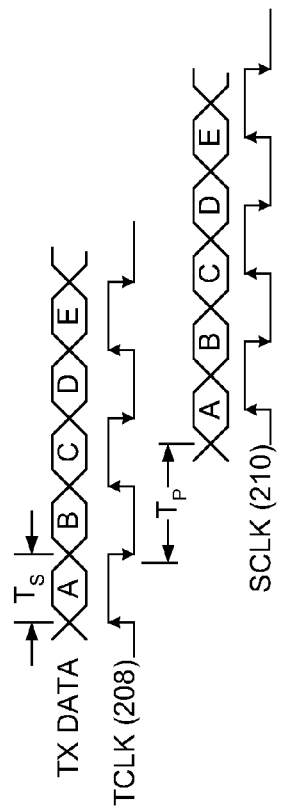
FIG. 4 illustrates a relationship between clock and data signals in one embodiment of the signaling system of FIG. 3.

Referring to FIG. 4, the transmitter 201 transmits data on the signaling path 202 during successive time intervals, referred to herein as symbol times, $T_S$. In the double-data-rate timing shown, each symbol time corresponds to a half cycle of a transmit clock signal 208 (TCLK) such that two data values (e.g., values A and B) are transmitted on signaling path 202 per cycle of the transmit clock signal 208. The transmitted data signal arrives at the input of the receiver 209 after propagation time, $T_P$, and is sampled by the receiver 209 in response to edges of a sampling clock signal 210 (SCLK). The sampling clock signal 210 may be supplied to the receive circuit 209 via an external clock line, or may be a recovered version of a reference clock signal (e.g., recovered by a delay-locked loop or phase locked loop circuit). In other embodiments, discussed below, the sampling clock signal 210 may be recovered from the incoming data signal itself by a clock data recovery (CDR) circuit. Still referring to FIG. 4, the sampling clock signal 210 has a quadrature phase relation to data valid windows (i.e., data eyes) in the incoming data signal such that each sample of the incoming signal is captured at the midpoint of a data eye. In alternative embodiments, the sampling instant may be skewed relative to data eye midpoints as necessary to satisfy signal setup and hold time requirements of the samplers 211 and 213, and/or to compensate for asymmetry in the channel pulse response. Also, more or fewer symbols may be transmitted per cycle of the transmit clock signal 208. For example, the embodiment of FIG. 3 may alternatively be a single data rate system, quad data rate system, octal data rate system, decade data rate system, and so forth.

In the receive circuit 209, a single symbol is captured during each cycle of the sampling clock signal 210. That is, a rising (or falling) edge of the sample clock is used to capture a sample of the incoming signal, $x'_n$. In a multi-data rate system, multiple symbols are captured per cycle of the sampling clock signal 210 as shown in FIG. 4. In such systems, clock generation circuitry may be provided within the receive-side device (e.g., an IC device containing the receiver 209) to generate multiple instances of the sampling clock signal 210 that are phase-distributed through a period (1/frequency) of the sampling clock signal. In the double-data-rate timing arrangement of FIG. 4, for example, two instances of the sampling clock signal 210 are provided: an even-phase sampling clock signal, $SCLK_E$, to sample even-numbered symbols $x'_n, x'_{n+2}, x'_{n+4} \ldots$; and an odd-phase sampling clock signal, $SCLK_O$, to sample odd-numbered symbols $x'_{n-1}, x'_{n+1}, x'_{n+3} \ldots$. This technique may be extended to achieve virtually any data rate, including quad data rate (4 symbols per sampling clock cycle), octal data rate (8 symbols per sampling clock cycle), decade data rate (10 symbols per sampling clock cycle), and so forth.

Still referring to FIG. 3, the transmitter 201 includes a transmit shift register 203, output driver bank 204 and tap weight register 206. In the particular embodiment shown, the transmit shift register 203 is five elements deep and used to store a pre-tap data value $D_{+1}$, primary data value $D_0$, and three post-tap data values $D_{-1}$, $D_{-2}$ and $D_{-3}$. The primary data value is the data value to be transmitted to the receiver 209 during a given transmit interval, and the pre- and post-tap data values are the next-to-be transmitted and previously transmitted data values, respectively (i.e., the subscript indicating the number of transmit intervals to transpire before the data value will be transmitted). Each of the shift register storage elements is coupled to a respective one of output drivers $205_0$-$205_4$ within the output driver bank 204, with output driver $205_1$ forming the primary data driver, output driver $205_0$ forming the pre-tap data driver and output drivers $205_2$-$205_4$ forming the post-tap data drivers (such drivers being referred to herein as pre-tap, primary and post-tap drivers, for brevity).

The tap weight register is used to store a set of drive strength values, $\underline{W}_N$, referred to herein as tap weights. As described below, the tap weights are iteratively updated, with each new set of tap weights being designated by an incrementally higher subscript (i.e., N, N+1, N+2, etc.). Each tap weight of a given set, $W_N(0)$-$W_N(4)$, is supplied to a respective one of the output drivers $205_0$-$205_4$ to control the level of the output signal generated by the output driver. In one embodiment, the signal path 202 is pulled up to a predetermined voltage level (e.g., at or near supply voltage) by single-ended or double-ended termination elements, and the output drivers $205_0$-$205_4$ generate signals on the signal path 202 by drawing a pull-down current, $I_{PD}$ (i.e., discharge current), in accordance with the corresponding tap weight and data value.

As a specific example, in a binary signaling system, each output driver $205_0$-$205_4$ draws a current according to the following expression:

$$I_{PD}(i)=S(i)\cdot[W_N(i)*I_{UNIT}] \quad (1),$$

where '·' denotes a logic AND operation, '*' denotes multiplication, $I_{UNIT}$ is a reference current, $W_N(i)$ is the tap weight of the $i^{th}$ output driver (i ranging from 0-4 in this example), and S(i) is the sign of the output driver contribution. The individual currents drawn by the output drivers $205_0$-$205_4$ are wire-summed (i.e., drawn from the same node) to form a total pull-down current, $I_{TPD}$, and therefore each contribute to the total output signal level in accordance with the sign of the output driver contribution and the tap weight. By this arrangement, pre- and post-tap drivers are enabled to provide additive and subtractive contributions to the output signal level, as necessary to compensate for dispersion-type ISI.

It should be noted that the particular numbers of pre-tap and post-tap drivers (and corresponding tap weights and shift register elements) shown in FIG. 3 and the figures that follow have been selected for purposes of example only. In alternative embodiments, more or fewer pre-tap drivers and/or post-tap drivers may be provided, along with more or fewer storage elements within shift register 203 and tap weights within tap weight register 206.

In one embodiment, each of the tap weights, $W_N(0)$-$W_N(4)$ is a digital value having a sign component and magnitude component. The sign component of the tap weight (e.g., sign bit) is exclusive-NORed with the corresponding transmit data value to generate the sign of the signal contribution to be generated by the corresponding output driver 205. The exclusive-NOR operation effectively multiplies the signs of the tap weight and transmit data value, yielding a logic '1' (i.e., interpreted as a positive sign in one embodiment) if the signs of the tap weight and transmit data value are the same, and a logic '0' (i.e., negative sign) if the signs of the tap weight and transmit data value are different. The magnitude component of the tap weight is a multi-bit value used, for example, to control a digital-to-analog converter (DAC) within the output driver. Thus, the expression (1) may be rewritten as follows:

$$I_{PD}(i)=[D(i)/\oplus sgn(W_N(i))]\cdot[|W_N(i)|*I_{UNIT}] \quad (2),$$

where '/$\oplus$' denotes an exclusive-NOR operation, D(i) is a data value received from the transmit shift register, "sgn($W_N$(i))" is the sign of the $i^{th}$ tap weight and $|W_N(i)|$ is the magnitude of the $i^{th}$ tap weight. By this arrangement, the sign of the signal contribution generated by the $i^{th}$ output driver is positive (i.e., logic '1') if the sign of the corresponding tap weight and source data value match, and negative otherwise. That is, if a logic '1' is to be transmitted (i.e., positive data) and the tap weight is positive (indicated by a logic '1' sign bit), the signal contribution is positive, thereby increasing the signal level generated on signal path 202. The signal contribution is also positive if a logic '0' is to be transmitted (i.e., negative data) and the tap weight is negative, the negative tap weight effectively flipping the otherwise negative signal contribution indicated by the logic '0' data. If the tap weight sign and source data value do not match, then a negative signal contribution is generated by the output driver. In a multi-level signaling embodiment, the sign of the tap weight may similarly be used to change the sign of the transmitted symbol.

Figure 5:
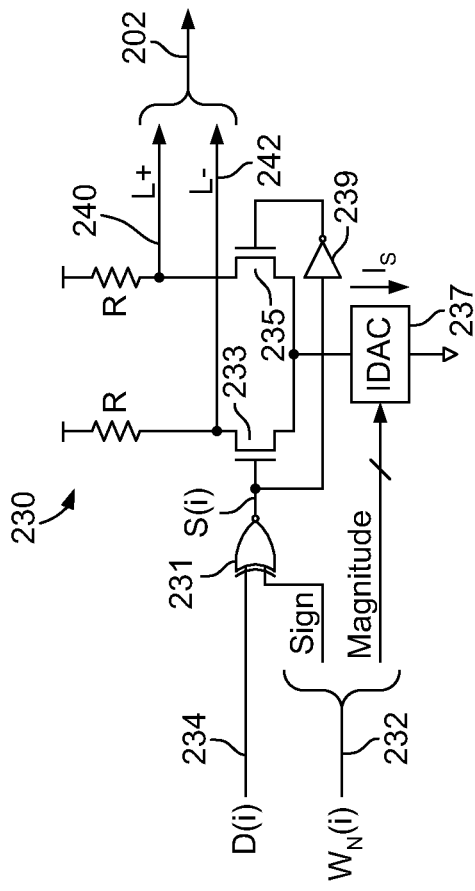
FIG. 5 illustrates an embodiment of a differential output driver that may be used to implement each of the output drivers shown in FIG. 3.

FIG. 5 illustrates an embodiment of a differential output driver 230 that may be used to implement each of the output drivers $205_0$-$205_4$ of FIG. 3. The output driver includes a pair of transistors 233 and 235, each having drain terminals pulled up by respective load elements R (resistors are depicted in FIG. 5, but active load elements or other types of resistive elements may alternatively be used) and coupled to negative and positive lines 240 and 242 (L− and L+ respectively) of differential signal path 202. Source terminals of the transistors 233 and 235 are coupled in common to a current DAC 237 (IDAC) which draws a current, $I_S$, in accordance with the magnitude component of tap weight, $W_N(i)$. That is, $I_S=|W_N(i)|\times I_{UNIT}$. An exclusive-NOR gate 231 is provided to exclusive-NOR the sign of the tap weight 232 with the corresponding source data value 234, thereby generating a signal contribution sign, S(i), that is supplied to the gate of transistor 233. The complement of the signal contribution sign, /S(i) is generated by inverter 239 and supplied to the gate of transistor 235. By this arrangement, when a logic '1' data value 234 is received in the output driver, and the tap weight 232 is positive, a positive contribution sign is generated by the exclusive-NOR gate (i.e., S(i) is high) to switch on transistor 233 and switch off transistor 235, thereby causing line 242 (L−) to be pulled down relative to line 240 (L+) to establish a positive differential signal contribution. The potential difference between lines L+ and L− is controlled by the current $I_S$ (i.e., $V_{L+}=V_S-I_SR$, where the supply voltage, $V_S$, and the resistance, R, are substantially fixed) which, in turn, is controlled by the magnitude component of the tap weight 232. Thus, the signs of the tap weight 232 and source data value 234 control whether the differential signal contribution generated on lines 240 and 242 by a given output driver (i.e., $V_{L+}$-$V_{L-}$) is positive or negative, and the magnitude of the tap weight 232 controls the amplitude of the differential signal. In alternative embodiments, described in greater detail below, multi-level signaling (i.e., signaling protocols in which each transmitted symbol carries more than one bit of information) may be used instead of binary signaling, with different pull down currents being used to establish different signal levels for different combinations of source data bits. Also push-pull type output drivers or other types of output drivers may be used instead of the current mode driver 230 shown in FIG. 5.

Output Driver Tap Weight Determination

Referring again to FIG. 3, the tap weights stored in tap weight register 206 are ideally set to exactly cancel the dispersion-type ISI (and/or other systematic sources of signal distortion) resulting from transmission of the pre-tap and post-tap data values. For example, if transmission of a logic '1' value that starts at a normalized signal level of +1.0 results in reception of signals having levels of 0.7 and 0.3 in successive reception intervals, then the signal is being dispersed and attenuated by the signal path 202 (also referred to herein as a channel). Consequently, an immediately subsequent transmission of a logic '0' that starts at a normalized signal level of −1.0 results in reception of signals having levels of −0.4 (i.e., −0.7+0.3), and −0.3. That is, the residue of the initial transmission (i.e., 0.3) destructively combines (i.e., interferes) with the subsequent negative-level signal, attenuating the received signal level. In this simple example, it can be seen that the source of the ISI in any given symbol transmission is the immediately preceding symbol. Thus, by setting the post-tap driver $205_2$ to generate a subtractive pre-emphasis signal that exactly cancels the residue of the preceding transmission, the signal received within a given sampling interval, while not fully restored to the originally transmitted level, is free from ISI. In a practical application, the ISI will not be fully canceled, as numerous other channel effects (reflections, crosstalk, noise) mask the true level of ISI at any given time, making it difficult to ascertain the exact tap weight that should be applied to the pre- and post-tap drivers (i.e., $205_0$ and $205_2$-$205_4$) to compensate for the pre- and post-tap residue. Also, the pre-emphasis signal itself will generate ISI, which in turn may be mitigated by additional pre-emphasis signals generated by one or more others of the pre- and post-tap drivers.

In one embodiment, the receiver 209 generates updated tap weights, $\underline{W}_{N+1}$, based upon a comparison of incoming signals with an adaptively determined target signal level 220, referred to herein as a data level threshold, DLEV. The receiver 209 includes an adaptive module 215 (AM) and a pair of sampling circuits referred to herein as a data sampler 211 (D) and an adaptive sampler 213 (A). The data sampler samples the incoming signal, referred to herein as $x'_n$ to emphasize the channel transformation of originally transmitted signal, $x_n$, and generates a data sample 216 (RX Data) having a logic '1' or logic '0' state according to whether the incoming signal exceeds a zero reference. In a single-ended signaling system, the zero reference may be generated by a DAC, voltage divider or other circuit and set to a point midway between steady-state high and steady-state low signaling levels. In a differential signaling system, the common mode of the incoming differential signal may constitute the zero reference so that if the signal level on the positive signal line (e.g., line 240 of FIG. 5) exceeds the signal level on the negative signal line (e.g., line 242 of FIG. 5), a logic '1' is captured by the data sampler 211 and, conversely, if the signal level on the negative signal line exceeds the signal level on the positive signal line, a logic '0' is captured by the sampler 211. Thus, the data sample 216 has a logic state that corresponds to the sign of the incoming data signal, positive or negative, and is referred to herein as a data sign value.

The adaptive sampler 213 also samples the incoming signal, $x'_n$, and generates an error sample 218 having a logic '1' or logic '0' state according to whether the incoming signal exceeds the data level threshold 220 generated by the adaptive module 215. In one embodiment, the data level threshold 220 corresponds to an expected data level of logic '1' transmission, so that if the incoming signal is determined to have a positive sign (i.e., RX Data=$sgn(x'_n)$='1'), then the error sample 218 generated by the adaptive sampler 213 represents the sign of an error between the incoming signal level and the expected signal level (i.e., the data level threshold 220, DLEV). Accordingly, the error sample 218 is referred to herein as an error sign value ($sgn(e_n)$) and is a logic '1' (i.e., positive) if $x'_n$<DLEV, and a logic '0' (i.e., negative) if $x'_n$≥DLEV).

Figure 6:
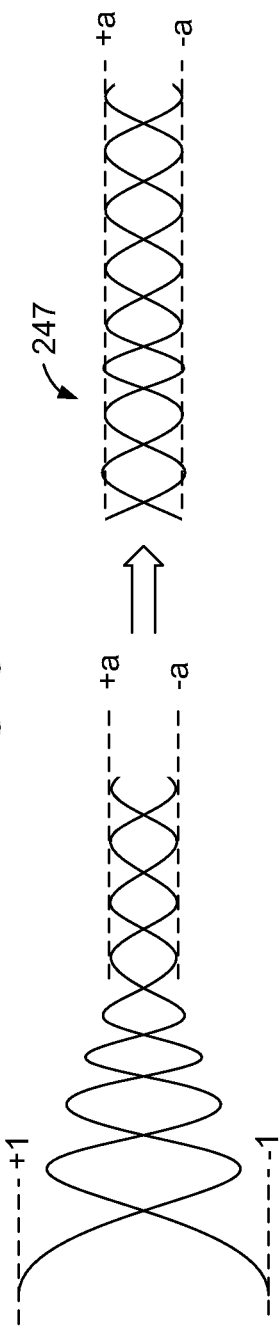
FIG. 6 illustrates waveforms that correspond to a substantially flattened channel response obtained in the signaling system of FIG. 3.

The adaptive module 215 receives the data sign and error sign values, 216 and 218, from the data sampler 211 and adaptive sampler 213, respectively, and adaptively updates the data level threshold 220 and pre-emphasis tap weights 226 in response. Referring to FIG. 6, by updating the data level threshold 220 and tap weights 226 concurrently (i.e., at least partly overlapping in time at the same or different loop update rates), and by maintaining the updated tap weights 226 in an aggregate setting that corresponds to the peak (or average) power of the transmit circuit 201, the data level threshold converges to the attenuated levels, +/−a exhibited by the highest frequency data patterns transmitted over the signal path 202, and the tap weights 226 converge to a setting that substantially flattens the channel response as shown at 247. That is, instead of attempting to adapt the tap weights according to originally transmitted signal levels (e.g., normalized +/−1 levels as discussed in reference to FIGS. 1 and 2), the attenuated signal levels +/−a of high frequency data patterns (e.g., signal levels alternating in each successive transmission) are learned and used to generate error signals that, when applied in an error reduction circuit, drive the pre-emphasis tap weights 226 toward a solution that flattens the channel response at the +/−a threshold levels, and yet meets the peak power constraint of the transmit circuit. By this operation, a more optimal tap weight convergence may be achieved than in the prior-art signaling system of FIG. 1, potentially improving signaling margins, particularly in multi-PAM systems where finer distinctions between signaling levels are needed.

In some systems, it is desirable to shape the frequency response differently from the flattened response described in reference to FIG. 6. This may be done, for example, by updating both the tap weights and data level threshold using the error filtered by appropriate data sequences. As an example, in a system where it is desired to pass the additive or subtractive component (i.e., partial response) of a neighboring symbol that appears in the same transmit interval as the symbol of interest (i.e., not zeroing the ISI from a selected neighboring symbol). This data filtering, however, does not change the operations described above with regard to concurrent updating of both the data level threshold and tap weights (with or without power scaling). Rather, the target shape of the pulse is changed. In other embodiments, the tap weights updated using other error filtering functions to improve any number of performance measures (e.g., eye opening in voltage or timing, reduced bit error rate or other overall system performance parameter).

In one embodiment, each new set of updated tap weights 226 is communicated to the transmitter via a back channel 225. The back channel 225 may be formed, for example, by a relatively low-speed signaling path, or by out-of-band signaling over the signaling path 202 (e.g., using an otherwise unused code space within a signal encoding protocol such as 8b/10b or other signal encoding). In an alternative embodiment, a separate back channel may be omitted and the signaling path 202 may be used to communicate updated tap weights 226 (or update values that enable transmit-side generate of updated tap weights 226) to the transmit-side device.

Adaptive Module

Figure 7:
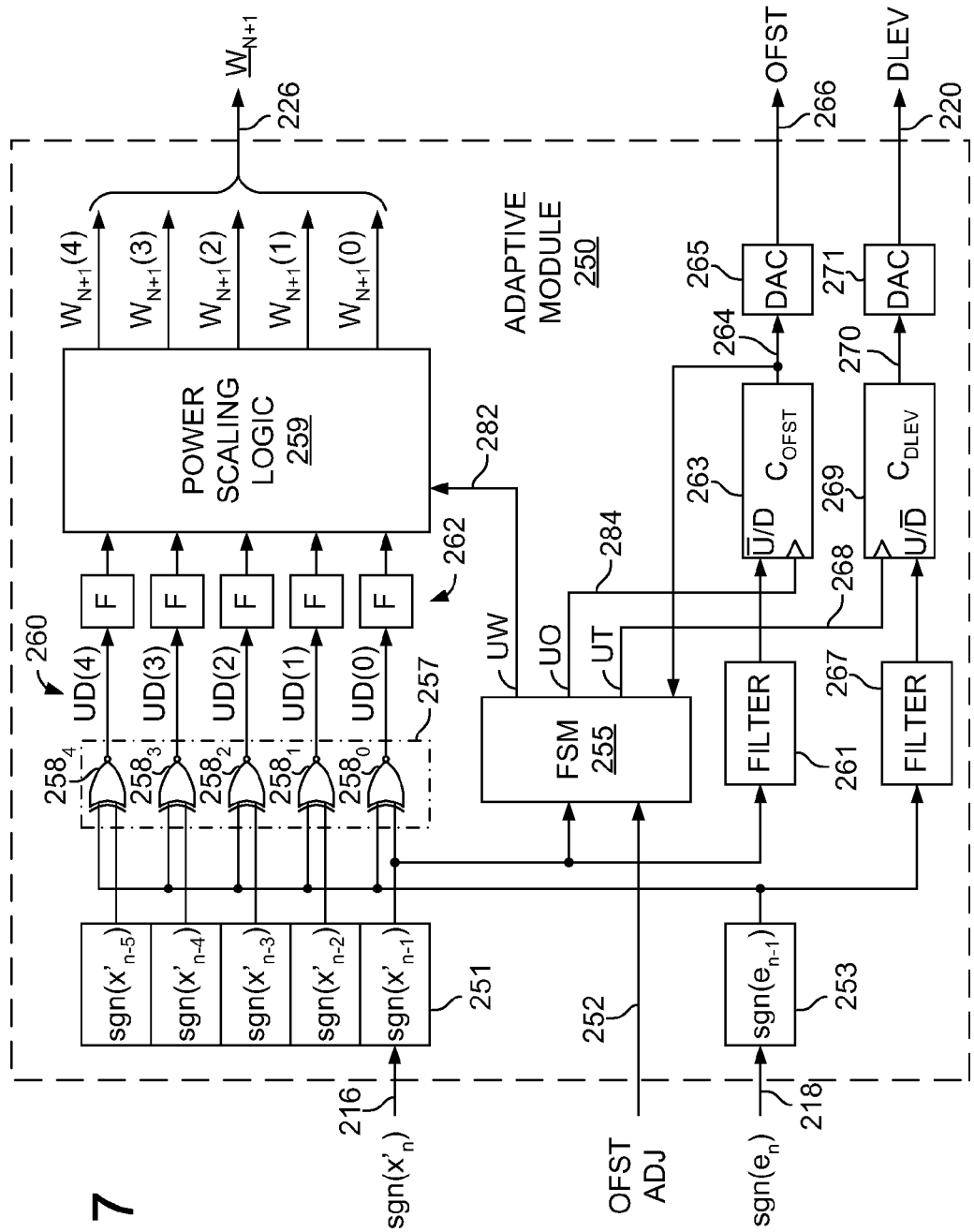
FIG. 7 illustrates an adaptive module according to an embodiment of the invention.

FIG. 7 illustrates an embodiment of an adaptive module 250 that may be used to implement the adaptive module 215 of FIG. 3. The adaptive module 250 includes a data sign register 251, error sign register 253, sign multiplier 257, finite state machine 255, power scaling logic 259, filter 261, threshold counter 269 and DAC 271. The error sign value 218 and data sign value 216 generated during reception interval 'n' are supplied to the error sign register 253 and data sign register 251, respectively, and clocked into the registers in response to transitions of a sampling clock signal, not shown (or other, related clock signal). The data sign register 251 is a shift register used to store the most recently generated data sign values. In the embodiment of FIG. 7, the data sign register 251 is depicted as being five elements deep (i.e., to store data sign values, $x'_{n-1}$-$x'_{n-4}$); a depth that corresponds to the number of tap weights applied within the transmit circuit 201 of FIG. 3. In alternative embodiments, the data sign register 251 may have more or fewer storage elements, for example, to accommodate more or fewer tap weights and/or to store data sign values used for other purposes including, without limitation, reflection cancellation, cross-talk cancellation and offset cancellation. Similarly, the error sign register 253 is a one-deep register in the embodiment of FIG. 6, to store error sign value $sgn(e_{n-1})$, but may include any number of shift register elements in alternative embodiments (e.g., to enable selection of an error sign value having a desired latency).

The sign multiplier 257 includes a set of exclusive-NOR gates $258_0$-$258_4$ each having a first input coupled in common to receive the stored error sign value from the error sign register 253 and each having a second input coupled to receive a respective data sign value from the data sign register 251. By this arrangement, each of the exclusive-NOR gates $258_0$-$258_4$ generates a respective one of update values 260, UD(0)-UD(4), in a logic '1' state if the corresponding data sign value matches the error sign value, and in a logic '0' state if the data sign value and error sign value do not match. Thus, each of the update values 260 represents a multiplication of the signs of the input signal (i.e., $x'_{n-1}$-$x_{n-4}$, respectively) and error signal $e_{n-1}$ and therefore is a logic '1' if the signs are both positive or both negative, and a logic '0' if the signs are different. In one embodiment, each of the update values 260 is filtered within a respective one of filter elements 262 (F) to decrease update dither due to noise in the update estimate. In an alternative embodiment, the filter elements 262 are omitted.

In one embodiment, a tap weight is made more positive in response to a logic '1' update (i.e., a positive update) and more negative in response to a logic '0' update value (a negative update). More specifically, a positive tap weight is incremented (e.g., by a predetermined step size) and a negative tap weight decremented in a positive update. Conversely, a positive tap weight is decremented and a negative tap weight incremented in a negative update. In one embodiment, the positive and negative updates applied to the tap weights constitute a sign-sign least-mean-square (LMS) update that may be expressed as follows:

$$\underline{W}_{N+1} = \underline{W}_N + \text{stepsize}*\text{sign}(e_n)*\text{sign}(\underline{x}') \quad (3),$$

which corresponds to the following scalar expressions:

$$W_{N+1}(0) = W_N(0) + \text{stepsize}*\text{sign}(e_n)*\text{sign}(x'_{n+1})$$

$$W_{N+1}(1) = W_N(1) + \text{stepsize}*\text{sign}(e_n)*\text{sign}(x'_n)$$

$$W_{N+1}(2) = W_N(2) + \text{stepsize}*\text{sign}(e_n)*\text{sign}(x'_{n-1})$$

$$W_{N+1}(3) = W_N(3) + \text{stepsize}*\text{sign}(e_n)*\text{sign}(x'_{n-2})$$

$$W_{N+1}(4) = W_N(4) + \text{stepsize}*\text{sign}(e_n)*\text{sign}(x'_{n-3})$$

Thus, each tap weight update is in the direction of the estimate of the quantized negative gradient of the quadratic, least-mean-squared error cost function (i.e., a quadratic cost function). Other cost functions may be used in alternative embodiments. In order to provide a meaningful error signal, the data level threshold is updated according to the error sign value, sign($e_n$). In the embodiment of FIG. 3, for example, the data level threshold is updated according to the following expression:

$$DLEV_{N+1} = DLEV_N - \text{stepsize}*\text{sign}(e_n)*\text{sign}(x'_n)$$

In the embodiment of FIG. 7, the adaptive module 250 outputs the updated tap weight values 226 generated by the power scaling logic 259 to the transmit-side device, for example, via the back channel 225 depicted in FIG. 3 (or via another signaling path). In an alternative embodiment, the power scaling logic 259 is provided within the transmit-side device rather than the receive-side device, so that only the tap weight updates (or component signals used to generate the tap weight updates) need be communicated to the transmit-side device.

Still referring to FIG. 7, the most recently stored data sign value and error sign value, sgn($x'_n$) and sgn($e_{n-1}$), are provided to the finite state machine 255 which, in turn, asserts an update-weight signal 282 (UW) to enable the power scaling logic 259 to apply the update values 260 to the existing set of tap weights ($\underline{W}_N$), and scale the resulting values to generate updated tap weights $\underline{W}_{N+1}$ 226. In the embodiment of FIG. 7, the finite state machine asserts the update-weight signal upon determining that the shift register 251 is fully loaded, or fully reloaded, with a set of data sign values, and that the most recently stored data sign value has a predetermined state. The predetermined state may be either positive or negative in different embodiments, according to whether the data level threshold 220 generated by the adaptive module 250 corresponds to positive or negative incoming signals. That is, if the data level threshold 220 is adjusted to the level of logic '1' data, then the error signal, $e_n$, has meaning with respect to $x'_n$ if the sign of $x'_n$ is positive (i.e., the data sign value is a logic '1') and is ignored if the sign of $x'_n$ is negative. Conversely, if the data level threshold 220 is adjusted to the level of logic '0' data, then the error signal, $e_n$, has meaning with respect to $x'_n$ if the sign of $x'_n$ is negative and is ignored if the sign of $x'_n$ is positive. Further, two adaptive samplers may be provided to generate positive and negative data level thresholds when positive and negative data signals are received, respectively. As discussed below, in a multi-PAM embodiment, an adaptive sampler may be provided to generate error information for each different data level.

In the embodiment of FIG. 7, the adaptive module 250 generates a data level threshold 220 (DLEV) that constitutes a target data level for incoming, positive data signals. When the finite state machine 255 detects storage of a positive data sign value (i.e., a logic '1'), the finite state machine 255 asserts an update threshold signal 268 (UT), thereby enabling a threshold count 270 maintained by threshold counter 269 to be incremented or decremented according to the state of the corresponding error sign value, $e_{n-1}$, stored in register 253. Filter 267 is provided to decrease update dither due to noise in the update estimate, and may be omitted in alternative embodiments. Also, the finite state machine 255 may also generate the update threshold signal 268, upon determining that a predetermined pattern of incoming signals has been received (e.g., a high-frequency pattern such as 10101).

In the embodiment of FIG. 7, the threshold counter 269 outputs the threshold count 270 to a DAC 271 which, in turn, generates a corresponding data level threshold 220. Although depicted as being part of the adaptive module 250, the DAC may alternatively be a component within the adaptive sampler 213 (e.g., a DAC that operates to bias the sampler to establish the data level threshold). In such an embodiment, a digital control value (i.e., the threshold count 270) is output from the adaptive module 250 rather than an analog threshold level (or analog biasing signal). Sampling circuit embodiments having biasing circuitry to establish a data level threshold in response to a digital control value are described below.

Still referring to FIG. 7, the adaptive module may additionally include a filter 261, offset counter 263 and DAC 265 to control offset cancellation within the data sampler. During an offset cancellation operation, an offset adjust signal 252 is asserted at an input of the finite state machine, and a null signal is generated at the data sampler input, for example, by switchably coupling the sampler inputs together, or by transmitting null data over the signal path (i.e., signal levels impressed on component lines of the differential signal path have the same levels). A steady-state positive or negative output from the data sampler in response to the null data input indicates a DC error within the sampler. That is, if the sampler repeatably interprets nominally equal signal levels at its differential inputs as indicating a logic '1' or logic '0' value, then the sampler exhibits a DC offset. Accordingly, the data sign value, after being filtered by the filter 261 (which may be omitted in alternative embodiments), is supplied to an up/down input of the offset counter 263. The finite state machine responds to assertion of the offset adjust signal by asserting an update-offset signal 284 (UO) after each new data sign value is loaded into the shift register (or after a predetermined number of data sign values have been loaded), thereby enabling the offset count 264 maintained within the offset counter 263 to be adjusted up or down. In the embodiment of FIG. 7, the offset count 264 is supplied to DAC 265 which, in turn, generates an analog control value 266 (OFST) that is applied within the data sampler to bias the sampler in a direction counter to the DC offset. Alternatively, the offset count 264 itself may be supplied to the sampler. In either case, a negative feedback loop is created in which the data sampler bias is adjusted to drive the DC offset to zero, a condition indicated by a dithering offset count 264. In one embodiment, the offset count 264 is supplied to the finite state machine 255 (or other control circuit) to enable the finite state machine 255 to determine when a target DC offset count has been reached (i.e., offset calibration operation complete). In alternative embodiments, the finite state machine 255 continues to assert the update-offset signal 284 (i.e., continuing the DC offset calibration operation) until the offset adjust signal 252 is deasserted. The offset adjust signal 252 may be asserted, for example and without limitation, for a predetermined time, or until a predetermined number of data sign values have been generated, or until a dithering offset count is detected.

In one embodiment, the offset count 264 (or DAC output 266) is supplied to both the adaptive sampler and the data sampler (e.g., elements 213 and 211 of FIG. 3), on the assumption that the DC offset of the adaptive sampler is likely to track the DC offset of the data sampler. This may be the case, for example, when a contributor to DC offset is the signal path itself, or when the DC offset is process dependent. In an alternative embodiment, additional offset calibration circuitry (e.g., filter, offset counter and, if needed, DAC) is provided within the adaptive module 250 to enable DC offset calibration of the adaptive sampler. In another alternative embodiment, multiplexing circuitry is used to select the error sign register 253 to provide the sample value to the filter 261 instead of the data sign register 251. In such alternative embodiments, the threshold count applied to the adaptive sampler is temporarily zeroed (or disabled from being applied within the adaptive sampler) to enable determination of the DC offset.

Power Scaling

Still referring to FIG. 7, after the power scaling logic 259 (or other circuitry within the adaptive module) updates the transmit pre-emphasis tap weights according to the update values, the power scaling logic 259 scales the updated tap weights to ensure that the total power indicated by the aggregate magnitudes of the tap weights does not exceed the power constraint (peak or average) of the transmit circuit. In one embodiment, the power constraint of the transmit circuit corresponds to the maximum DAC setting of the primary driver which, in an 8-bit sign-magnitude implementation, is $2^7-1=127$ (alternatively, the maximum DAC setting, and therefore the power constraint, may be programmed into a configuration circuit within the receive-side and/or transmit-side device, or supplied to the receive-side and/or transmit-side devices during system initialization). Thus, assuming an initial condition in which the primary driver tap weight is set to max power (i.e., sign bit=1, magnitude=127), then as the magnitudes of the initially-zero pre- and post-tap weights increase, the power constraint may be exceeded. As discussed above, the sign-sign LMS update logic of FIG. 7 updates the tap weights according to the following equation:

$$\underline{W}_{N+1} = \underline{W}_N + \text{stepsize} * \text{sign}(e_n) * \text{sign}(\underline{x}') \quad (3).$$

Thus, the tap weight updates are obtained by multiplying the stepsize, error sign value and data sign value, so that expression (3) may be rewritten as follows:

$$\underline{W}_{N+1} = \underline{W}_N + \underline{\text{Update}}_N \quad (4).$$

The transmit circuit power constraint may be expressed as a sum of the magnitudes of the output driver tap weights. That is:

$\Sigma |W_n| \leq W_{MAX}$, where $W_{MAX}$ is the square root of the normalized power limitation (i.e., in the case of a peak power constraint; in the case of an average power constraint, the expression becomes the L2 norm: $\Sigma W_n^2 \leq W_{MAX}^2$). In a current mode transmitter, the tap weights, W, control the current contribution of each output driver, which in turn controls the voltage level developed on the signaling path and therefore the power output of the drivers. In a voltage mode transmitter, the tap weights control the voltage contribution of each output driver, and therefore the power output of the drivers. In the tap weight update expressions herein, the term, $W_{MAX}$, refers to the square root of the normalized peak or average power constraint.

In one embodiment, transmit pre-emphasis tap weights are re-scaled directly after each update by multiplying each tap weight magnitude by a ratio of the power constraint to the power represented by the updated tap weights. That is:

$$\underline{W}_{N+1} = (\underline{W}_N + \underline{\text{Update}}_N) * (W_{MAX}/|\underline{W}_N + \underline{\text{Update}}_N|_1) \quad (5),$$

where $|\underline{W}_N + \underline{\text{Update}}_N|_1$ is the sum of the magnitudes of the tap weights that would result if the updates were applied (i.e., $|W_N(0)+\text{Update}(0)|+|W_N(1)+\text{Update}(1)|+\ldots+|W_N(4)+\text{Update}(4)|$). Direct re-scaling may be carried out by a processing unit (e.g., digital signal processor, special purposes processor, or general purposes processor) within either the receive-side IC device or transmit-side IC device (i.e., the IC devices that include the receiver 209 and transmitter 201, respectively, of FIG. 3) or by another device. Alternatively, a state machine or dedicated logic circuit for carrying out the direct re-scaling operation (e.g., using integer arithmetic) may also be used.

In an alternative embodiment, circuitry within the adaptive module itself is used to carry out re-scaling based on a Taylor-series approximation that reduces computational complexity relative to the direct re-scaling approach. That is, rewriting expression (4), the following expression for residual power (i.e., amount of power by which the updated tap weights exceed or fall below the power constraint) is obtained:

$$W_{RES} = |\underline{W}_N + \underline{\text{Update}}_N|_1 - W_{MAX} = \Sigma[\text{sgn}(W_N(i)) * \text{Update}_N(i)] \quad (6).$$

Combining expressions (5) and (6), the direct re-scaling operation may be expressed as a ratio of the residual power and the power limit:

$$\underline{W}_{N+1} = (\underline{W}_N + \underline{\text{Update}}_N) * [1 + W_{RES}/W_{MAX}]^{-1} \quad (7).$$

Using the Taylor-series approximation, $[1+W_{RES}/W_{MAX}]^{-1} \approx [1-W_{RES}/W_{MAX}]$, expression (7) may be rewritten as follows:

$$\underline{W}_{N+1} \approx (\underline{W}_N + \underline{\text{Update}}_N) - [(\underline{W}_N + \underline{\text{Update}}_N) * W_{RES}/W_{MAX}] \quad (8).$$

Expression (8) may be implemented in a relatively small logic circuit considering that the term $(\underline{W}_N + \underline{\text{Update}}_N)$ may be obtained through integer addition, and, because $W_{RES}$ will usually be significantly smaller than $W_{MAX}$, the multiplication by $W_{RES}/W_{MAX}$ can be reduced to a right-shift, binary division operation. That is, $1/W_{MAX}$ involves a right shift by $\log_2(W_{MAX})$ bits, so long as $W_{MAX}$ is a power-of-two value (e.g., 128). Similarly, $W_{RES}$, which ranges from +5 to −5 in the five-driver embodiment of FIGS. 3 and 7, will be a power of 2 value in all cases except for +/−3 or +/−5, which may be rounded to a power of 2 number. In one embodiment, for example, +/−3 $W_{RES}$ values are alternately rounded to +/−2 and +/−4. $W_{RES}$ values of +/−5 are rounded to +/−4. Different rounding schemes may be used in alternative embodiments. For example, $W_{RES}$ values of +/−5 may be rounded by toggling between 8 and 4 (e.g., rounding to 8 once for every three roundings to 4).

Figure 8:
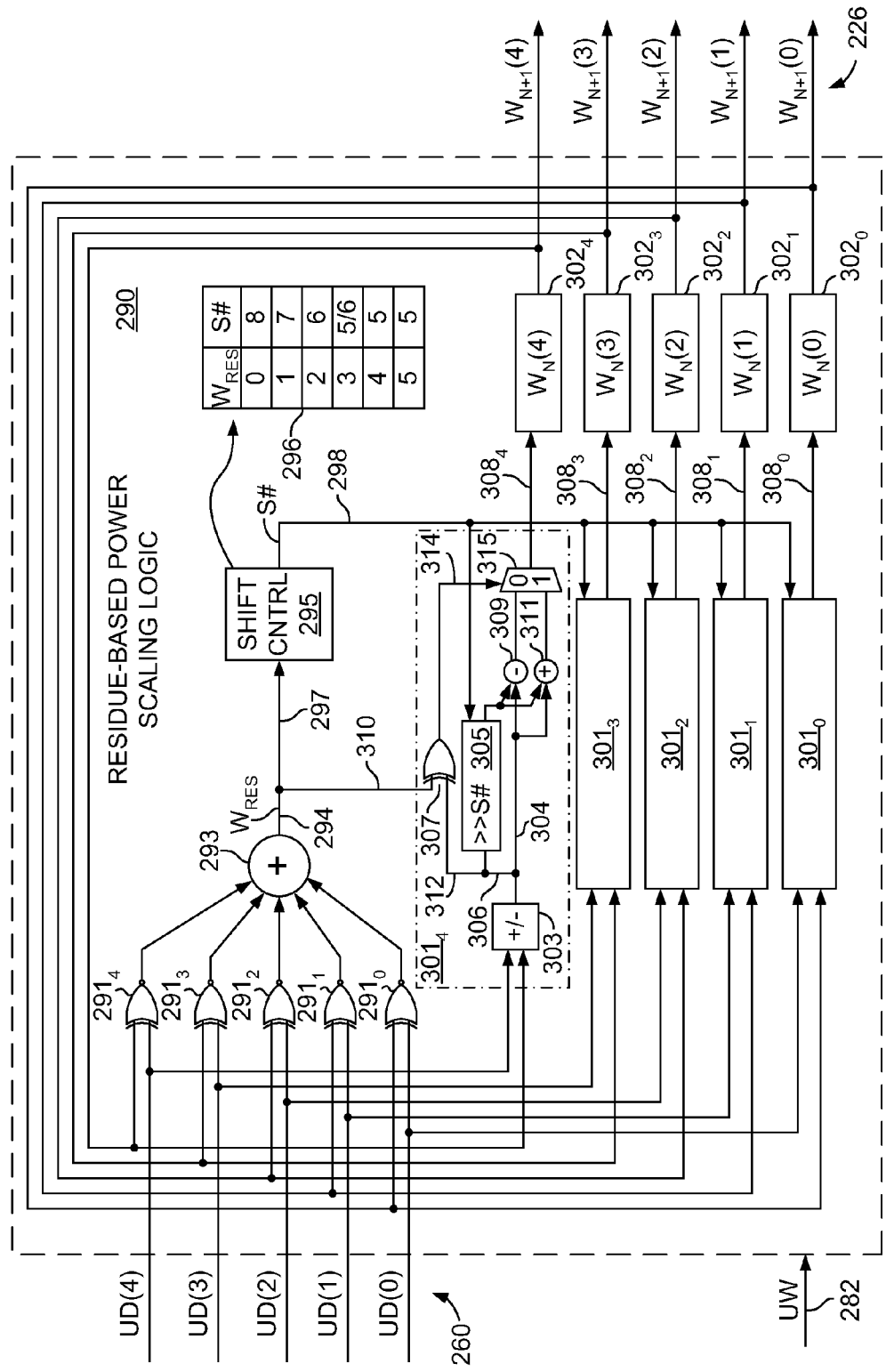
FIG. 8 illustrates a power scaling circuit according to an embodiment of the invention.

FIG. 8 illustrates a residue-based power scaling circuit 290 that outputs scaled, updated tap weights in accordance with the approximation set forth in expression (8). The power scaling circuit 290 includes a bank of exclusive-NOR gates $291_0$-$291_4$ that multiply the signs of the existing tap weights ($\underline{W}_N$) stored in registers $302_0$-$302_4$ with the signs of the update values 260 (i.e., UD(0)-UD(4)). A summation circuit 293 receives the outputs of the exclusive-NOR gates 291 and generates a sum that corresponds to the residual power ($W_{RES}$). That is, the summation circuit treats each logic '1' input as a +1 value and each logic '0' value as a −1 value, thereby generating a residual power value 294 that indicates the aggregate change in tap weights. In the embodiment of FIG. 8, the residual power value 294 is a sign-magnitude value having a sign component 310 (i.e., sign bit) that indicates whether the aggregate change in tap weights is positive or negative, and a magnitude component 297 that represents the absolute value of the aggregate change in tap weights. The magnitude component 297 of the residual power value 294 is input to a shift control circuit 295 that, in turn, generates a shift value 298 (S#), which corresponds to the number of bits by which an updated tap weight is to be right shifted to carry out a multiplication by $|W_{RES}|/W_{MAX}$. That is, the shift value 298 corresponds to $\log_2(W_{MAX}/|W_{RES}|)$. In the embodiment of FIG. 8, the maximum power is assumed to be 128 so that, as shown in logic table 296, the shift control circuit 295 generates a shift value 298 of eight when the residual power value 294 is zero; a shift value of seven when the residual power value is one; a shift value of six when the residual power is two; alternating shift values of five and six when the residual power value is three; and a shift value of five when the residual power value is greater than three.

The update values 260 and existing tap weights in registers 302 are also supplied to respective scaling circuits $301_0$-$301_4$ along with the shift value 298, and the sign component 310 of the residual power value 294. Referring to the detailed view of scaling circuit $301_4$, the update value, UD(4), and tap weight $W_N(4)$ are input to an increment/decrement circuit 303 which generates an updated tap weight value 304 having an incremented magnitude if the tap weight and update have the same sign (i.e., both positive or both negative) and a decremented magnitude if the tap weight and update have different signs. In the embodiment of FIG. 8, the updated tap weight value 304 includes a sign component 312 which is supplied to the first input of an exclusive-OR gate 307, and a magnitude component 306 which is supplied to a shifting circuit 305 (e.g., a barrel shifter). The second input of the exclusive-OR gate 307 is coupled to receive the sign component 310 of the residual power value 294 so that the exclusive-OR gate outputs a logic '1' select signal 314 to the select input of multiplexer 315 if the sign of the updated tap weight value and the sign component of the residual power are different, and a logic '0' select signal 314 if the sign components of the updated tap weight value and residual power are the same. The complete updated tap weight value 304 (i.e., sign and magnitude) is provided to difference circuit 309 and summing circuit 311. The shifting circuit 305 right shifts the magnitude component 306 of the updated tap weight 304 according to the shift value 298 to effectuate a multiply by $W_{RES}/W_{MAX}$ (or an approximation of $W_{RES}/W_{MAX}$) and outputs the resulting product to the summing circuit 311 and difference circuit 309. The summing circuit 311 adds the product generated by the shifting circuit 305 to the updated tap weight value 304 and, the difference circuit 309 subtracts the product generated by the shifting circuit 305 from the updated tap weight 304 to generate scaled-up and scaled-down updated tap weight values, respectively, which are provided, in turn, to first and second input ports of the multiplexer 315. By this arrangement, if the sign components 312 and 310 of the updated tap weight value 304 and residual power value 294, respectively, are the same, then the scaled-down updated tap weight value generated by the difference circuit 309 is selected by multiplexer 315 to be output as the updated tap weight $308_4$ (i.e., ultimately to become updated tap weight $W_{N+1}(4)$). If the sign components 312 and 310 of the updated tap weight value 304 and residual power value 294, respectively, are different, then the scaled-up updated tap weight value generated by the summing circuit 311 is selected by multiplexer 315 to be output as the updated tap weight $308_4$. Thus, in the case of a positive residual power value 294, a positive tap weight value is scaled down and a negative tap weight value is scaled up (i.e., made less negative) to reduce the power applied within the corresponding output driver. Conversely, in the case of a negative residual power value 294, a negative tap weight value is scaled down (i.e., made more negative) and a positive tap weight value is scaled up to increase the power applied within the corresponding output driver. Thus, each of updated tap weights $W_{N+1}(0)$-$W_{N+1}(4)$ is generated within a respective one of scaling circuits $301_0$-$301_4$ by adjusting the prior tap weight ($W_N$), multiplying the adjusted tap weight by the $W_{RES}/W_{MAX}$ approximation to generate a fractional component (i.e., the output of shifting circuit 305), then subtracting the fractional component from the updated tap weight (note that an addition occurs when a negative $W_{RES}$ is subtracted from the updated tap weight). That is, $\underline{W}_{N+1}$ is assigned the value: $(\underline{W}_N+\underline{Update}_N)-[(\underline{W}_N+\underline{Update}_N)*W_{RES}/W_{MAX}]$, the Taylor-series approximation set forth above in expression (8). In one embodiment, the updated tap weights $308_0$-$308_4$ are stored within the registers $302_0$-$302_4$ in response to assertion of the update-weight signal 282 (UW). Alternatively, the update-weight signal 282 is used to initiate operation of a finite state machine (or other logic circuit) which controls and times the increment, shift and subtract operations within the scaling circuits 301 and other logic circuits within the power scaling logic 290, culminating in storage of the updated tap weights 308 in registers 302. In either case, once stored, the updated tap weight values 308 become the existing tap weight values 226 that are supplied to the exclusive-NOR gates 291 and scaling circuits 301 to generate the next set of updated tap weights 308.

Figure 9:
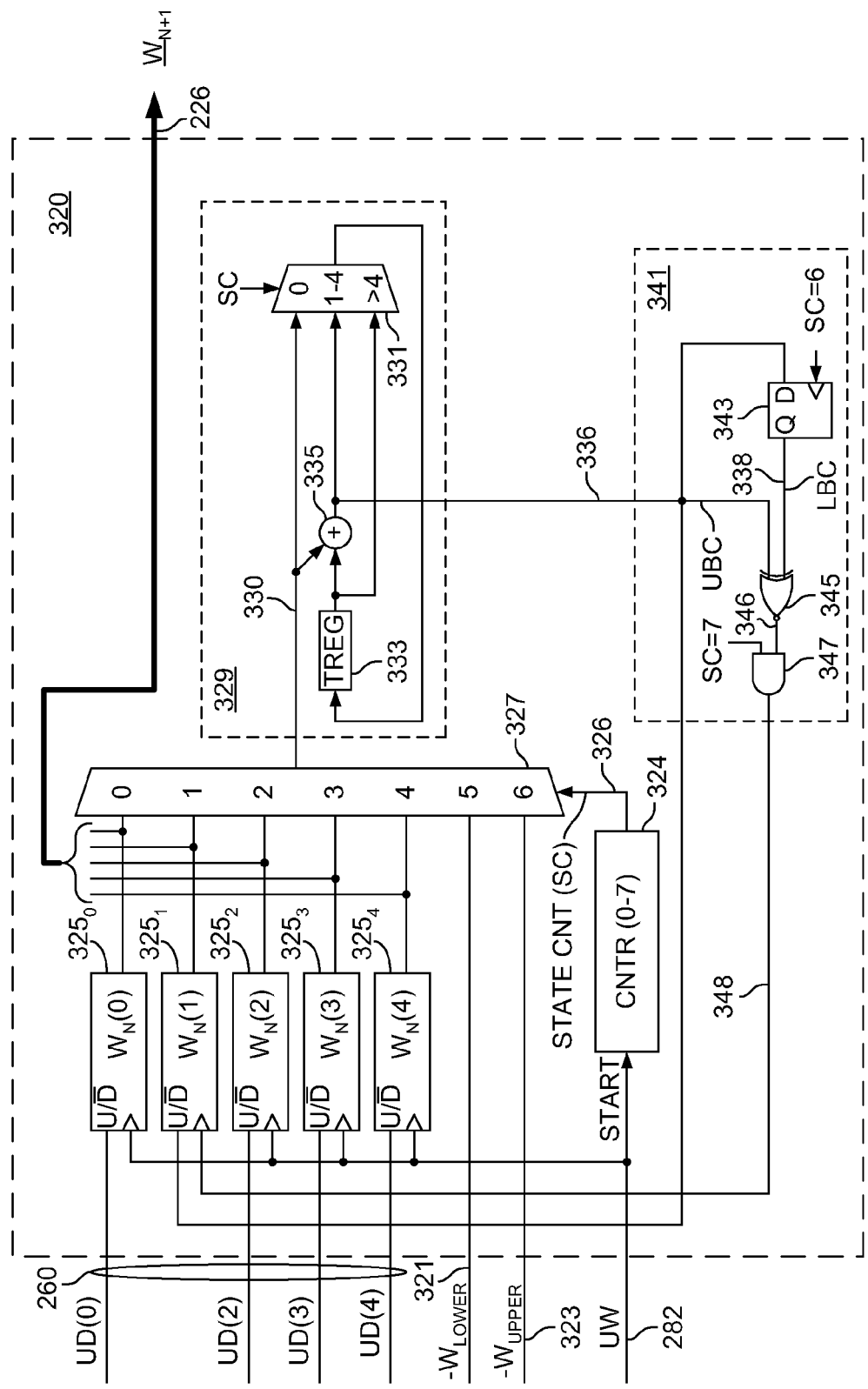
FIG. 9 illustrates a power scaling circuit according to another embodiment of the invention.

FIG. 9 illustrates an alternative embodiment of a power scaling logic circuit 320 referred to herein as a power bounding embodiment. In the power bounding embodiment, tap weight updates 260 are applied to adjust the pre-emphasis tap weights first (i.e., the tap weights applied to the pre- and post-tap drivers), then the magnitudes of the adjusted pre-emphasis tap weights and the primary driver tap weight are summed to generate an aggregate magnitude. The magnitude of the primary driver tap weight (i.e., the primary tap weight) is then decreased or increased if the aggregate magnitude exceeds the power constraint or falls below a predetermined lower bound, respectively. By this operation the total power applied to the transmit circuit output drivers is maintained between an upper and lower bound.

The power scaling logic 320 includes a set of tap weight counters $325_0$-$325_4$, state counter 324, operand multiplexer 327, accumulator 329, and primary update logic 341. Tap weight updates 260 for the pre- and post-tap driver tap weights are supplied to the power scaling logic 320 along with negative versions of upper and lower power bound values, 323 and 321, respectively, and the update-weight signal 282. At the start of an update event, the update-weight signal 282 is asserted to enable the tap weight counters for the pre- and post-tap weights (i.e., $325_0$ and $325_2$-$325_4$) to be incremented or decremented according to the state of the corresponding update signal 260. Assertion of the update weight signal also triggers the state counter 324 to roll over from a final state count of seven, to an initial state count of zero and enables the state counter 324 to auto increment from zero to seven. The state count 326 is supplied to the operand multiplexer 327 so that, as the state count 326 progresses from zero to six, the operand multiplexer 327 outputs, in turn, the magnitudes of the updated tap weights stored in counters $325_0$, $325_2$, $325_3$ and $325_4$, and the negative lower and upper power bounds, 321 and 323, to the accumulator 329.

The accumulator 329 includes a temporary register 333 (TREG), summing circuit 335 and multiplexer 331. The multiplexer 331 has a control input coupled to receive the state count 326 and three input ports coupled respectively to the outputs of the operand multiplexer 327, summing circuit 335 and temporary register 333. When the state count 326 is zero, the multiplexer 331 outputs the operand 330 selected by the operand multiplexer 327 (i.e., the magnitude of updated pre-tap weight, $|W_{N+1}(0)|$, maintained within tap weight counter $325_0$); when the state count 326 is one, two, three or four, the multiplexer 331 outputs the sum generated by the summing circuit, and when the state count 326 is five and above, the multiplexer 331 outputs the content of the temporary register. The summing circuit 335 has first and second inputs coupled respectively to the outputs of the operand multiplexer 327 and the temporary register 333. The temporary register 333 is coupled to receive the output of the multiplexer 331 and is re-loaded in response to each transition of the state count 326. By this arrangement, when the state count 326 is zero, the magnitude of the updated pre-tap weight, $|W_{N+1}(0)|$ is applied to the input of the temporary register 333. When the state count 326 transitions from zero to one, the temporary register 333 is loaded with the magnitude of the pre-tap weight, and the magnitude of the primary tap weight, $|W_N(1)|$ is output by the operand multiplexer 327 and summed with the magnitude of the pre-tap weight (i.e., the content of the temporary register 333) in summing circuit 335. The sum of tap weight magnitudes $W_{N+1}(0)$ and $W_N(1)$ is selected by the multiplexer 331 (i.e., in response to state count=1) and supplied to the input of the temporary register. Accordingly, when the state count 326 transitions from one to two, the sum of tap weight magnitudes $|W_{N+1}(0)|$ and $|W_N(1)|$ is loaded into the temporary register 333 and supplied to the summing circuit 335 for summation with the magnitude of the updated post-tap weight, $|W_{N+1}(2)|$ (i.e., the tap weight magnitude selected by the operand multiplexer 327 in response to state count=2). By this operation, as the state count 326 is incremented from zero to four, a sum of the tap weight magnitudes is accumulated in the temporary register 333, culminating in storage of the sum of the magnitudes of all the tap weights (i.e., $|W_{N+1}(0)|+|W_N(1)|+|W_{N+1}(2)|+|W_{N+1}(3)|+|W_{N+1}(4)|$) within the temporary register 333 when the state count 326 transitions from four to five. The sum of magnitudes of all the tap weights represents the power in the updated tap weights, prior to updating the primary tap weight and is referred to herein as a proposed power value. When the state count 326 is five and above, the multiplexer 331 selects the output of the temporary register to be re-loaded into the temporary register, effectively placing the temporary register 333 in a hold state to maintain the proposed power value therein. In an alternative embodiment, the temporary register 333 is not re-loaded after the count value reaches 5, thereby maintaining the proposed power value in the temporary register 333.

Still referring to FIG. 9, when the state count 326 reaches five, the operand multiplexer 327 outputs the negative lower power bound 321 to the accumulator 329 which, by operation of summing circuit 335, subtracts the lower power bound value 321 from the proposed power value. The sign of the difference between the proposed power value and lower power bound value 321 constitutes a lower-bound comparison result (LBC) that indicates whether the proposed power value is greater than (or equal to) the lower power bound value (i.e., LBC=0) or less than the lower power bound (LBC=1) and is supplied to the primary update logic 341. The primary update logic includes a storage element 343 (e.g., a D flip-flop as shown in FIG. 9, a latch or other storage circuit), exclusive-NOR gate 345 and logic AND gate 347. As the state count 326 transitions from five to six, the lower-bound comparison result 338 is stored in the storage element 343 and is output therefrom as a stored lower bound compare result 338 until the next five-to-six state count transition. Also, the operand multiplexer 327 selects the negative upper power bound value 323 to be summed with the proposed power value in summing circuit 335, effectively subtracting the upper power bound value 323 from the proposed power value. The sign of the difference between the proposed power value and the upper power bound value 323 constitutes an upper-bound comparison result 336 (UBC) that indicates whether the upper power bound is greater than the proposed power value (i.e., sign=1) or less than or equal to the proposed power value (i.e., sign=0). Thus, as the state count transitions from six to seven, the upper- and lower-bound compare results 336 and 338 indicate equalities (and inequalities) adjustments to the primary tap weight, as shown in the following table (PP=Proposed Power, UB=Upper Bound, LB=Lower Bound, PTW=Primary Tap Weight):

TABLE 1

| UBC | LBC | Equality Indication | Update PTW? | PTW Adjustment |
| --- | --- | --- | --- | --- |
| 0 | 0 | PP ≥ UB | 1 (Yes) | Decrement PTW |
| 0 | 1 | Invalid (PP ≥ UB & PP < LB) | 0 (No) | — |
| 1 | 0 | UB > PP ≥ LB | 0 | No Adjustment |
| 1 | 1 | PP < LB | 1 | Increment PTW |

Still referring to FIG. 9, the upper-bound compare result 336 and stored lower-bound compare result 338 are supplied to respective inputs of the exclusive-NOR gate 345 to generate a primary tap weight update signal 346 in accordance with Table 1. The AND gate 347 receives the primary tap weight update signal 346 at a first input and an indication that the state count has reached seven at a second input. By this arrangement, as the state count transitions from six to seven, the AND gate 347 asserts an update enable signal 348 if the lower- and upper-bound compare results have the same state (i.e., either both '1's or both '0's). The update enable signal 348 is supplied to a count enable input (i.e., strobe input) of the primary tap weight counter $325_1$, and the upper-bound compare result 336 is supplied to an up/down input of the counter $325_1$. Consequently, if the update enable signal is asserted, the primary tap weight is incremented in response to a logic '1' upper-bound compare result 336 (i.e., indicating that both UBC and LBC are high and therefore that the proposed power is below the lower bound) and decremented in response to a logic '0' upper-bound compare result 336 (i.e., indicating that both UBC and LBC are low and therefore that the proposed power is above or equal to the upper power bound 323). Note that the upper power bound value 323 input to the power scaling logic 320 may be one greater than the actual upper power bound so that the upper-bound compare result 336, when low, indicates that the proposed power is above the upper power bound value 323 and, when high, indicates that the proposed power is below or equal to the upper bound power bound value 323.

Reflecting on the operation of the power scaling logic 320, it can be seen that the proposed power may, in some instances, be greater than the upper power bound or less than the lower power bound by more than one (e.g., if the power in the initial tap weights matches the upper power bound and the magnitude of more than one tap weight is increased). In one embodiment, this circumstance is tolerated, as iterative adjustment of the primary tap weight will ultimately bring the applied power within the power constraint. In an alternative embodiment, the primary tap weight may be adjusted in each tap weight update cycle according to difference between the proposed power and upper power bound (or lower bound), thereby ensuring that the power constraint will be met in each update. In either embodiment, after the primary tap weight is adjusted, the complete set of updated tap weights may be provided to the transmit circuit, for example, via the back channel 225 shown in FIG. 3. Alternatively, as with the residue-based power scaling logic of FIG. 8, the power scaling logic 320 may be implemented in the transmit-side IC device, with the update values (or error sign values and data sign values) being provided via the back channel 225 or other signaling path.

Differential Samplers

Figure 10:
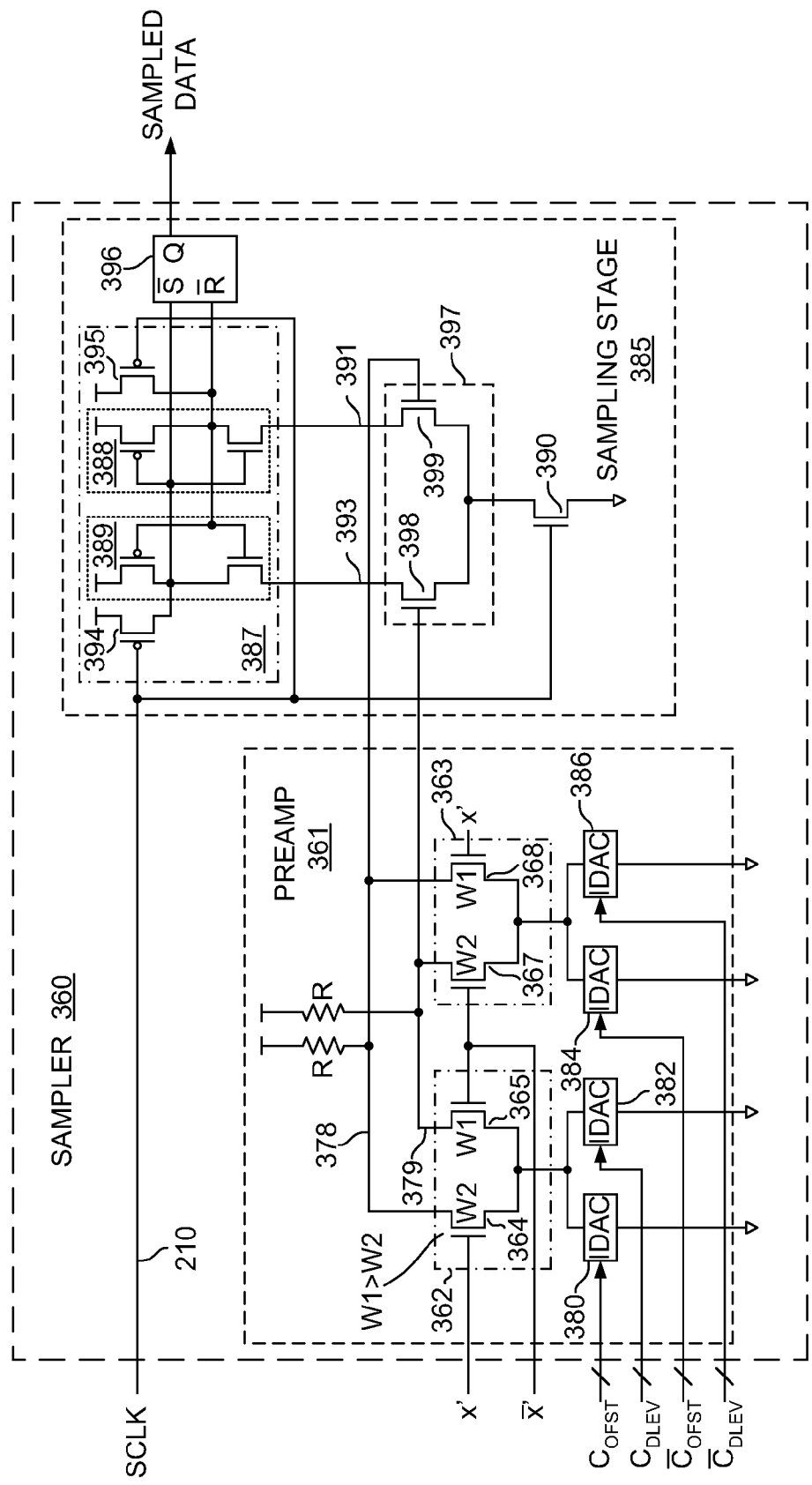
FIG. 10 illustrates an embodiment of a differential sampler that may be used to implement the data sampler and adaptive sampler shown in FIG. 3.

FIG. 10 illustrates an embodiment of a differential sampler 360 that may be used to implement the data sampler 211 and adaptive sampler 213 of FIG. 3. The sampler 360 includes a preamplifier stage 361 and sampling stage 385. The preamplifier stage 361 includes a pair of differential amplifiers 362 and 363 each biased by a respective pair of current DACs (IDACs) 380/382 and 384/386, and each having first and second output nodes 378 and 379 coupled to a supply voltage via a respective resistive element, R. The resistive elements may be implemented, for example, using diode-configured transistors, biased transistors, resistors, or any other active or passive circuitry for establishing a resistance. Transistors 365 and 364 within differential amplifier 362 have widths W1 and W2, respectively, with W1 being greater than W2. Transistors 368 and 367 within differential amplifier 363 also have respective widths W1 and W2. A differential input signal composed of signal component signals x' and /x' is provided to each of the differential amplifiers 362, 363 with x' being provided to gate terminals of transistors 364 and 368 and /x' being provided to gate terminals of transistors 365 and 367. By this arrangement, when control values $C_{OFST}$ and $C_{DLEV}$ (e.g., generated by an adaptive module as described in reference to FIG. 7) are substantially equal to complement control values /$C_{OFST}$ and /$C_{DLEV}$, respectively (e.g., in an 8-bit control word, $C_{DLEV}$=$C_{OFST}$=128 and /$C_{DLEV}$=/$C_{OFST}$=127), the differential amplifiers 362 and 363 are substantially balanced, operating in effect as a single differential amplifier having component transistors of width W1+W2. Thus, if x' is greater than /x', transistors 364 and 368 will collectively sink more current than transistors 365 and 367, thereby causing the voltage on output node 378 to be pulled down (i.e., via the resistive element, R, coupled to the output node 378) more than the voltage on output node 379.

When the preamplifier stage 361 is balanced (i.e., control values substantially equal to complement control values), the voltages on the preamplifier output nodes 378 and 379 are substantially equal when input signals x' and /x' are at the common mode potential (i.e., as when x' and /x' cross one another in transition). Thus, in the absence of systematic DC offset, the effective threshold of the preamplifier stage 361, and therefore the sampler 360 as a whole, occurs at the common mode of x' and /x'. By contrast, when the preamplifier is imbalanced, for example, by increasing $C_{DLEV}$ relative to /$C_{DLEV}$, equal values of x' and /x' result in output node 379 being pulled lower than output node 378 due to the fact that transistor 365 is wider than transistor 364 (and therefore has a greater gain), and that the compensating (balancing) effect of differential amplifier 363 is diminished by the reduced control value /$C_{DLEV}$. Thus, increasing $C_{DLEV}$ relative to /$C_{DLEV}$ increases the effective threshold of the preamplifier above the common mode. By increasing $C_{DLEV}$ to the point at which the threshold between '0' and '1' signal levels is set to the target data level, DLEV, a sampler having a threshold level at DLEV is achieved. By reversing the connections of the $C_{DLEV}$ and /$C_{DLEV}$ values to the current DACs of a counterpart sampler (not shown), a sampler having a threshold level at −DLEV is achieved. Such a technique is applied in a multi-level signaling embodiment described below.

Still referring to the preamplifier stage 361, it should be noted that in the case of a binary data sampler, such as element 211 of FIG. 3, the desired threshold occurs at the common mode of the incoming data signals (i.e., the "zero" threshold). Accordingly, in a sampler dedicated to binary data sampling, the current DACs 382 and 386 may be omitted or replaced with fixed-bias, or self-biased current sources.

The sampling stage 385 includes a differential amplifier 397 formed by transistors 398 and 399, a sense amplifier 387 formed by back-to-back coupled inverters 388 and 389, and a storage circuit 396 formed by a set-reset flip-flop. The differential amplifier 397 includes control inputs coupled to the output nodes 378 and 379, respectively, of the preamplifier stage 361, and output nodes 391 and 393 coupled to source terminals of the inverters 388 and 389, respectively. A biasing transistor 390, switchably controlled by the sampling clock signal 210 (or other sample control signal), is coupled between the differential amplifier 397 and a ground reference (or other low voltage reference). The sampling clock signal 210 is additionally coupled to control inputs of positively-doped MOS (PMOS) transistors 394 and 395 which are coupled between a supply voltage (e.g., $V_{DD}$) and output nodes of the inverters 388 and 389. By this arrangement, when the sampling clock signal 210 is low, transistor 390 is switched off, and transistors 394 and 435 are switched on to pre-charge the output nodes of the inverters 388 and 389 to the supply voltage. The output nodes of the inverters 388 and 389 are coupled to active-low set and reset inputs, respectively, of the storage circuit 396, so that the content of the storage circuit 396 is maintained through the low half-cycle of the sampling clock signal 210. When the sampling clock signal 210 goes high, biasing transistor 390 is switched on and draws current through the two transistors 399 and 398 of the differential amplifier 397 in proportion to the voltages developed on the output nodes 378 and 379 of the preamplifier stage 361. Thus, if the voltage developed on node 379 is higher than the voltage on node 378, the current drawn by biasing transistor 390 will flow primarily through transistor 398. Conversely, if the voltage developed on node 378 is higher than the voltage on 379, the current drawn by biasing transistor 390 will flow primarily through transistor 398. Transistors 394 and 395 are switched off in response to the high-going sampling clock signal 210 so that the pre-charged outputs of the inverters 388 and 389 are discharged by currents flowing through transistors 398 and 399. By this operation, if the incoming differential signal (x') exceeds the common mode voltage, (i.e., (x'+/x')÷2), by more than the target data level threshold (i.e., the incoming differential signal exceeds the target threshold level, DLEV), the current drawn by biasing transistor 390 will flow primarily through transistor 398. Consequently, the output node of inverter 389 will be discharged more rapidly than the output node of inverter 388, driving the output of inverter 389 low and driving the output of inverter 388 high (i.e., the PMOS transistor within inverter 388 is switched on and the NMOS transistor within inverter 388 is switched off). The low output of inverter 389 is applied to the active-low set input of the storage circuit 396, causing the storage circuit 396 to store a logic '1' sampled data value. By contrast, if the incoming signal level does not exceed the target data level threshold, the current drawn by biasing transistor 390 will flow primarily through transistor 399, thereby driving inverter 388 low (and driving inverter 389 high) to store a logic '0' sampled data value within storage circuit 396.

Still referring to FIG. 10, during a DC offset calibration operation, null-valued differential signals are applied to the differential inputs of the preamplifier stage 361 either by transmission of null valued data over the signaling path (i.e., x=/x), or by locally coupling the differential inputs to one another such that x'=/x' (e.g., by activation of one or more pass-gate-configured transistors in response to a calibration signal). In the case of transmission of null valued data, if a DC offset in the differential signals is induced by the signaling path, or if the preamplifier stage 361 or sampler stage 385 have systematic DC offsets (e.g., due to threshold voltage ($V_T$) mismatches in the differential transistor pairs 364/365, 367/368 and/or 398/399), then the effective threshold of the sampler 360 will not occur at the common mode of x and /x (i.e., the transmit-side common mode). Similarly, in the case of local, switched coupling of differential inputs (i.e., to force a common mode input to transistor pairs 364/365 and 367/368), the effective threshold of the sampler 360 will not occur at the common mode if the preamplifier stage or sampler stage exhibit systematic DC offsets. In either case, the non-common-mode threshold may be detected in an offset calibration operation by the repeated positive or negative sign of the sampled data, and the $C_{OFST}$ value may be incremented or decremented (and /$C_{OFST}$ correspondingly decremented or incremented) as discussed above to bias the sampler to a calibrated state.

Figure 11:
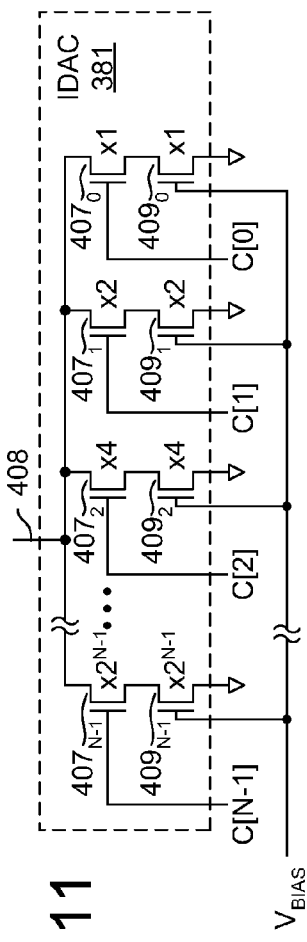
FIG. 11 illustrates an embodiment of a current DAC that may be used to implement the current DACs within the sampler of FIG. 10.

FIG. 11 illustrates an embodiment of a current DAC 381 that may be used to implement the current DACs 380, 382, 384 and/or 386 within the sampler 360 of FIG. 10, and/or the current DAC 237 within the output driver of FIG. 5. The current DAC 381 includes control transistors $407_0$-$407_{N-1}$ and biasing transistors $409_0$-$409_{N-1}$. Each of the control transistors $407_0$-$407_{N-1}$ is coupled in series (e.g., source to drain) with a corresponding one of the biasing transistors $409_0$-$409_{N-1}$ to form a transistor pair that is coupled between a reference voltage (ground in this example) and an output node 408 (i.e., the node to be connected to the source terminals of the transistors which form the differential amplifier 362 of FIG. 10). Gate terminals of the control transistors $407_0$-$407_{N-1}$ are coupled to receive respective component signals, C[0]-C[N-1], of a multi-bit control value, such as a data level threshold, DC offset setting, tap weight, or other control value. Each of the control transistors $407_0$-$407_{N-1}$ has a binary weighted gain such that a current of $I_{REF}$ x$2^i$ (where i represents the $i^{th}$ transistor in the positions 0, 1, 2, ..., N−1) flows through control transistor $407_i$ when the corresponding control signal component is high. Thus, if all the constituent bits of the control value C[N−1:0] are high, then $I_{REF}$ flows through control transistor $407_0$, $I_{REF}$ x2 flows through transistor $407_1$, $I_{REF}$ x4 flows through control transistor $407_2$, and so forth to control transistor $407_{N-1}$ which conducts $I_{REF}$ x$2^{N-1}$. Accordingly, control transistors $407_0$-$407_{N-1}$ are designated x1, x2 ..., x$2^{N-1}$ transistors, respectively. By this arrangement, the control value C[N−1:0] may be set to any of $2^N$ values to select bias currents that range from 0 to $I_{REF}$ x$2^{N-1}$ in increments of $I_{REF}$. The biasing transistors $409_0$-$409_{N-1}$ have gate terminals coupled to receive a bias voltage, $V_{BIAS}$, that is adjusted as necessary (e.g., by a biasing circuit) to establish or maintain a desired $I_{REF}$.

In one embodiment, the relative gains (i.e., transconductance values) of the various transistors used to implement the current DAC 381 are established by adjusting the width-length ratio (i.e., W/L) of individual control transistors 407 and/or biasing transistors 409. For example, the width-length ratio of the x2 control transistor $407_1$ is twice the width-length ratio of the x1 control transistor $407_0$, the width-length ratio of the x4 control transistor $407_2$ is twice the width-length ratio of the x2 control transistor $407_1$, and so forth. The biasing transistors 409 may have similar gain ratios relative to one another (e.g., x1, x2, x4, x$2^{N-1}$ as shown in FIG. 11). Other techniques for adjusting the relative gains of the control transistors 407 and biasing transistors 409 may be used in alternative embodiments. Also, weightings other than binary weightings may be used. For example, in one embodiment, each of the control transistors 407 has an equal gain to each of the other control transistors 407 such that the current drawn by the current DAC 381 is proportional to the number of logic '1' bits in the control value, C[N−1:0].

Figure 12:
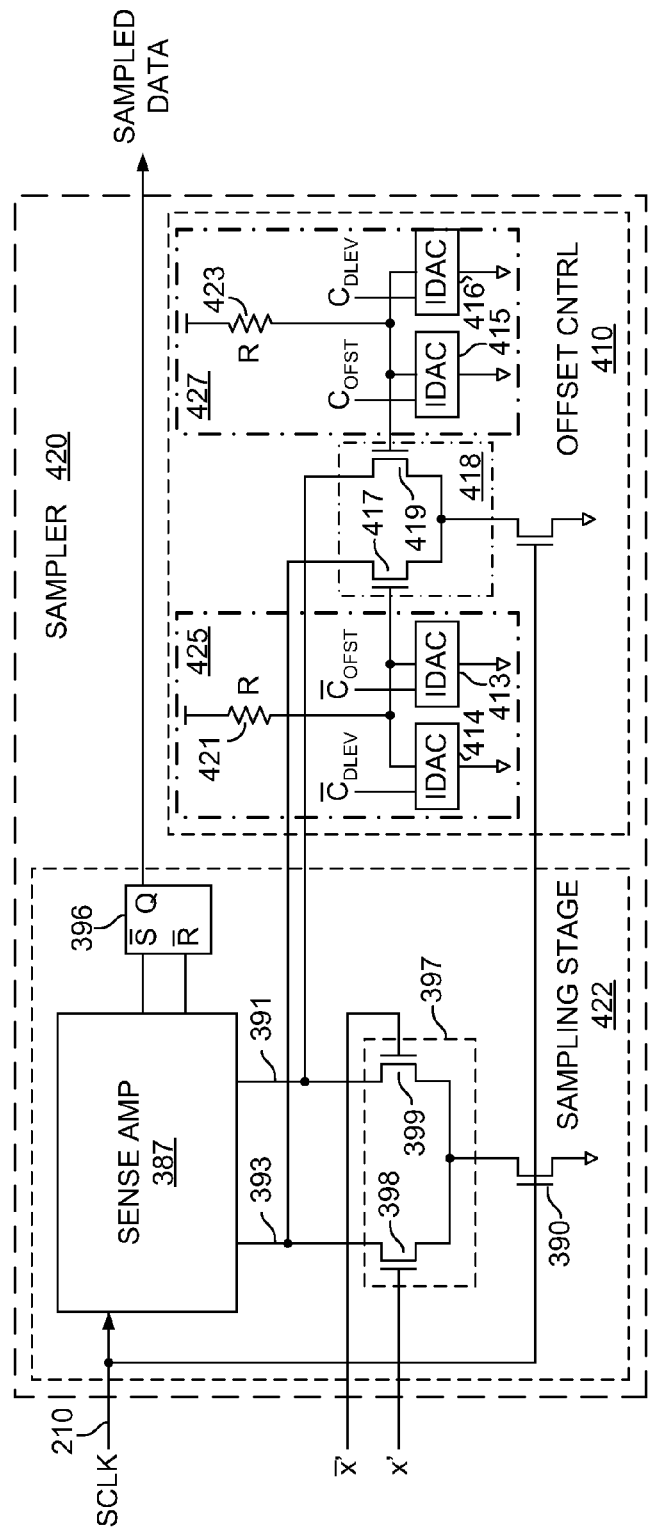
FIG. 12 illustrates an alternative embodiment of a sampler that may be used to implement the data sampler and adaptive sampler shown in FIG. 3.

FIG. 12 illustrates an alternative embodiment of a sampler 420 that may be used to implement the data sampler 211 and adaptive sampler 213 of FIG. 3. The sampler 420 includes a sampling stage 422 and an offset control circuit 410. The sampling stage 422 is implemented in generally the same manner as the sampling stage 385 of FIG. 10 (and includes differential amplifier 397, sense amplifier 387, biasing transistor 390, and storage circuit 396), except that the input signal lines carrying x' and /x' are coupled directly to the control terminals of transistors 398 and 399, respectively. The offset control circuit 410 includes a differential amplifier 418 having output nodes coupled to nodes 391 and 393 of the sampling stage 422. Control terminals of transistors 417 and 419 of the differential amplifier 418 are biased by respective voltage DACs 425 and 427. Voltage DAC 427 includes current DACs 415 and 416 coupled to a resistive pull-up element 423 and controlled by control values $C_{DLEV}$ and $C_{OFST}$, respectively. Voltage DAC 425 similarly includes current DACs 413 and 414 coupled to a resistive pull-up element 421 and controlled by complement control values /$C_{DLEV}$ and /$C_{OFST}$. By this arrangement, when the sampling clock signal 210 goes high, the current through output node 393 of the sampling stage 422 is a sum of the currents drawn by transistor 398 of the sampling stage 422 and transistor 417 of the offset control circuit 410. Similarly, the current through node 391 of the sampling stage 422 is a sum of the currents drawn by transistor 399 of the sampling stage 422 and transistor 419 of the offset control circuit 410. As discussed above in reference to FIG. 17, when the current through node 391 exceeds the current through node 393, a logic '1' is stored within storage circuit 396 and, conversely, when the current through node 393 exceeds the current through node 391, a logic '0' is stored within storage circuit 396.

When the complementary DAC control values $C_{DLEV}$ and /$C_{DLEV}$, and $C_{OFST}$ and /$C_{OFST}$ are substantially the same, and in the absence of DC offset, the sampler 420 is balanced the effective threshold occurs at the common mode of the incoming x' and /x' signal levels. That is, if x' exceeds the common mode voltage, $V_{CM}=(x'+/x')+2$, the current through node 393 exceeds the current through node 391, causing a logic '1' to be captured as the sampled data value. As $C_{DLEV}$ is increased and $/C_{DLEV}$ correspondingly decreased, the effective threshold of the differential amplifier is increased such that x' must be higher than /x' by an amount necessary to overcome the additional current drawn by transistor 419 of the offset control circuit 410. Thus, by increasing $C_{DLEV}$ and decreasing $/C_{DLEV}$, the effective threshold of the sampling circuit 420 may be set to the target data level threshold. That is, a logic '1' is output as the sampled data value if the difference between x' and /x' exceeds the target data level threshold, and a logic '0' is output otherwise. By reversing the connections of the $C_{DLEV}$ and $/C_{DLEV}$ values to the current DACs 416 and 414, a sampler having a threshold level at −DLEV is achieved. Such a technique is applied in a multi-level signaling embodiment described below.

As with the sampler 360 of FIG. 10, during an offset calibration operation within the sampler 420, null-valued differential signals are applied to the differential inputs of the sampling stage 422 either by transmission of null valued data over the signaling path (i.e., x=/x), or by locally coupling the differential inputs to one another such that x'=/x' (e.g., by activation of one or more pass-gate-configured transistors in response to a calibration signal to switchably couple the gates of transistors 398 and 399). In either case, the non-common-mode threshold may be detected in an offset calibration operation by the repeated positive or negative sign of the sampled data, and the $C_{OFST}$ value may be incremented or decremented (and $/C_{OFST}$ correspondingly decremented or incremented, respectively) to bias the sampler 420 to a calibrated state.

Still referring to FIG. 12, in the case of a binary data sampler such as sampler 211 of FIG. 3, the desired threshold occurs at the common mode of the incoming data signals (i.e., the "zero" threshold). Accordingly, in a sampler dedicated to binary data sampling, the current DACs 414 and 416 may be omitted or replaced with fixed-bias, or self-biased current sources.

Updating Tap Weights in Response to Data Level Error

Figure 13:
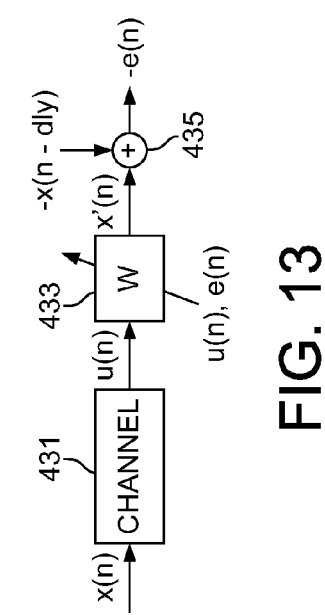
FIG. 13 is a canonical diagram of a channel and receive-side equalizer that may be used to adaptively determine a set of equalizer tap weights.

FIG. 13 is a canonical diagram of a channel 431 and receive-side equalizer 433 that may be used to adaptively determine a set of equalizer tap weights. An input signal, x(n), is transformed as it propagates through the channel, yielding a channel response, u(n) which, in turn, is operated upon by the receive-side equalizer 433 to produce a system response, x'(n). The system response is input to a sampler 435 (or comparator) which subtracts a delayed version of the originally transmitted signal (−x(n−dly)) from the system response to produce a negative error signal, −e(n). Thus, the error signal e(n) represents the difference between the originally transmitted signal, x(n) and system response x'(n) and is negative when system response exceeds the originally transmitted signal and positive when the originally transmitted signal exceeds the system response. Together, the channel response and the error signal may be used to update the equalizer tap weights, for example, through application in a least mean square error determination.

Figure 14A:
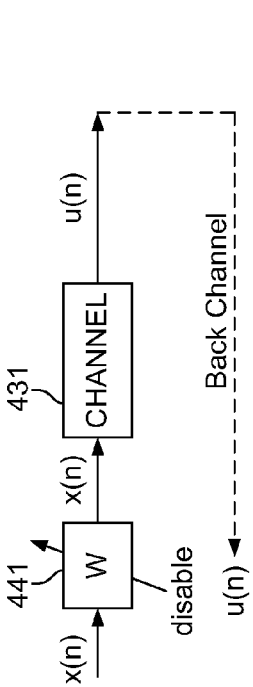
FIGS. 14A and 14B are canonical diagrams that illustrate adaptive determination of transmit pre-emphasis tap weights using a two-phase update operation.
Figure 14B:
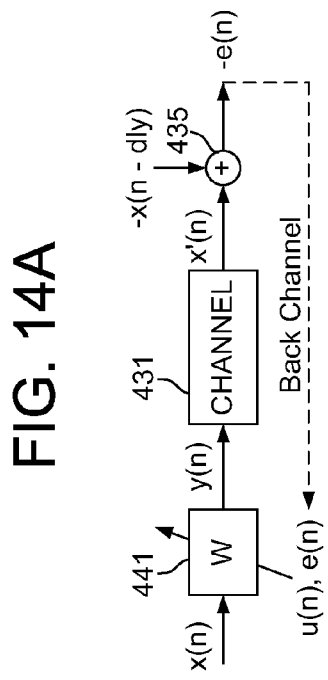

Assuming a linear channel response, the linear filtering effect of the equalizer is commutative and therefore may be applied to the input signal, x(n), before the signal is transmitted on the channel 431. That is, instead of receive-side equalization, transmit-side pre-emphasis may be used to establish a pre-emphasized input signal, y(n) which, after propagating through the channel 431, yields a system response x'(n) that corresponds to the system response x'(n) realized in the receive-side equalization system of FIG. 13. Unlike the receive-side equalizing system of FIG. 13, however, the channel response is generally unavailable to the transmit side of the signaling system, complicating tap weight update operations. In one embodiment of the invention, depicted in the canonical diagrams of FIGS. 14A and 14B, a two phase approach is used to update the tap weights. In the first phase, transmit pre-emphasis taps within a transmit circuit (i.e., post-taps and pre-taps) are disabled so that the input signal, x(n) is unmodified by the transmit pre-emphasis circuitry 441, and propagates through the channel 431 to produce a channel response u(n). By this operation, the channel response, u(n), is effectively pre-computed by the channel 431 itself. In the embodiment of FIG. 14A, the channel response, u(n), is returned to the transmit-side device (e.g., through a back channel or other communication path), where it is stored for later application in a tap weight update operation. Alternatively, the channel response, u(n), is stored by the receive-side device. After the channel response has been obtained, the second phase of the tap weight operation is begun by enabling the pre-emphasis circuitry 441, and then re-transmitting the initial signal, x(n). In the second phase, the pre-emphasis circuitry 441 modifies the initial signal, x(n), to generate a pre-emphasized signal, y(n), which, in turn, propagates through the channel 431 to generate the system response, x'(n). The system response, x'(n), is compared with the delayed version of the initial signal (the delay corresponding, for example, to channel propagation time) to generate an error signal, −e(n). In the embodiment of FIG. 14B, the error signal is provided to the transmit-side device where it is applied, along with the previously stored channel response, u(n), in a tap weight update operation. Alternatively, if the channel response is stored in the receive-side device, the error signal and channel response may be applied by the receive side device to generate a set of tap weight update values, or a set of updated tap weights. The update values (or tap weights) are then returned to the transmit side device and used to update the existing tap weights applied within the pre-emphasis circuitry 441 (or, in the case of updated tap weights, substituted for the existing tap weights).

In one embodiment, the tap weight update operation is a sign-sign LMS operation in which the sign of the channel response and sign of the error signal are used to update the tap weights as follows:

$$\underline{W}_{N+1}=\underline{W}_N+\text{stepsize}*\text{sign}(e_n)*\text{sign}(\underline{u}_n) \qquad (9).$$

Thus, only the signs of the channel response and error signal need be returned to the transmit-side device (or stored in the receive side device) in the first and second phases of a tap weight update operation. After the transmit pre-emphasis tap weights have been updated, two-phase tap weight update operations are repeated as necessary for the pre-emphasis tap weights to converge to a setting that corresponds to a minimum (or near-minimum) mean square error, and thereafter to compensate for system drift (e.g., due to changes in voltage and temperature). Note that by updating the tap weights in this way, the receiver response is included in the channel response.

Figure 15:
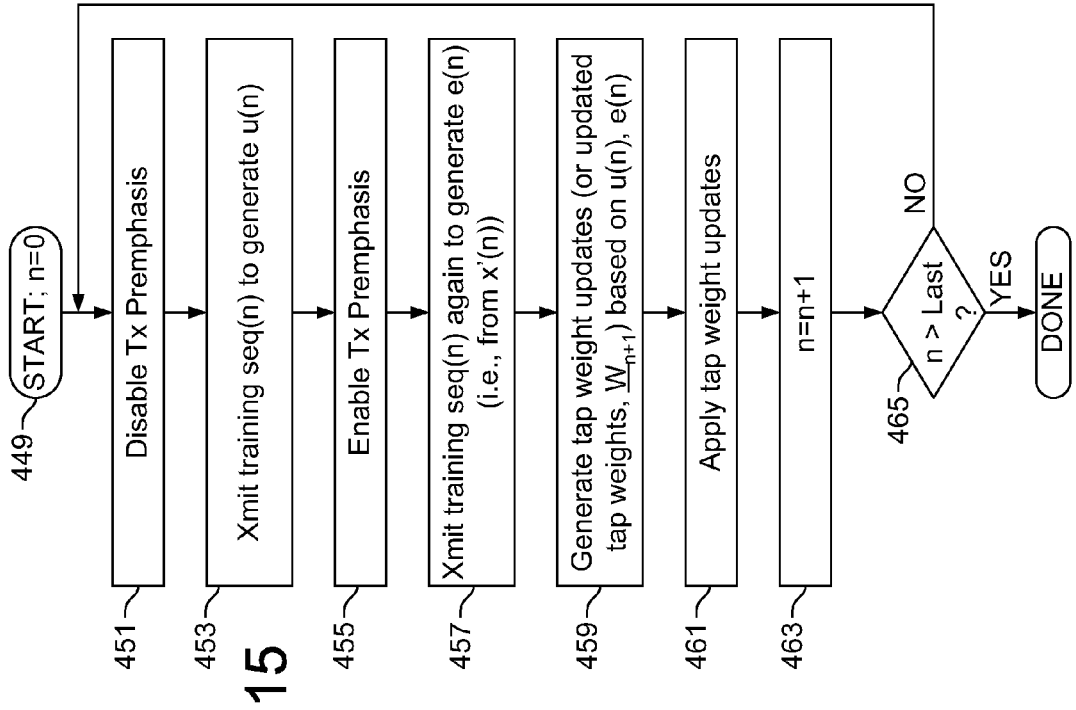
FIG. 15 is a flow diagram of the two-phase tap weight update operation described in reference to FIGS. 14A and 14B.

FIG. 15 is a flow diagram of the two-phase tap weight update operation described in reference to FIGS. 14A and 14B. Initially, at start block 449, an index, n, that indicates the number of completed tap weight updates is initialized to zero. At block 451, the transmit pre-emphasis circuitry is disabled. At block 453, a first sequence of data values, referred to herein as training sequence(n), is transmitted over the channel (e.g., a differential or single-ended signal path) to generate the channel response u(n). At block 455, the transmit pre-emphasis circuitry is enabled so that an initial setting of tap weights (i.e., in the first iteration) are applied to generate the pre-emphasized signal y(n) illustrated in FIG. 14B. In one embodiment, the initial setting of tap weights includes zero-valued pre- and post-tap weights, and a maximum-valued primary tap weight. In alternative embodiments, the initial setting of tap weights may be determined according to system characteristics or empirical determination of a desired tap weight setting. At block 457, training sequence(n) is re-transmitted to generate a system response, x'(n) and corresponding error signal, e(n). At block 459, tap weight updates (i.e., stepsize*sign($u_n$)*sign($e_n$)), or updated tap weights themselves (i.e., $\underline{W}_{n+1}$) are generated based on the channel response and error signal. At block 461, the tap weight updates generated in block 459 are applied to update the existing tap weights (or the updated tap weights generated in block 459 are substituted for the existing tap weights), and, at block 463, the index variable, n, is incremented to indicate that a first tap weight update has been completed.

In the embodiment of FIG. 15, an overall tap weight adaptation operation involves iteratively performing the operations of blocks 451-463 a predetermined number of times. In such an embodiment, the index variable, n, is evaluated at decision block 465 to determine if n has been incremented past a predetermined value. If so, the tap weight update operation is deemed to be complete. In an alternative embodiment, the operations of blocks 451-463 are repeated until tap weight updates result in negligible reduction in the error signal. In another alternative embodiment, the operations of blocks 451-463 are repeated until all or a subset of the tap weights are determined to be dithering by one or more steps.

Reflecting on the adaptive generation of pre-emphasis tap weights achieved by iteratively performing the two-phase tap weight updates described in reference to FIGS. 14A, 14B and 15, it can be seen that the repeated determination of the channel response, u(n), enables a statistical approximation of random noise. That is, in the absence of random noise, like channel responses will be obtained in block 453 for like training sequence transmissions. Thus, by iteratively performing the two-phase tap weight updates described in reference to FIGS. 14A, 14B and 15, the pre-emphasis tap weights effectively converge to solution that represents a minimum (or near minimum) mean squared error.

Figure 16:
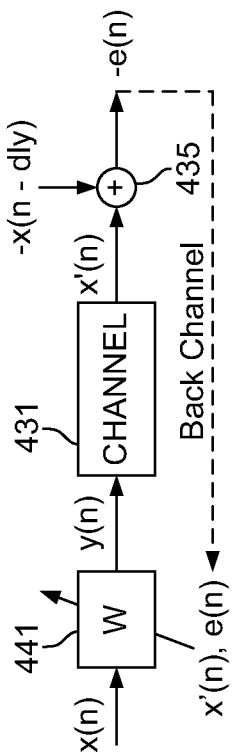
FIG. 16 is a canonical diagram that illustrates adaptive determination of transmit pre-emphasis tap weights using a single-phase update operation.

FIG. 16 illustrates a single-phase tap weight adaptation approach that neglects the effects of noise, and therefore constitutes a zero-forcing solution. Rather than disabling the pre-emphasis circuitry 441 as in the first phase of the two-phase operation of FIGS. 14A and 14B, the pre-emphasis circuitry 441 is left enabled to generate a pre-emphasized input signal, y(n) which, after propagating through the channel 431, yields a system response x'(n) that corresponds to the system response realized in the receive-side equalization system of FIG. 13. The system response is compared with a delayed version of the input signal (i.e., -x(n-dly)) to generate an error signal, -e(n). The system response and error signal are then supplied to the transmit side device and applied in a tap weight update operation. As in the two-phase approach, the tap weight update operation may alternatively be performed in the receive-side device and tap weight updates, or updated tap weights themselves communicated to the transmit-side device (e.g., via a back channel). In one embodiment, the signs of the system response and error signal are applied in the tap weight update operation in accordance with expression (3) above (i.e., a sign-sign LMS update operation). By this operation the pre-emphasis tap weights are iteratively adjusted to achieve a zero-forcing solution.

Figure 17:
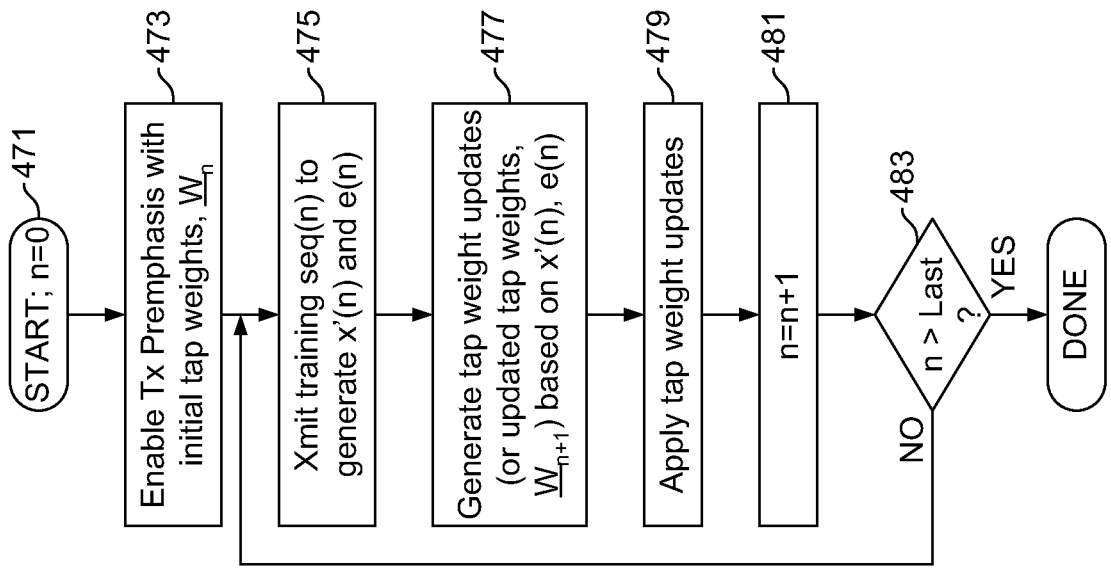
FIG. 17 is a flow diagram of the single-phase tap weight update operation described in reference to FIG. 16.

FIG. 17 is a flow diagram of the single-phase, zero-forcing tap weight update operation described in reference to FIG. 16. Initially, at start block 471, an index, n, that indicates the number of completed tap weight updates is initialized to zero. At block 473, the transmit pre-emphasis circuitry 441 of FIG. 16 is enabled, for example, by establishing an initial set of tap weights. In one embodiment, the initial setting of tap weights includes zero-valued pre- and post-tap weights, and a maximum-valued primary tap weight. In alternative embodiments, the initial setting of tap weights may be determined according to system characteristics or empirical determination of a desired tap weight setting. After the transmit pre-emphasis circuitry is enabled, a first training sequence(n), is input to the transmit pre-emphasis circuit at block 475 to establish a pre-emphasized input signal, y(n), which, after propagating through the channel, yields a system response x'(n) and, upon comparison of x'(n) with x(n-dly), an error signal e(n). At block 477, tap weight updates (i.e., stepsize*sign($x'_n$)*sign ($e_n$)), or updated tap weights themselves (i.e., $\underline{W}_{n+1}$) are generated based on the system response and error signal. At block 479, the tap weight updates generated in block 477 are applied to update the existing tap weights (or the updated tap weights generated in block 477 are substituted for the existing tap weights), and, at block 481, the index variable, n, is incremented to indicate that a first tap weight update has been completed.

In one embodiment, the operations of blocks 475-481 are repeated until, at decision block, 483, the index variable, n, is determined to have reached a final value. When the final value is reached, the tap weight adaptation operation is deemed completed. In an alternative embodiment, the operations of blocks 475-481 are repeated until tap weight updates result in negligible reduction in the error signal. In another alternative embodiment, the operations of blocks 475-481 are repeated until all or a subset of the tap weights are determined to be dithering by one or more steps.

Referring again to FIG. 16, by using an adapted, target threshold level to generate error signals, rather than x(n-dly), live data rather than pre-selected training sequences, may be used to adapt the tap weights. In one embodiment, for example, the adaptive sampler 213 of FIG. 3 is used to generate the error signal used to update the tap weights, with the error signal being filtered according to whether the corresponding data sign value (i.e., sign of $x'_n$) indicates a system response having a state that should match the data level. As another example, the error signal may be filtered according to desired partial-response data sequences (e.g., searching for bit sequences '11', '00', '111', '000', or longer sequences depending on the number of ISI components in the partial response).

Adaptive Sampler as Proxy Data Sampler

Figure 18:
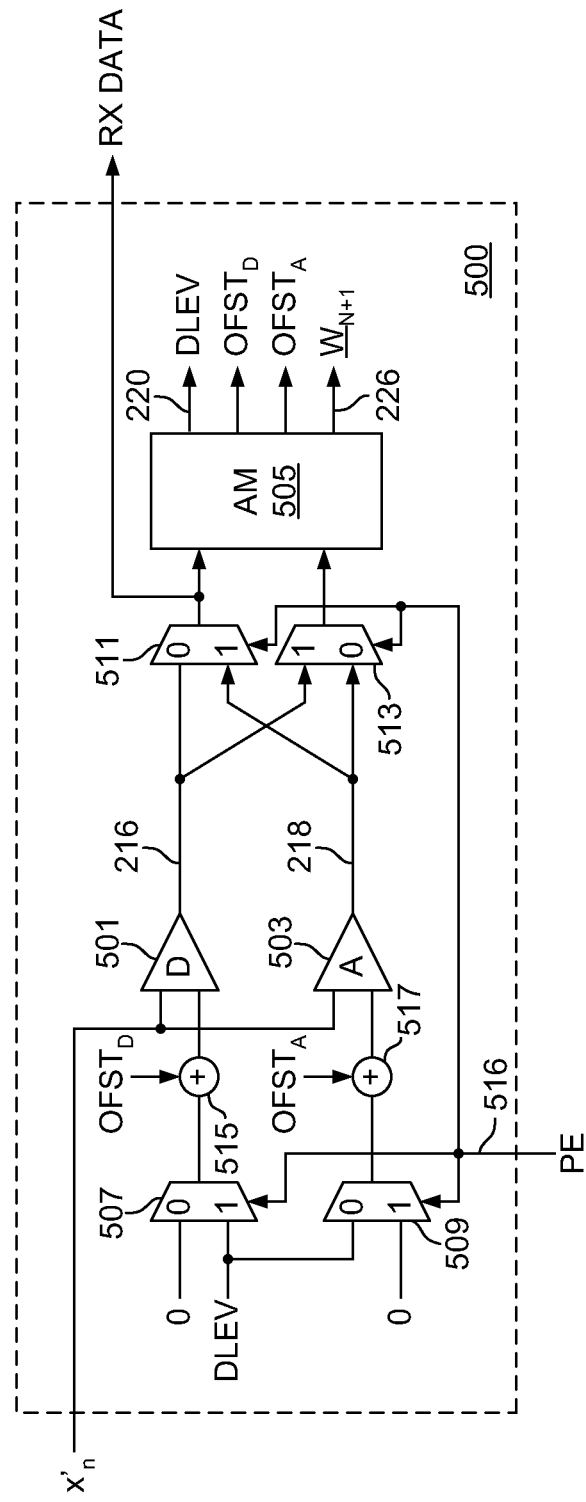
FIG. 18 illustrates a multi-sample receiver according to an embodiment of the invention.

FIG. 18 illustrates a multi-sample receiver 500 according to an embodiment of the invention. The receiver 500 includes a data sampler 501, adaptive sampler 503 and adaptive module 505 that are implemented in substantially the same manner as the samplers 211, 213 and adaptive module 215 of FIG. 3, except that the adaptive module 505 includes circuitry for generating offset cancellation values, $OFST_D$ and $OFST_A$, for the data sampler 501 and adaptive sampler 503, respectively (e.g., as described in reference to FIG. 7). The receiver 500 additionally includes a pair of threshold multiplexers 507 and 509, and a pair of output path multiplexers 511 and 513. The threshold multiplexers 507 and 509 enable the threshold values supplied to the data sampler and adaptive sampler to be swapped such that the data sampler receives the data level threshold, DLEV, generated by the adaptive module 505, and the adaptive sampler receives a zero threshold. Similarly, the output path multiplexers 511 and 513 enable the adaptive module inputs driven by the data sampler 501 and adaptive sampler 503 to be swapped such that the adaptive sampler 503 provides a sample value to the data sign input of the adaptive module (and therefore drives the receive data path), and the data sampler 501 provides a sample value to the error sign input of the adaptive module. By this arrangement, the functions of the adaptive sampler 503 and data sampler 501 may be swapped. In particular, the adaptive sampler 503 may act as a proxy for the data sampler 501, enabling continued reception of data, while the data sampler 501 is taken out of service for testing, calibration or any other activity that would ordinarily interrupt data reception.

In the embodiment of FIG. 18, a mode select signal, referred to herein as a proxy-enable signal 516 (PE), is used to select between normal and proxy modes of operation within the receiver 500 and is coupled to the control inputs (i.e., select inputs) of the threshold multiplexers 507 and 509, and the output path multiplexers 511 and 513. Each of the multiplexers 507, 509, 511 and 513 has first and second input ports (i.e., designated '0' and '1', respectively, in FIG. 18), with the signal present at the first input port being selected and output from the multiplexer in response to a logic low proxy-enable signal 516 and the signal present at the second input port being selected and output from the multiplexer in response to a logic high proxy-enable signal 516. A zero threshold is supplied to the first input port of threshold multiplexer 507 and to the second input port of threshold multiplexer 509, and the target data level threshold, DLEV, generated by the adaptive module 505 is supplied to the second input of threshold multiplexer 507 and to the first input port of threshold multiplexer 509. By this arrangement, when the proxy-enable signal 516 is low, enabling the normal operating mode of the receiver 500, the zero threshold is output from threshold multiplexer 507 and the data level threshold is output from threshold multiplexer 509. Conversely, when the proxy-enable signal 516 is high, enabling the proxy mode of operation within receiver 500, the zero threshold is output from threshold multiplexer 509 and the data level threshold is output from threshold multiplexer 507. In one embodiment, the thresholds output from the threshold multiplexers 507 and 509 are summed with the offset cancellation values $OFST_A$ and $OFST_D$ in summing circuits 515 and 517, respectively (e.g., digitally summed, or current sum) to generate the thresholds supplied to the data and adaptive samplers 501 and 503. Thus, in the normal mode, the data sampler generates a data sign value 216, $sgn(x'_n)$ that indicates whether the incoming signal, $x'_n$, is greater or less than the zero threshold (e.g., offset-calibrated common mode), and the adaptive sampler 503 generates an error sign value 218, $sgn(e_n)$, that indicates whether the incoming signal, $x'_n$ is greater or less than the target data level threshold, DLEV. That is, in the normal mode, the data and adaptive samplers 501 and 503 generate data sign and error sign values in the manner described in reference to FIG. 3. By contrast, in the proxy mode, the roles of the data and adaptive samplers 501 and 503 are reversed, with the adaptive sampler 503 operating as a proxy for the data sampler 501 to generate a data sign value and vice-versa.

The output path multiplexers 511 and 513 each have first and second input ports coupled to receive the outputs of the data sampler 501 and adaptive sampler 503. More specifically, the first input port of output path multiplexer 511 and the second input port of output path multiplexer 513 are coupled to the output of the data sampler 501, and the second input port of output path multiplexer 511 and the first input port of output multiplexer 513 are coupled to the output of the adaptive sampler 503. By this arrangement, when the receiver 500 is in the normal mode, the data sign values 216 generated by the data sampler 501 are provided to the data sign input of the adaptive module 505, and the error sign values 218 generated by the adaptive sampler 503 are provided to the error sign input of the adaptive module 505. Conversely, in the proxy mode, the data sign values generated by the adaptive sampler 503 are provided to the data sign input of the adaptive module 505 and the error sign values generated by the data sampler 501 are provided to the error sign input of the adaptive module 505.

In many applications, once the data level threshold, DLEV, has converged to the target level, the data level threshold changes relatively slowly, for example, in response to voltage and temperature drift. Consequently, the stream of error sign values delivered to the adaptive module 505 may be temporarily interrupted without significant adverse impact on the receiver 500 or the signaling system as a whole. By contrast, if the stream of data sign values is interrupted, the communication link (e.g., over signaling path 202) is lost for the duration of the interruption. By placing the receiver 500 in proxy mode, and thereby swapping the roles of the data and adaptive samplers 501 and 503, the data sampler 501 may be temporarily removed from service without interrupting data reception. In one embodiment, for example, an offset calibration operation is performed by switching the receiver 500 to proxy mode (i.e., asserting the proxy enable signal 516); temporarily zeroing the data level threshold, DLEV; switchably coupling the differential inputs of the data sampler 501 to one another (and switchably isolating the inputs from the signal path 202 so as not to short the component signal lines of the signal path to one another); then adjusting the $OFST_D$ value until the sample value generated by the data sampler 501 begins to dither between '1' and '0' states. The dithering sample value indicates that the null signal input to the data sampler 501 is being detected and therefore that the offset calibration is complete. After completing the offset calibration for the data sampler 501, the control setting for the data level threshold is restored, and the proxy-enable signal 516 is lowered to re-establish the normal operating mode of the receiver 500. At this point, the data sampler 501 has been removed from service for calibration purposes, then restored to service without interruption in data reception.

Still referring to FIG. 18, the proxy mode of the receiver 500 may also be used to more permanently swap the roles of the data and adaptive samplers 501 and 503, in effect establishing the adaptive sampler 503 as the full time data sampler, and the data sampler 501 as the full-time adaptive sampler. This may be desirable, for example, if it is determined that the adaptive sampler exhibits a lower bit error rate, less jittery output, lower DC offset, or other characteristic improvement relative to the data sampler 501.

A number of changes may be made to the embodiment of FIG. 18 without departing from the scope of the present invention. For example, if the proxy mode is to be used only to enable the adaptive sampler 503 to stand-in for the data sampler 501, then the threshold multiplexer 507 may be omitted. Offset calibration is simplified in such an architecture, as the data level threshold is not supplied to the data sampler 501 in proxy mode and therefore need not be zeroed. In an alternative embodiment, the threshold multiplexers 507 and 509 may be controlled by separate signals so that, if an offset calibration is to be performed in the data sampler 501, only the threshold input to the adaptive sampler 503 is switched (i.e., by selecting the zero threshold to be supplied to the adaptive sampler 503), so that the data sampler 501 continues to receive the zero threshold, obviating the temporary zeroing of the data level threshold. Such an embodiment has the additional benefit of enabling both the data sampler 501 and the adaptive sampler 503 to generate sign data values simultaneously, for example, for confirmation of accurate data reception (a third sampler may be provided for voting purposes). Separate control signals may also be provided to the output path multiplexers 511 and 513 so that the data and adaptive samplers 501 and 503 can be enabled to simultaneously generate data sign values for a given time period before switching the output path multiplexer 511 to select the adaptive sampler 503 to provide data sign values to the adaptive module 505. In this manner, a make-before-break operation is enabled within the receive circuit 500, instead of abruptly transitioning between the adaptive and data samplers 501 and 503 as the source of data sign values.

Tap Weight and Data Level Adaptation in a Multi-Level Signaling System

Figure 19:
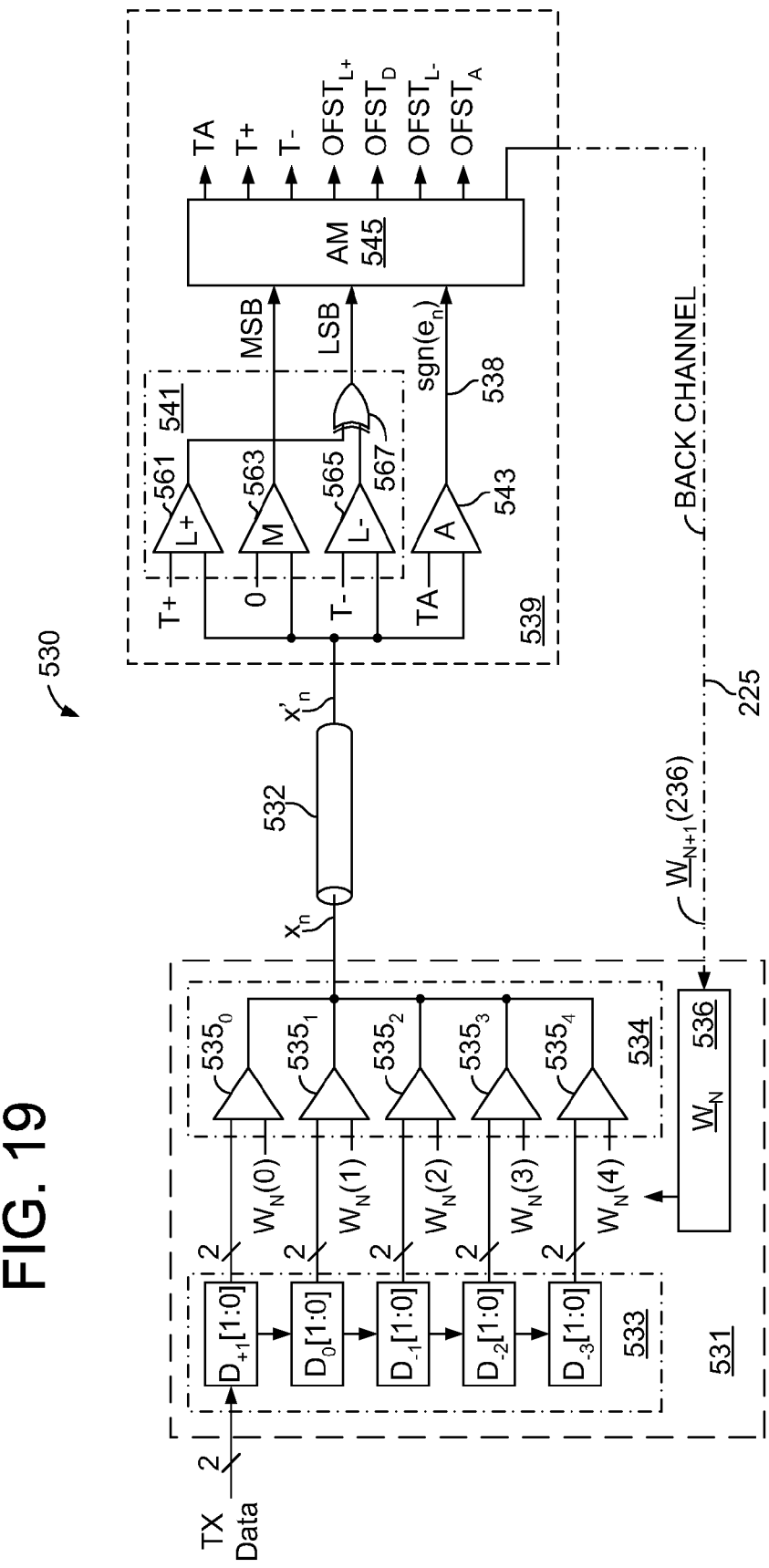
FIG. 19 illustrates a multi-level signaling system according to an embodiment of the invention.

FIG. 19 illustrates a multi-level signaling system 530 according to an embodiment of the invention. The multi-level signaling system 530 includes a multi-level, multi-tap transmitter 531, and a multi-level, multi-sample receiver 539, coupled to one another via high-speed signaling path 532. As in the signaling system of FIG. 3, the signal path 532 may be a differential signaling path having a pair of component signal lines to conduct differential multi-level signals generated by the transmitter 531, or a single-ended signaling path for transmission of single-ended multi-level signals generated by the transmitter 531. Also, the signal path 532 may be formed in multiple segments disposed on different layers of a circuit board and/or multiple circuit boards (e.g., extending between backplane-mounted daughterboards, between motherboard and daughterboard, etc.). In one embodiment, the transmitter 531 and receiver 539 are implemented in respective integrated circuit (IC) devices that are mounted on a common circuit board or different circuit boards (e.g., as in the case of backplane-mounted daughterboards). In alternative embodiments, IC dice (i.e., chips) containing the transmitter 531 and receiver 539 may be packaged within a single, multi-chip module with the chip-to-chip signaling path formed by bond wires or other signal conducting structures. Also, the transmitter 531 and receiver 539 may be formed on the same IC die (e.g., system on chip) and the signaling path 532 implemented by a metal layer or other conducting structure of the die.

In the embodiment of FIG. 19, the transmitter 531 includes a transmit shift register 533, output driver bank 534 and tap weight register 536, and generates output signals having one of four pulse amplitude modulation levels (i.e., 4-PAM) according to the state of a two-bit transmit data value (received, for example, by a two-line input designated "TX DATA"). In the particular embodiment shown, the transmit shift register 533 is five elements deep and used to store a pre-tap data value $D_{+1}$, primary data value $D_0$, and three post-tap data values $D_{-1}$, $D_{-2}$ and $D_{-3}$, with each of the pre-tap, post-tap and primary-data values having two constituent bits. As in the transmit circuit 201 of FIG. 3, the primary data value is the data value to be transmitted (i.e., communicated) to the receiver 539 during a given transmission interval, and the pre- and post-tap data values are the next-to-be transmitted and previously transmitted data values, respectively (i.e., the subscript indicating the number of transmission intervals to transpire before the data value will be transmitted). Each of the shift register storage elements is coupled to a respective one of multi-level output drivers $535_0$-$535_4$ within the output driver bank 534, with output driver $535_1$ forming the primary driver, output driver $535_0$ forming the pre-tap driver and output drivers $535_2$-$535_4$ forming the post-tap drivers. Different numbers of pre- and post-tap drivers may be used in alternative embodiments.

As in the transmit circuit of FIG. 3, the tap weight register 536 is used to store the tap weights $W_N(0)$-$W_N(4)$ supplied to the output drivers $535_0$-$535_4$, respectively, with updated tap weights $W_{N+1}$ 236 being supplied by the multi-level receiver 539, for example, via a back channel 225. In one embodiment, the signal path 532 is pulled up to a predetermined voltage level (e.g., at or near supply voltage) by single-ended or double-ended termination elements, and the output drivers $535_0$-$535_4$ generate multi-level signals (i.e., symbols) on the signal path 532 by drawing a pull-down current, $I_{PD}$ (i.e., discharge current), in accordance with the corresponding tap weight and data value. More specifically, in one embodiment, the pull-down current generated by the output driver corresponds to the most- and least-significant bits (MSB and LSB) of a two-bit data value, $D_0$, as follows ($I_{NOM}$ being a nominal full-scale current):

TABLE 2

| $D_0[1]$ (MSB) | $D_0[0]$ (LSB) | $I_{PD}$ | Normalized Signal Level |
|---|---|---|---|
| 0 | 0 | 0 | +1 |
| 0 | 1 | $I_{NOM}/3$ | +1/3 |
| 1 | 1 | $2I_{NOM}/3$ | −1/3 |
| 1 | 0 | $I_{NOM}$ | −1 |

As in the embodiment of FIG. 3, the primary driver $535_1$ is used to transmit, $D_0$, the two-bit data value to be transmitted during a given symbol time, and the pre-tap and post-tap drivers are used to provide transmit pre-emphasis as necessary to reduce dispersion-type ISI and other low-latency distortion effects.

Figure 20:
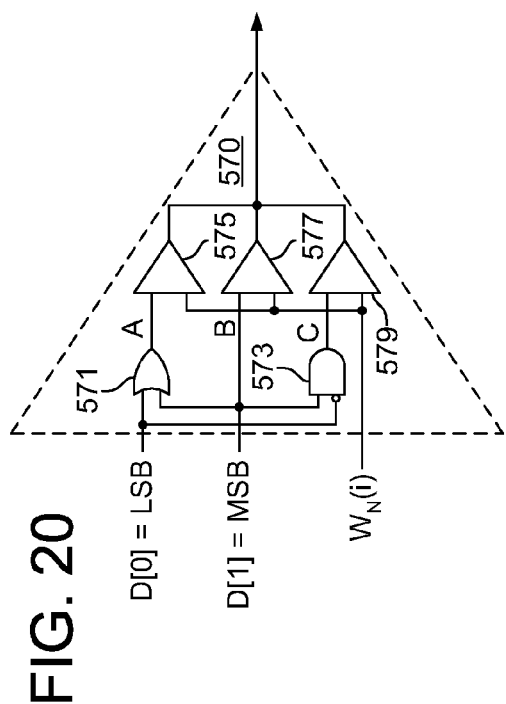
FIG. 20 illustrates an embodiment of a multi-level output driver that may be used to implement each of the multi-level output drivers shown in FIG. 19.

FIG. 20 illustrates an embodiment of a multi-level output driver 570 that operates in accordance with Table 2, and which may be used to implement each of the multi-level output drivers $535_0$-$535_4$ of FIG. 19. The output driver 570 includes a pair of logic gates 571 and 573 and three component drivers 575, 577 and 579, and receives the MSB and LSB of a two-bit data value, D[1:0], and tap weight, $W_N(i)$, as inputs. The logic gates 571 and 573 convert the MSB and LSB inputs into component driver input signals, A, B and C according to the following logic table:

TABLE 3

| MSB | LSB | A | B | C |
|---|---|---|---|---|
| 0 | 0 | 0 | 0 | 0 |
| 0 | 1 | 1 | 0 | 0 |
| 1 | 1 | 1 | 1 | 0 |
| 1 | 0 | 1 | 1 | 1 |

That is, A is asserted (i.e., to a logic '1') if either the MSB or LSB is a logic '1' (i.e., A=MSB+LSB, the '+' symbol indicating a logical OR), B is asserted if the MSB is a logic '1' (i.e., B=MSB), and C is asserted if the MSB is a logic '1' and the LSB is a logic '0' (i.e., C=MSB·/LSB). The component driver input signals, A, B and C, are input to the component drivers 575, 577 and 579, respectively, and the tap weight, $W_N(i)$, is input to each of the component output drivers.

In one embodiment, each of the component output drivers 575, 577 and 579 is implemented by the circuit illustrated in FIG. 5 (other output driver circuits may be used in alternative embodiments). A single pair of resistive elements may be provided and shared between the component output drivers 575, 577 and 579 (i.e., instead of three sets of the resistive elements designated 'R' in FIG. 5), or, as discussed in reference to FIG. 5, the resistive elements may be implemented by termination elements coupled to the component lines of the differential signaling path. Each of the component output drivers 575, 577 and 579 may additionally be biased (e.g., by a biasing circuit not shown) to draw substantially the same current, $I_{NOM}/3$, from the signaling path. By this arrangement, the currents drawn by the component output drivers 575, 577 and 579 are cumulative so that the four different current levels illustrated in table 2 are generated for the corresponding states of the MSB and LSB. That is, the four possible states of a two-bit transmit value are signaled on the signaling path by drawing $I_{NOM}/3$ in none, one, two or three of the component drivers 575, 577 and 579, as illustrated in the following table:

TABLE 4

| MSB | LSB | A | B | C | $I_{PD}$ |
|---|---|---|---|---|---|
| 0 | 0 | 0 | 0 | 0 | 0 |
| 0 | 1 | 1 | 0 | 0 | $I_{NOM}/3$ |
| 1 | 1 | 1 | 1 | 0 | $2I_{NOM}/3$ |
| 1 | 0 | 1 | 1 | 1 | $I_{NOM}$ |

Referring again to FIG. 19, the multi-level, multi-sample receive circuit 539 includes a multi-level sampler 541, and an adaptive sampler 543. The multi-level sampler 541 itself includes component samplers 561, 563 and 565, that operate in generally the same manner as the data and adaptive samplers described above (e.g., in reference to FIGS. 3 and 10-12) to output a sample value having a sign according to whether the input signal, $x'_n$, is greater or less than a threshold level. Two of the component samplers 561 and 565 are used to resolve the LSB of the incoming 4-PAM signal, and have thresholds set at counterpart threshold levels, T+ and T−, above and below a zero threshold. Component samplers 561 and 565 are referred to herein as the positive LSB sampler (L+) and negative LSB sampler (L−), respectively. The remaining component sampler 563, referred to herein as the MSB sampler, receives (or is set to) the zero threshold and is used to resolve the MSB of the incoming 4-PAM signal.

Figure 21:
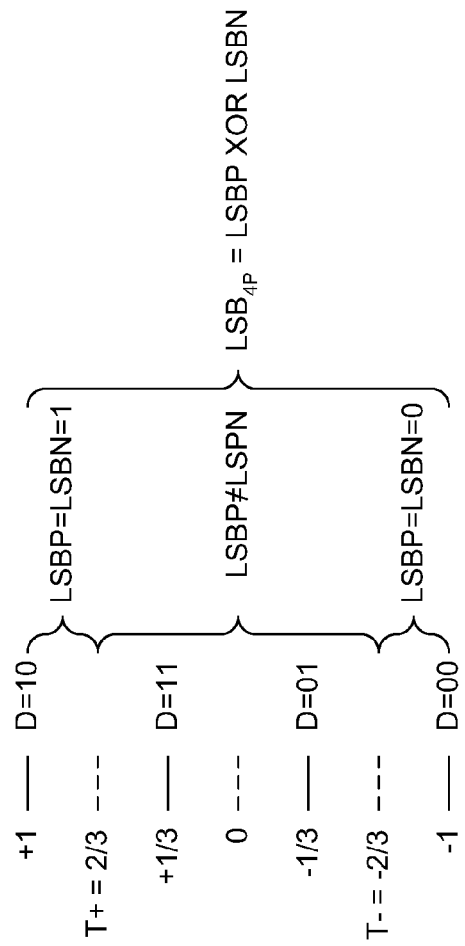
FIG. 21 illustrates an exemplary signal encoding protocol used within the multi-level signaling system of FIG. 19.

Referring to FIG. 21, the zero threshold is nominally set midway between the normalized +/−1 signal levels that correspond to data states '00' and '10', and midway between the corresponding +⅓ and −⅓ signal levels that correspond to data states '01' and '11'. Thus, if the output of the MSB sampler is high, the MSB of the recovered data value is high. The threshold supplied to the positive LSB sampler 561 (i.e., T+) is set midway between the normalized +1 and +⅓ signal levels (i.e., at the normalized +⅔ level), and the threshold supplied to the negative LSB sampler 565 (i.e., T−) is set midway between the normalized −1 and −⅓ signal levels (i.e., at the normalized −⅔ level). Consequently, if the LSB of a transmitted data value is a '0' (i.e., a '10' or a '00' is transmitted), then the sample values generated by positive and negative LSB samplers 561 and 565 will have the same state, either high or low, as the incoming signal level will either exceed both the T+ and T− thresholds (D='10') or fall below both the T+ and T− thresholds (D='00'). By contrast, if the LSB of the transmitted data value is a '1', then the sample values generated by positive and negative LSB samplers 561 and 565 will have different states, as the incoming signal will exceed the T− threshold, but not the T+ threshold. Thus, the LSB of the recovered data value may be generated by exclusive-ORing the L+ and L− outputs.

Returning to FIG. 19, exclusive-OR gate 567 is coupled to receive the outputs of the positive and negative LSB samplers 561 and 565 and generates the LSB sample for that incoming data signal. Thus, during each signal reception interval, the multi-level sampler 541 generates an MSB/LSB sample pair which is provided to the adaptive module 545. The adaptive module 545 generates an error value 538 that indicates whether the incoming signal $x'_n$ exceeds a threshold value, TA. In one embodiment, the threshold value corresponds to the normalized +⅓ signal level, thereby enabling generation of a DAC control value which may be left shifted by one bit (i.e., multiplied by two) to generate the T+ threshold (i.e., +⅔), and then complemented to generated the T− threshold (i.e., −⅔). In an alternative embodiment, discussed below, the T+ threshold may be generated by determining and then averaging the normalized +1 and +⅓ signal levels. In another embodiment, discussed below, the T+ threshold may be determined directly, by sampling the incoming signal at the midpoint of transitions between +1 and +⅓ levels. In yet other embodiments, the normalized received signal levels may be different than ±⅓ and ±1, such that the desired threshold levels (T+, T−) may be different than ±⅔ (e.g., being set at the midpoint between adjacent signal levels or at other points that improve signaling margins, bit error rate or other system performance metric). In this regard, the references to normalized signal levels herein are but examples. Other signal levels and threshold levels may be used. In all such embodiments, the counterpart threshold, T−, may be generated by complementing (or inverting) the T+ threshold. Alternatively, the T− threshold may be independently generated by determining and left-shifting the −⅓ threshold, by determining and averaging the −⅓ and −1 thresholds, or by sampling the incoming signal at the midpoint of transitions between −1 and −⅓ levels.

Still referring to FIG. 19, the adaptive module 545 generates the thresholds, T+ and T−, provided to the multi-level sampler 541, the threshold, TA, provided to the adaptive sampler 543, and respective offset cancellation values, $OFST_A$, $OFST_{L+}$, $OFST_M$ and $OFST_{L-}$, for the adaptive sampler 543 and each of the component samplers 561, 563 and 565 of the multi-level sampler 541. In alternative embodiments, all or a portion of the offset cancellation circuitry within the adaptive module 545 may be omitted so that offset cancellation values are not generated for the adaptive sampler 543 and/or component samplers 561, 563 and 565. Also, one or more of the offset cancellation values, $OFST_A$, $OFST_{L+}$, $OFST_M$ and $OFST_{L-}$, may be shared between any two or more of the samplers 543, 561, 563 and 565.

Figure 22:
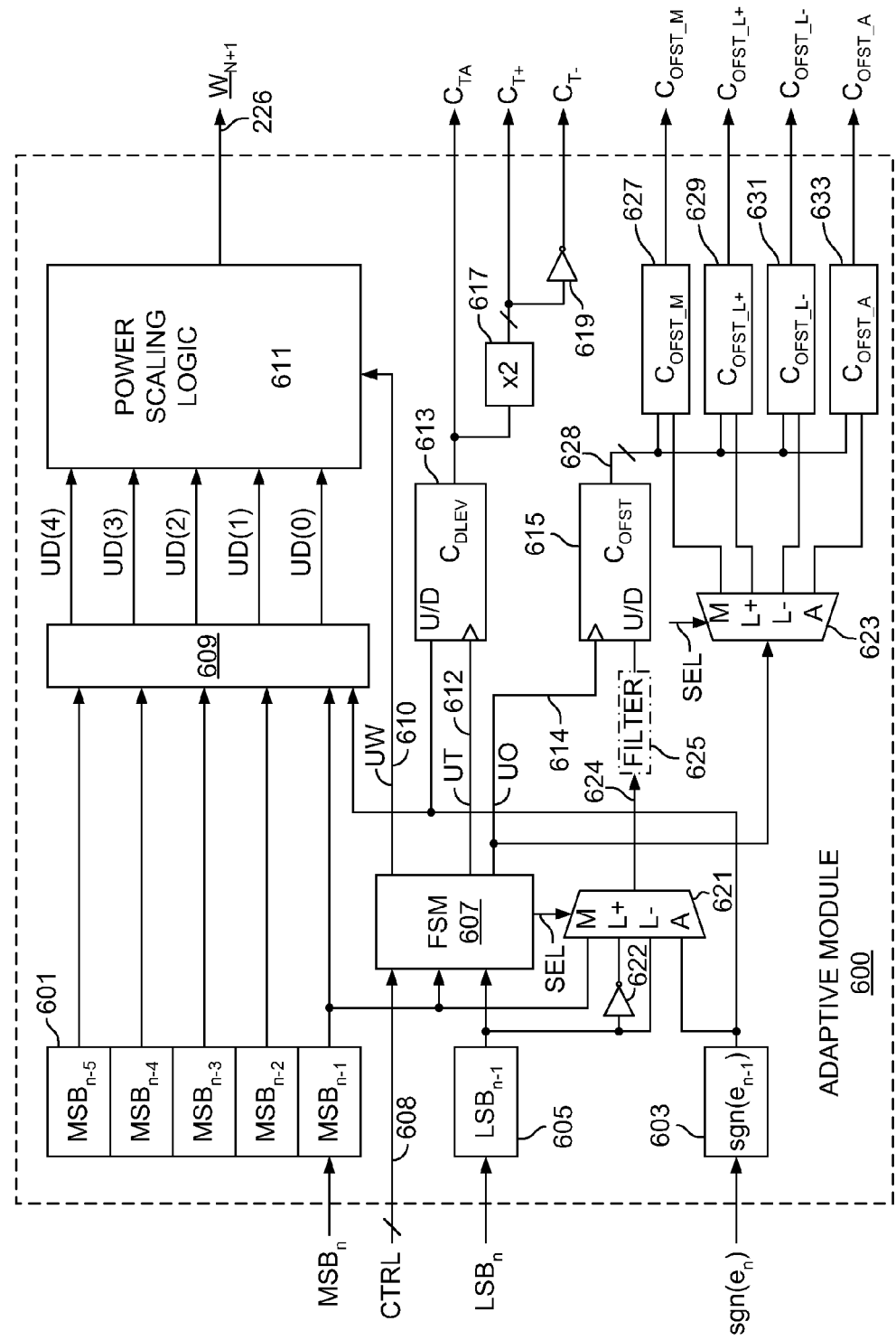
FIG. 22 illustrates an adaptive module according to another embodiment of the invention.

FIG. 22 illustrates an embodiment of an adaptive module 600 that may be used to implement the adaptive module 545 shown in FIG. 19. The adaptive module 600 includes an MSB register 601, LSB register 605, error sign register 603, sign multiplier 609, finite state machine 607, power scaling logic 611, filter 625, threshold counter 613, threshold multiplier 617, threshold inverter 619, offset counter 615, offset registers 627, 629, 631 and 633, error signal multiplexer 621 and demultiplexer 623. The adaptive module 600 operates similarly to the adaptive module 250 of FIG. 7, with data sign values, $MSB_n$, and error sign values, $e_n$, being loaded into the MSB register 601 and error sign register 603, respectively, in response to a sampling clock signal or other control signal. LSB values, $LSB_n$, are similarly loaded into the LSB register 605. In the embodiment of FIG. 22, the MSB register 601 is a five-deep shift register to store the most recently generated data sign values, $MSB_{n-1}$-$MSB_{n-5}$, (other depths may be used in alternative embodiments) and outputs the data sign values to the sign multiplier 609. The sign multiplier 609 receives the data sign values from the MSB register 601 and the error sign value from the error sign register 603 and generates a set of update values, UD(0)-UD(4) that indicate the sign of the product of the error sign value and the data sign value. The update values are provided to the power scaling logic 611 which operates similarly to the embodiments described above in reference to FIGS. 7-9 to generate an updated, power-scaled set of pre-emphasis tap weights 226.

As discussed in reference to FIG. 19, the threshold values for the positive and negative LSB sampler (i.e., T+ and T−) may be set to normalized +/−⅔ signal levels, respectively, which are binary multiples of the normalized +⅓ threshold level. Accordingly, in the embodiment of FIG. 22, the adaptive module 600 generates an adaptive threshold control value, $C_{TA}$, that corresponds to the normalized +⅓ signal level, and generates control values, $C_{T+}$ and $C_{T-}$ for the positive and negative LSB samplers, by multiplying $C_{TA}$ by 2 and −2, respectively (i.e., $C_{T+}=2C_{TA}$ and $C_{T-}=-2C_{TA}$). More specifically, the finite state machine 607 receives the most recently stored sample value (i.e., $MSB_{n-1}/LSB_{n-1}$) from the MSB and LSB registers 601 and 603, and asserts an update threshold signal 612 (UT) if the sample value corresponds to the +⅓ signal level (i.e., sample value='11'). The update threshold signal 612 is provided to a count enable input (i.e., strobe input) of the threshold counter 613, and the error sign value stored in register 603 is coupled to the up/down input of the threshold counter 613. By this arrangement, when the update threshold signal 612 is asserted (indicating that the sample value is a '11'), the threshold control value, $C_{TA}$, maintained within threshold counter is incremented in response to a positive error sign value (i.e., the positive error sign value indicating that the input signal that yielded the n−1 sample value is above the +⅓ level) and decremented in response to a negative error sign value. In one embodiment, the threshold control value, $C_{TA}$, is supplied to a current DAC within an adaptive sampler as described above in reference to FIGS. 10-12. Alternatively, a DAC may be provided within the adaptive module 600 to generate an analog threshold, TA. The multiplier circuit 617 multiplies $C_{TA}$ by 2 (e.g., by actively or passively shifting the $C_{TA}$ value left by one bit) to generate a control value for the T+ threshold, $C_{T+}$. The threshold inverter 619 is provided to flip the sign of $C_{T+}$ to generate $C_{T-}$, the control value for the T− threshold. Thus, the adaptive module 600 may be used to adaptively generate the control values applied to establish sampling thresholds within the positive and negative LSB samplers and the adaptive sampler of a multi-level, multi-sample receiver.

As in the embodiment of FIG. 7, the finite state machine 607 asserts an update weight signal 610 (UW) to prompt the power scaling logic 611 to generate an updated set of tap weights 226. In an embodiment in which the error sign value corresponds to a logic '11' sample value, the finite state machine 607 asserts the update weight signal after the MSB register 601 has been fully loaded (or re-loaded) and the most recently stored sample value ($MSB_{n-1}/LSB_{n-1}$) is a logic '11'.

In the embodiment of FIG. 22, one or more bits of a multi-bit control signal 608 are asserted to initiate an offset calibration operation within the adaptive module 600, with the bit (or combination of bits) indicating the sampler to be calibrated (e.g., positive or negative LSB samplers, MSB sampler or adaptive sampler). The error signal multiplexer 621 has a control port coupled to receive a select signal (SEL) from the finite state machine 607, and four input ports coupled to receive $MSB_{n-1}/LSB_{n-1}$ (the complement LSB value generated by inverter 622), $LSB_{n-1}$ and error sign value, $sgn(e_{n-1})$, respectively. If the MSB sampler is to be calibrated, a null signal is generated at the MSB sampler input (e.g., by configuring the transmit circuit to transmit a null differential signal, or by switchably coupling the inputs of the MSB sampler to one another) and the most recently stored MSB is selected by the error signal multiplexer (i.e., in response to the select signal, SEL, from the finite state machine 607) as the offset error signal 624 supplied to the up/down input of the offset counter 615. (Also, as shown in FIG. 22, a filter 625 may optionally be provided to filter transient states in the offset error signal 624). By this operation, if the MSB sampler generates a stream of positive sample values (e.g., MSB=1) in response to the null signal input, then the MSB sampler has a negative DC offset which may be canceled by a positive offset cancellation value. In one embodiment, the finite state machine 607 asserts an update offset signal 614 after a predetermined number of samples have been received (e.g., enough samples to establish a stable, filtered signal at the up/down input of the offset counter 615), thereby incrementing the offset count within the offset counter 615 if the filtered MSB (i.e., output of filter 625) is positive, and decrementing the offset count if the filtered MSB is negative. The output of the offset counter 615 may be provided to the finite state machine 607, as described in reference to FIG. 7, to enable detection of a dithering condition within the offset counter 615 (i.e., indicating convergence to the desired MSB offset count).

In the embodiment of FIG. 22, the update offset signal 614 is supplied to the input of the demultiplexer 623 which, in turn, passes the update offset signal 614 to the load-enable input of a selected one of offset registers 627, 629, 631 and 633 according to the state of the select signal, SEL, generated by the finite state machine 607. Parallel load ports of the offset registers 627, 629, 631 and 633 are coupled to receive the offset count 628 output from the offset counter 615. Thus, during an offset calibration operation on the MSB sampler, each assertion of the update enable signal 614 results in the offset count 628 being loaded (i.e., strobed) into the MSB offset register 627. By this operation, when the offset count begins to dither, the update offset signal 614 may be asserted a final time to load the desired MSB offset count into the MSB offset register. In one embodiment, the MSB offset register is coupled to provide the MSB offset value to a current DAC within the MSB sampler (e.g., as shown in FIGS. 10 and 12. Alternatively, the MSB offset value may be converted to an analog signal that is provided to the MSB sampler.

In one embodiment, offset cancellation operations are performed for the remaining samplers (i.e., the positive and negative LSB samplers and the adaptive sampler) in generally the same manner as the MSB sampler, except that the threshold control values provided to the sampler being calibrated are temporarily zeroed to enable detection of the DC offset, if any, then restored when the offset calibration operation is complete. Also, in the case of the positive LSB sampler, a logic '1' LSB indicates a negative L+ sample, and a logic '0' LSB indicates a positive L+ sample; a correlation that is the complement of the MSB case (i.e., in which a logic '1' MSB corresponds to a positive MSB sample). Inverter 622 is provided to account for this complement condition, causing the offset counter 615 to be incremented in response to a logic '0' L+ sample during calibration of the positive LSB sampler.

Clock Recovery

FIG. 23 illustrates an embodiment of a multi-sample, 4-PAM receiver 640 that recovers both data and clocking information from the incoming multi-level signal, $x'_n$. The receiver 640 includes a multi-level sampler 541 (a 4-PAM sampler in this example), adaptive sampler 543, edge sampler 641, adaptive module 643 and clock recovery circuit 645. The 4-PAM sampler 541, adaptive sampler 543 and adaptive module 643 operate generally as described in reference to FIG. 19 to generate data samples 642 (i.e., MSB and LSB) and error samples 218, and to adaptively update the transmit pre-emphasis tap weights, (226) and the sampler thresholds 550, 552 and 554 (TA, T+ and T−, respectively).

The clock recovery circuit 645 generates a sampling clock signal 210 (SCLK) and edge clock signal 610 (ECLK) in response to transition samples 644 ($T_{n-1}$), generated by the edge sampler 641, and the data samples 642 generated by the 4-PAM sampler 541. In one embodiment, the sampling clock signal 210 is provided to the 4-PAM sampler 541 and adaptive sampler 543 to control the sampling instant therein (as shown, for example, in FIGS. 10 and 12) and thereby define each successive data reception interval. In one embodiment, transitions in the sampling clock signal 210 are phase aligned with midpoints in the incoming data eyes (i.e., midpoint of data valid intervals in the incoming data signal, $x'_n$), for example, as shown in FIG. 4. In an alternative embodiment, the sampling clock signal 210 may be offset from the midpoints in the incoming data eyes, for example, to accommodate asymmetric setup and hold time requirements in the 4-PAM sampler 541 and/or adaptive sampler 543. While only a single sampling clock signal 210 is shown in FIG. 23, multiple sampling clock signals may be generated by the clock recovery circuit 645 to enable receipt of multi-data rate signals. For example, in a double data rate system, the clock recovery circuit 605 may generate SCLK and /SCLK to enable capture of data and error samples in both odd and even phases of the sampling clock signal 210.

The clock recovery circuit 605 adjusts the phase of the edge clock signal 610 to maintain phase alignment between the edge clock signal 610 and transition points between incoming data eyes. That is, the edge clock signal 610 is adjusted for edge alignment with data valid intervals in the incoming data signal, $x'_n$. The edge clock signal 610 is supplied to the edge sampler 641 where it is used to time the sampling of transitions in the incoming data signal. One or more storage circuits (not specifically shown in FIG. 23) may be provided within the edge sampler 641 to latency-align the transition sample, $T_{n-1}$, with the data sample, MSB/LSB$_{n-1}$ so that, for each pair of successive data samples 642 supplied to the clock recovery circuit 645 by the 4-PAM sampler 541, the edge sampler 641 supplies a transition sample 644 that corresponds to the intervening transition in the incoming signal, $x'_n$, if any.

FIG. 24 illustrates possible signal transitions between successive 4-PAM data transmissions 660 and 662. As shown, from each of four possible signal levels, the incoming data signal may transition to any of three other signal levels. For example, a signal level above T+(corresponding to data value '10') may transition to (1) a signal level between the T+ and zero thresholds ('10'→'11'); (2) a signal level between the zero and T− thresholds ('10'→'01'); and a signal level below T− ('10'→'00'). Examining the different possible transitions, it can be seen that any transitions that cross all three threshold levels will cross the zero threshold level at the timing center, T1, between the desired data sampling instants; the desired edge clock transition time. Similarly, transitions that cross a single threshold level will cross either the zero threshold level, the T+ threshold level or the T− threshold level at T1. By contrast, any transitions that cross two threshold levels, but not three, do not cross the zero, T+ or T− threshold levels at T1. Enumerating the different transitions that cross the zero, T+ and T− threshold levels at T1 as transition types (1), (2) and (3), respectively, it can be seen that type-1 transitions are those in which the LSB remains unchanged at either '1' or '0', while the MSB changes state (i.e., (MSB$_N$ xor MSB$_{N-1}$) & (LSB$_N$ xnor LSB$_{N-1}$)); type-2 transitions are those in which the MSB remains high while the LSB changes state (i.e., MSB$_N$ & MSB$_{N-1}$ & (LSB$_N$ xor LSB$_{N-1}$)); and type-3 transitions are those in which the MSB remains low, while the LSB changes state (i.e., /MSB$_N$ & /MSB$_{N-1}$ & (LSB$_N$ xor LSB$_{N-1}$)).

In the embodiment of FIG. 23, the clock recovery circuit 645 evaluates successive MSB/LSB values to determine when a type-1 signal transition has occurred, and adjusts the phase of the edge clock signal 610 and sampling clock signal 210 according to the state of the corresponding transition sample 644. In the case of a rising edge transition in the incoming signal, $x'_n$ (i.e., '00'→'10', or '01'→'11'), a logic '1' transition sample 644 indicates that the edge clock transition occurred after the incoming signal transition (i.e., edge clock lags the signal transition) and therefore that the phase of the edge clock signal 610 is to be advanced. Conversely, a logic '0' transition sample 644 indicates that the edge clock transition occurred prior to the incoming signal transition (i.e., edge clock leads the signal transition) and therefore that the phase of the edge clock signal 610 should be delayed. The clock recovery circuit 605 receives the transition samples 644 from edge sampler 641 and data samples from the 4-PAM sampler 642 and adjusts the phase of the edge clock signal 610 as necessary to maintain alignment between the edge clock signal 610 and transitions in the incoming signal, $x'_n$. In one embodiment, the sampling clock signal 210 is maintained at a substantially constant phase offset from the edge clock signal 610 such that phase alignment between the edge clock signal 610 and data signal transitions yields a desired phase alignment between the sampling clock signal 210 and midpoints in the incoming data eyes.

FIG. 25 illustrates an embodiment of a clock recovery circuit 670 that adjusts the phase of edge clock signal 610 and sampling clock signal 210 based on selected transitions detected in the incoming signal, $x'_n$, and that may be used to implement the clock recovery circuit 645 of FIG. 23. The clock recovery circuit 670 includes a transition logic circuit 671, early/late counter 683, majority detector 685, interpolator 687 and reference loop 689. In the embodiment of FIG. 25, the transition logic 671 asserts a transition detect signal 672 (TDET) upon detecting a type-1 transition in a successive pair of data samples, MSB/LSB$_{n-2}$ and MSB/LSB$_{n-1}$, and asserts an early/late signal 674 according to the direction of the incoming signal transition (rising or falling edge) and the state of the corresponding transition sample, $T_{n-1}$. The transition detect signal 672 is applied to a count enable input (CEN) of the early/late counter 683 to enable an early/late count value to be incremented or decremented according to the state of the early/late signal 674. In one embodiment, the transition logic 671 outputs a logic high early/late signal 674 if the transition sample, $T_{n-1}$, does not match the MSB of the trailing data sample, MSB$_{n-1}$, and a logic low early/late signal 674 if the transition sample matches the MSB of the trailing data sample. That is, if the transition sample, $T_{n-1}$, is captured after the transition from MSB/LSB$_{n-2}$ to MSB/LSB$_{n-1}$, the transition sample will match the MSB$_{n-1}$ sample and thereby indicate that the edge clock signal transition is late relative to the incoming signal transition. Conversely, if the transition sample is captured before the transition from MSB/LSB$_{n-2}$ to MSB/LSB$_{n-1}$, the transition sample will not match the MSB$_{n-1}$ sample, thereby indicating that the edge clock signal transition is early relative to the incoming signal transition. The following table illustrates exemplary combinations of incoming signal samples (and corresponding transition type) and transition samples; the resulting transition detect and early/late signals generated by the transition logic circuit 671; and the resulting adjustments to the early/late count and phase of the edge clock sampling clock signals:

TABLE 5

| MSB/LSB$_{n-2}$ | MSB/LSB$_{n-1}$ | T$_{n-1}$ | Trans. Type | TDET | Early (/Late) | E/L Cnt Adj. | ECLK/SCLK Phase Adjust |
|---|---|---|---|---|---|---|---|
| 00 | 10 | 0 | 1 | 1 | 1 | +1 | Delay |
| 00 | 10 | 1 | 1 | 0 | 0 | −1 | Advance |
| 01 | 11 | 0 | 1 | 1 | 1 | +1 | Delay |
| 01 | 11 | 1 | 1 | 0 | 0 | −1 | Advance |
| 11 | 01 | 0 | 1 | 0 | 0 | −1 | Advance |
| 11 | 01 | 1 | 1 | 1 | 1 | +1 | Delay |
| 10 | 00 | 0 | 1 | 1 | 0 | −1 | Advance |
| 10 | 00 | 1 | 1 | 1 | 1 | +1 | Delay |
| 11 | 10 | X | 2 | 0 | X | 0 | No change |
| 10 | 11 | X | 2 | 0 | X | 0 | No change |
| 00 | 01 | X | 3 | 0 | X | 0 | No change |
| 01 | 00 | X | 3 | 0 | X | 0 | No change |
| 00 | 11 | X | — | 0 | X | 0 | No change |
| 01 | 10 | X | — | 0 | X | 0 | No change |
| 11 | 00 | X | — | 0 | X | 0 | No change |
| 10 | 01 | X | — | 0 | X | 0 | No change |

In one embodiment, the early/late counter 683 is initialized to zero and, as illustrated in Table 5, is incremented in response to an early indication (i.e., a logic high early/late signal 674) and decremented in response to a late indication (i.e., a logic low early/late signal 674). By this operation, the sign bit (e.g., the MSB) of the early/late count maintained within the early/late counter 683 indicates whether more early than late indications, or more late than early indications have been received from the transition logic 671 (i.e., the count value will underflow to a negative value if more late indications than early indications are detected). Accordingly, after a predetermined number of transition detect assertions (or after a predetermined time), the majority detector 685 evaluates the sign of the early/late count (i.e., signal 684) and outputs an up/down signal 688 to the interpolator 687 accordingly. The early/late count value may then be reset to zero in preparation for counting a subsequent set of early/late indications.

In one embodiment, the interpolator 687 maintains an interpolation control word that is incremented in response to a logic high up/down signal 688 and decremented in response to a logic low up/down signal 688. The most significant bits of the interpolation control word are used to select a pair of phase vectors from the set of N phase vectors 692 generated by the reference loop 689, and the least significant bits of the interpolation control word are used to interpolate between the selected pair of phase vectors. As the control word is incremented, the interpolation is incrementally shifted from a leading one of the phase vectors to a lagging one of the phase vectors, thereby incrementally delaying (i.e., retarding) the phase of the edge and sampling clock signals 610, 210. Conversely, as the control word is decremented, the interpolation is incrementally shifted toward the leading one of the selected phase vectors, thereby incrementally advancing the phase of the edge and sampling clock signals 610, 210.

In one embodiment, the reference loop 689 is formed by a delay locked loop (DLL) that receives a reference clock signal 690 and, in response, generates a plurality of phase vectors 692 that are phase distributed within a cycle time of the reference clock signal 690. Alternatively, the reference loop 689 may be a phase locked loop (PLL) that multiplies the reference clock frequency to generate a plurality of phase vectors 692 having a higher frequency than the reference clock frequency. In another alternative embodiment, the reference loop 689 may include an internal timing reference generator (e.g., a ring oscillator or other clock generating circuit) so that no reference clock signal 690 is required. Also, as discussed above, the interpolator 687 may generate any number of sampling clock and edge clock signals. For example, in a double data rate system, the interpolator 687 generates an edge clock signal and complement edge clock signal, and a sampling clock signal and complement sampling clock signal, the sampling clock signal being offset from the edge clock signal by a quarter cycle (90 degrees) of the edge clock signal. The quarter cycle offset may be achieved, for example, by a second interpolator that maintains a control word having a 90 degree digital offset from the control word used to generate the edge clock signal. Other techniques may be used to generate the edge clock-to-sampling clock offset in alternative embodiments. In a quad data rate system, the interpolator 687 (or multiple interpolators) generates four edge clock signals and four sampling clock signals, the combined set of eight clock signals being evenly offset in phase over a cycle time of the edge clock signal (i.e., 45 degree increments between successive clock edges). This approach may be extended to support virtually any data rate.

It should be noted that numerous changes may be made to the clock recovery circuit 670 of FIG. 25 without departing from the scope of the present invention. For example, in one alternative embodiment, the up/down signal 688 is a two-bit signal in which the '00' state signals a hold condition. The interpolator 687 responds to the hold condition by maintaining the interpolation control word at its present value. In such an embodiment, the majority detector 685 may receive the entire early/late count from the early/late counter, and output the up/down signal in the '00' state if the count value indicates a balanced reception of early and late detections (e.g., the early/late count is zero). Alternatively, the majority detector 685 may be omitted altogether and the sign of the early/late count value output directly to the interpolator 687 to control the phase adjustment of the edge and sampling clock signals 610 and 210.

Returning to FIG. 24, it can be seen that the type-2 and type-3 transitions cross the T+ and T− thresholds, respectfully, in synchronism with the desired transition time of the edge clock signal 610 (i.e., T1). Consequently, the type-2 and type-3 transitions may be detected and used along with, or instead of, the type-1 transitions to recover the edge and sampling clock signals 610 and 210. In one embodiment, additional edge samplers 641 are provided to generate transition samples at the T+ and/or T− thresholds. Additional circuitry is also provided within the clock recovery circuit 670 of FIG. 25 to detect the 11-to-01 and/or 00-to-10 transitions and, in response, to update the early/late counter 683 according to the corresponding transition samples. By this arrangement, the overall number of incoming signal transitions used for clock recovery is increased, thereby relaxing the transition density required in the incoming signal for clock recovery purposes.

Returning to FIG. 23, threshold multiplexers and output path multiplexers similar to multiplexers 507, 509, 511 and 513 of FIG. 18 may be provided to enable the adaptive sampler 543 to proxy for any of the component samplers of the 4-PAM sampler 541. By this operation, component samplers of the 4-PAM sampler 541 may be taken out of service one at a time and calibrated (e.g., offset cancellation calibration), tested or used for other purposes. Also, if the adaptive sampler 543 exhibits improved performance relative to one of the component samplers of the 4-PAM receiver, the adaptive sampler 543 may be substituted for the component sampler during normal operation.

In the embodiment of FIG. 23, the adaptive sampler 543 is clocked by the sampling clock signal 210 and therefore captures samples at the same time as the component samplers of the 4-PAM sampler 541. In an alternative embodiment, the adaptive sampler 543 may be clocked by a selectable-phase clock signal having an independently selectable phase offset. By alternately switching the phase of the selectable-phase clock signal to match the phase of the sampling clock signal 210 and the edge clock signal 610, the adaptive sampler 543 may be used as a proxy sampler for the component samplers of the 4-PAM sampler 541 as well as the edge sampler 641. Also, if one of the edge samplers may be taken out of service (e.g., in a mesochronous or plesiochronous system having a frequency offset estimation (via a second order feedback loop, for example), the edge sampler may be used as a proxy for an adaptive sampler (if provided), data sampler or other sampler within the receiver. Further, while a 4-PAM system is described in reference to FIG. 23, edge samplers may be used for clock recovery purposes in binary signaling systems (or multi-level signaling systems having more than four signal amplitude levels). In such systems, the edge samplers may be used as proxy samplers for adaptive and/or data samplers.

Transmit equalization can cause multi-modal distributions in edge crossings. This in turn causes the conventional clock-data-recovery loop to produce less accurate estimates on the phase of the incoming data stream. In one embodiment, error signals at both data and edge samples are combined to form the update of the equalizer taps, thereby reducing loss of timing accuracy in effect by trading off between timing accuracy and voltage accuracy due to equalizer compensation. The use of data and edge error signals to update equalizer taps are illustrated, for example and without limitation, by the update expression:

$$\underline{W}_{N+1} = \underline{W}_N + \text{stepsize}_{wd} * \text{sign}(e_{dn}) * \text{sign}(\underline{u}_{dn}) + \text{step}_{we} * \text{sign}(e_{en}) * \text{sign}(\underline{u}_{en}),$$

where stepsize$_{wd}$ is a data-weighted update factor and stepsize$_{we}$ is an edge-weighted update factor. The subscript "dn" refers to the n$^{th}$ data sample and the subscript "en" refers to the n$^{th}$ edge sample. As discussed above in reference to FIG. 16, in a single phase tap weight update operation, x'$_n$ may be used in place of u$_{dn}$ and edge samples edge$_n$ (e.g., obtained by filter for edge transitions such as when x$_n$+x$_{n-1}$=0) may be used in place of u$_{en}$. Alternatively, if one of the edge samplers may be taken out of service (e.g., in a mesochronous or plesiochronous system having a frequency offset estimation (e.g., via a second order feedback loop), the edge sampler may be used as a proxy for an adaptive sampler (if provided), data sampler or other sampler within the receiver.

The term including the error from the data samples guides the equalizer updates toward the negative gradient direction of the mean-square-error on data samples, while the term including the error from edge samples guides the equalizer updates toward the negative gradient direction of the mean-square-error on edge samples. Said differently, the term including error in data samples affects the equalizer such that it makes that error smaller, while the term including error in edge samples affects the equalizer such that it makes the error at the edges smaller. In case when there are competing effects between these two errors, the equalizer is able to achieve the balance. This tradeoff may be achieved with different relative magnitude of step sizes (weighting) for data and edge errors.

A convenient aspect of the embodiments of FIGS. 23 (and 26 described below) is that the clock recovery loop already generates the edge error signals and conveniently filters them (i.e. generates them) only on valid transitions (i.e., by detecting early-late signals as discussed above). Hence, little or no additional circuitry in the receiver is needed to generate the edge error signals.

Figure 26:
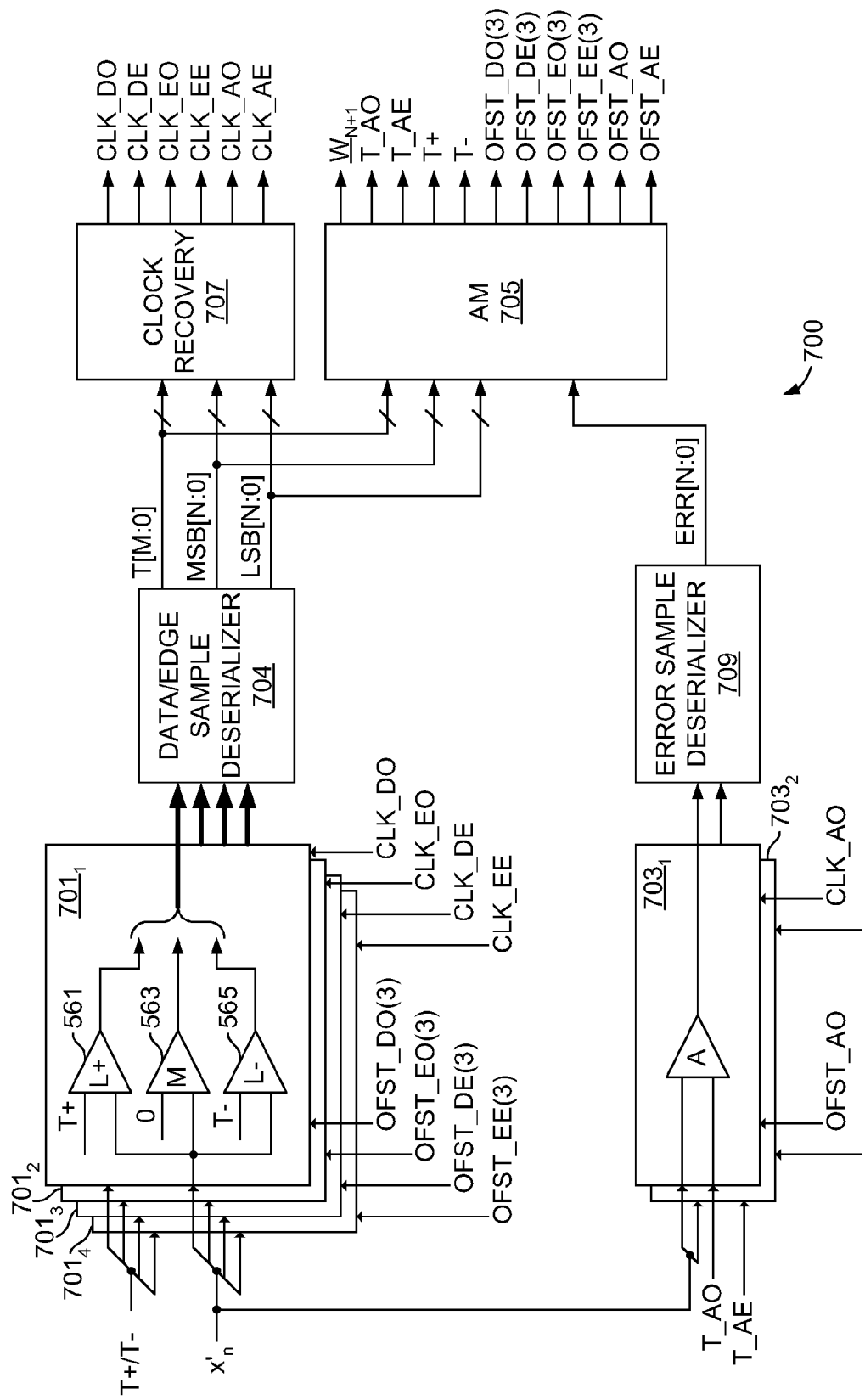
FIG. 26 illustrates a double-data-rate, multi-sample receiver according to an embodiment of the invention.

FIG. 26 illustrates a double-data-rate, multi-sample receiver 700 according to an embodiment of the invention. The receiver 700 includes 4-PAM samplers 701$_1$-701$_4$, data/edge sample deserializer 704, adaptive samplers, 703$_1$ and 703$_2$, error sample deserializer 709, an adaptive module 705 and clock recovery circuit 707. Each of the 4-PAM samplers 701$_1$-701$_4$ operates in generally the same manner as the multi-level sampler 541 of FIG. 19, and includes an MSB sampler 563 to compare an incoming signal, x'$_n$, with a zero threshold, and positive and negative LSB samplers 561 and 565 to compare the incoming signal with adaptively generated thresholds, T+ and T− (e.g., adapted to the normalized +⅔ signal levels). Two of the 4-PAM samplers 701$_1$ and 701$_3$ are used to generate two-bit data samples (i.e., each sample having and MSB and LSB) in response to odd and even sampling clock signals, CLK_DO and CLK_DE, respectively. The remaining two 4-PAM samplers, 701$_2$ and 701$_4$, are used to generate transition samples in response to odd and even edge clock signals (CLK_EO and CLK_EE), with the MSB sampler being used to detect type-1 data signal transitions, and the positive and negative LSB samplers being used to detect type-2 and type-3 data signal transitions, respectively. The data and edge sample values generated by the 4-PAM samplers 701$_1$-701$_4$ are supplied to the data/edge sample deserializer 704, which shifts the incoming serial stream of MSB and LSB samples (after performing LSB+ xor LSB−) and transition samples into respective shift registers. The contents of the shift registers within the data/edge deserializer 704 constitute parallel words of MSBs, LSBs and transition samples (i.e., MSB[N:0], LSB[N:0] and T[M:0], respectively, where M≤N due to the fact that not all transitions are type-1, type-2 or type-3 transitions) that are supplied to the clock recovery circuit 707 and adaptive module 705. The clock recovery circuit 707 operates generally in the manner described in reference to FIGS. 23-25 to generate even and odd edge and data clock signals, CLK_EE, CLK_EO, CLK_DE and CLK_DO (e.g., the even and odd clock signals being complements of one another, and the edge and data clock signals being quadrature-offset from one another). The adaptive module 705 applies the incoming data samples in tap weight update operations to generate power-scaled, updated tap weights W$_{N+1}$ and, when instructed, to perform offset cancellation operations as described in reference to FIG. 22 for the component samplers within each of the 4-PAM samplers 701$_1$-701$_4$. For example, the adaptive module 705 generates three offset cancellation values, OFST_DO(3), for the odd-data 4-PAM sampler 701$_1$ in the manner described in reference to FIG. 22, and similarly generates offset cancellation values OFST_DE(3), OFST_EO and OFST_EE, for the even-data 4-PAM sampler $701_3$, odd-edge 4-PAM sampler $701_2$ and even-edge 4-PAM sampler $701_4$.

In the embodiment of FIG. 26, the adaptive samplers $703_1$ and $703_2$ are clocked by respective odd and even adaptive-sampler clock signals, CLK_AO and CLK_AE, and generate error samples by comparing the incoming signal, $x'_n$, with adaptive sampler thresholds T_AO and T_AE, respectively. In one embodiment, the adaptive module 705 iteratively adjusts each of the adaptive sampler thresholds (i.e., in response to the incoming error samples, ERR[N:0], or a subset thereof) to the normalized +⅓ signal level and uses the adaptive-sampler threshold as discussed above in reference to FIG. 22 to generate the T+ and T− thresholds supplied to the 4-PAM samplers (e.g., doubling the adaptive sampler threshold to generate T+, then complementing T+ to generate T−). The error samples generated by the adaptive samplers $703_1$ and $703_2$ are provided to the error sample deserializer 709 which shifts the odd- and even-phase error samples (i.e., the error samples alternately generated by adaptive samplers $703_1$ and $703_2$) into a shift register for parallel delivery to the adaptive module (i.e., ERR[N:0]).

In one embodiment, the odd and even adaptive-sampler clock signals are generated by respective interpolators within the clock recovery circuit 707, and therefore have independently selectable phase offsets. By this arrangement, clock signal CLK_AO may be selectively phase aligned with either of the odd-phase data and edge clock signals, CLK_DO and CLK_EO, so that adaptive sampler $703_1$ may proxy for any of the component samplers within the odd-phase 4-PAM data sampler $703_1$, and any of the component samplers within the odd-phase 4-PAM edge sampler $703_2$. Similarly, clock signal CLK_AE may be selectively phase aligned with either of the even-phase data and edge clock signals, CLK_DE and CLK_EE, so that adaptive sampler $703_2$ may proxy for any of the component samplers within the even-phase 4-PAM data sampler $703_3$, and any of the component samplers within the even-phase 4-PAM edge sampler $703_4$. In alternative embodiments, each of the adaptive samplers may proxy for any component sampler within any of the 4-PAM samplers. By this arrangement, one of the adaptive samplers 703 may continue to generate the error samples needed to adaptively update the pre-emphasis tap weights, $\underline{W}_{N+1}$, and the thresholds T_AO and T_AE (and, by extension, the T+ and T− thresholds), while the other of the adaptive samplers 703 is used as a proxy sampler for a component sampler of one of the 4-PAM samplers 701. The adaptive module 705 additionally generates an offset cancellation value for each of the adaptive samplers 703 (i.e., OFST_AO and OFST_AE), for example, by nulling the input to the adaptive sampler, zeroing the threshold of the adaptive sampler, and adjusting the offset cancellation value for the adaptive sampler until the error samples generated by the adaptive sampler begin to dither.

Figure 27:
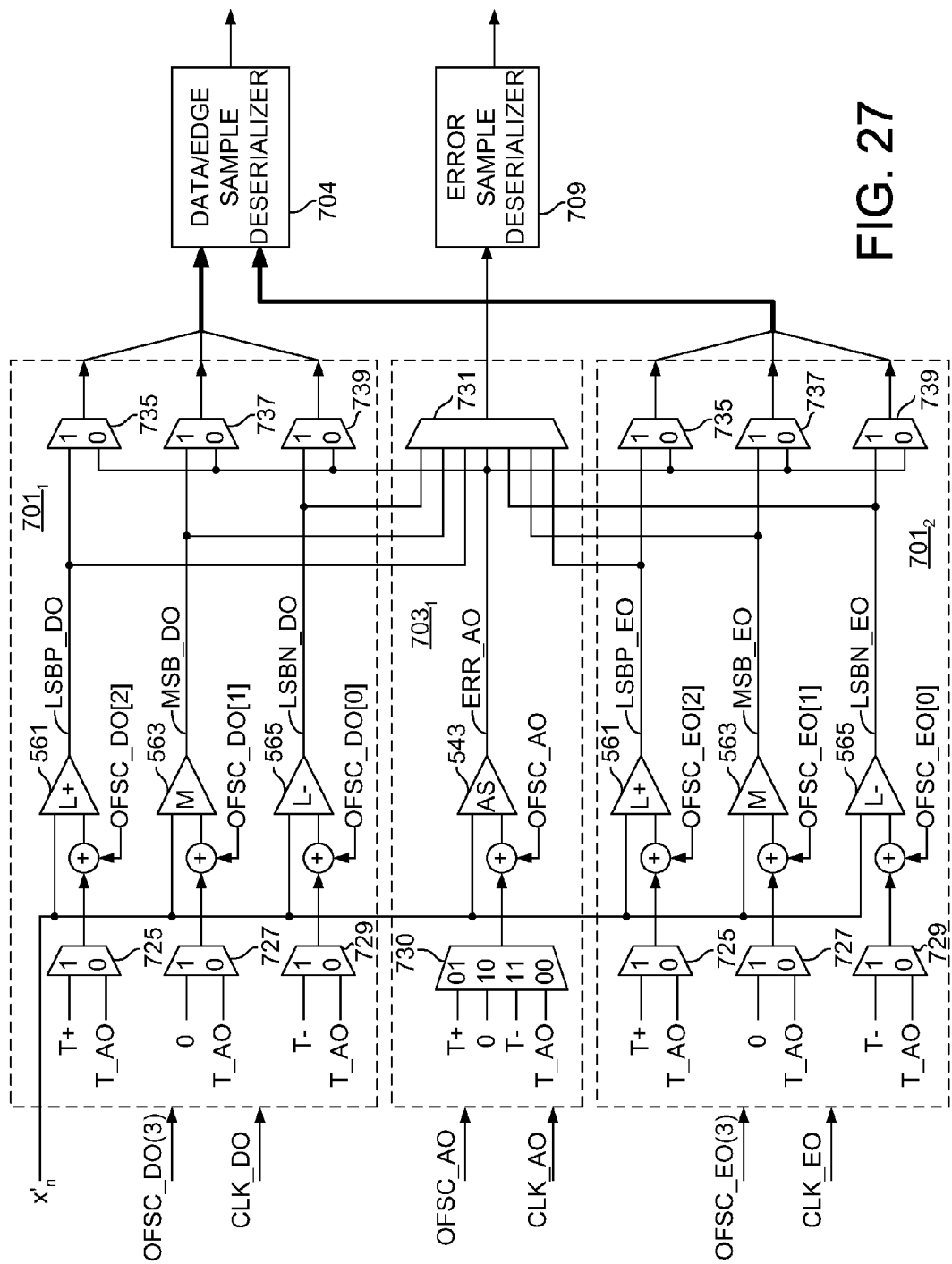
FIG. 27 illustrates a portion of the receiver of FIG. 26 in greater detail.

FIG. 27 illustrates a portion of the receiver 700 of FIG. 26 in greater detail, showing the threshold multiplexers and output path multiplexers that may be used to enable the odd-phase adaptive sampler $703_1$ to be a proxy sampler for any of the component samplers 561, 563 and/or 565 within the 4-PAM data sampler $701_1$ or 4-PAM edge sampler $701_2$. A similar set of threshold multiplexers and output path multiplexers may be coupled to the even-phase adaptive sampler $703_2$ and 4-PAM data and edge samplers $701_3$ and $701_4$.

Referring to 4-PAM sampler $701_1$, threshold multiplexer 725 is provided to select either the T+ threshold or the adaptive sampler threshold, T_AO, to be summed with the offset cancellation OFSC_DO[2] and provided to the positive LSB sampler 561. Similarly, threshold multiplexer 729 is provided to select either the T− threshold or the adaptive sampler threshold, T_AO, to be summed with offset cancellation OFSC_DO[0] and provided to the negative LSB sampler 565, and threshold multiplexer 727 is provided to select either the zero threshold or the adaptive sampler threshold T_AO, to be summed with offset cancellation OFSC_DOW and provided to the MSB sampler 563. Output multiplexers 735, 737 and 739 are provided in the 4-PAM sampler $701_1$ to select either the output of the odd-phase adaptive sampler $703_1$ or the output of the component samplers 561, 563 and 565, respectively, to be provided to the data/edge sample deserializer 704. Threshold multiplexers 725, 727 and 729, and output multiplexers 735, 737 and 739 are provided within the odd-phase edge sampler $701_2$ and coupled to the component samplers thereof in the same way that like-numbered multiplexers are coupled to the component samplers of the odd-phase data sampler $701_1$.

Threshold multiplexer 730 is provided to enable any of the T+, 0, T− and T_AO threshold levels to be summed with offset cancellation OFSC_AO and provided to the adaptive sampler 543 (i.e., sampler 543 being the sampling circuit within the overall sampler $703_1$). Output path multiplexer 731 is provided to select the output of any one of the component samplers of 4-PAM samplers $701_1$ and $701_2$ or the adaptive sampler 543 to be provided to the error sample deserializer 709. By this arrangement, the adaptive sampler 543 may operate as a proxy sampler for any of the component samplers of the odd-phase data and edge samplers $701_1$ and $701_2$, and vice-versa, thereby enabling calibration operations or other out-of-service operations to be performed on the odd-phase data and edge samplers without interrupting the recovered stream of data and edge samples. As discussed in reference to FIG. 18, the threshold and output path multiplexers may be independently controlled to enable a make-before-break transition between a component sampler (i.e., 561, 563 or 565) and the adaptive sampler 543, establishing the alternate source of sample values before taking the component sampler out of service. The even-phase data, edge and adaptive samplers (i.e., $701_3$, $701_4$ and $703_2$, respectively) may include threshold multiplexers and output path multiplexers coupled in the same manner as the threshold multiplexers and output path multiplexers shown for odd samplers in FIG. 27.

Still referring to FIG. 27, the odd-phase adaptive sampler $703_1$ receives the phase-selectable clock signal, CLK_AO, and therefore may generate sample values in phase with either the odd-phase data clock signal, CLK_DO, or the odd-phase edge clock signal, CLK_EO. The even-phase adaptive sampler similarly receives the phase-selectable clock signal, CLK_AE, and therefore may generate sample values in phase with either the even-phase data clock signal, CLK_EO, or the even-phase edge clock signal, CLK_EE.

Dual Mode, Multi-PAM Receiver

In one embodiment, the 4-PAM sampler illustrated in FIG. 19 may be selectively operated in either a 2-PAM mode (i.e., binary signaling) or a 4-PAM mode, according to application needs and/or signaling system characteristics. For example, the 2-PAM mode may be selected upon determining that signaling margins in a given system are insufficient for 4-PAM signal resolution. Also, a signaling system may be dynamically switched between 4-PAM 2-PAM modes as signaling characteristics dictate, or to allow one or more of the component samplers of the 4-PAM sampler to be taken out of service (e.g., for calibration purposes) or to allocate one or more of the component samplers to a different function.

Figure 28:
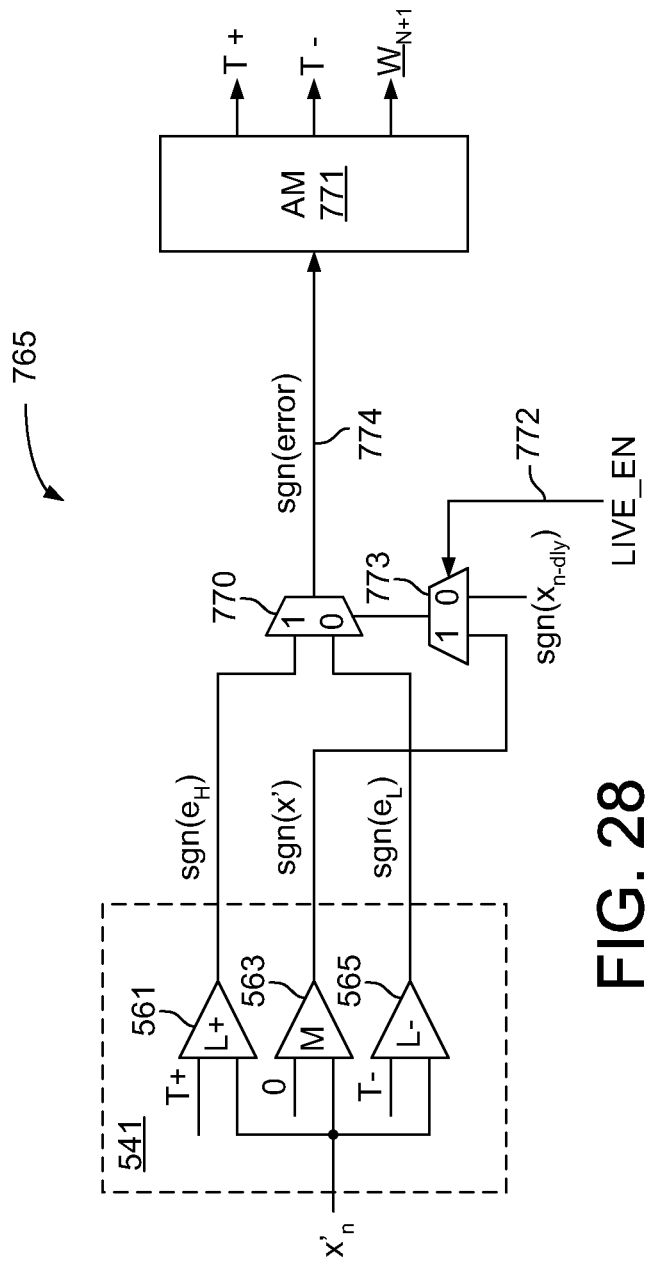
FIG. 28 illustrates a multi-sample, multi-level receiver according to an embodiment of the invention.

FIG. 28 illustrates an embodiment of a multi-sample, multi-level receiver 765 in which the positive and negative LSB samplers 561 and 565 of a 4-PAM sampler 541 are used as adaptive samplers when the 4-PAM sampler 541 is operated in a 2-PAM mode. As in the embodiment of FIG. 19, the incoming signal, $x'_n$ is supplied to all three component samplers of the 4-PAM sampler 541. The positive LSB sampler 561 compares the incoming signal with the T+ threshold and generates a corresponding error sign value, $\text{sgn}(e_H)$, that indicates whether the incoming 2-PAM signal exceeds the T+ threshold. The negative LSB sampler 565 similarly compares the incoming signal with the T− threshold and generates a corresponding error sign value, $\text{sgn}(e_L)$, that indicates whether the incoming signal exceeds the T− threshold. When a live enable signal 772 is in a logic '1' state, a live adaptation mode is selected within the receiver 765. In the live adaptation mode, pre-emphasis tap weights and receiver threshold levels are iteratively updated using error signals generated from live rather than predetermined data sequences). More specifically, the live enable signal 772 is provided to a control input of multiplexer 773 so that, when the live adaptation mode is selected, the multiplexer 773 outputs the MSB sample generated by MSB sampler 563 (i.e., the sign of the incoming 2-PAM signal) to the control input of multiplexer 770. Multiplexer 770, in response, selects either the positive or negative LSB sampler (i.e., 561 or 565) to provide an error sample 774 to an adaptive module 771. Thus, when the incoming 2-PAM signal is positive, the error sign value generated by the positive LSB sampler 561 is selected for use in a tap weight update operation (and T+ threshold update), and when the incoming 2-PAM signal is negative, the error sign value generated by the negative LSB sampler 565 is selected for use in a tap weight update operation (and T− threshold update). Thus, the sign of the 2-PAM sample value generated by the MSB sampler 563 is used to select the appropriate error source in each reception interval, thereby enabling the T+ and T− thresholds to be adapted to the corresponding high and low levels of the 2-PAM signal, and enabling more rapid gathering of error information for use in tap weight updates.

When the live enable signal 772 is deasserted, a batch update mode is selected, and the sign of the originally transmitted data value, $x_n$, is used to select either the positive LSB sampler 561 or negative LSB sampler 565 to provide the error sample 774 to the adaptive module. As discussed above, in batch mode, the sign of the transmitted data value may be known at the receive-side IC device, for example, by sending the data transmission sequence in advance of the batch update operation, or by storing the transmit data pattern in both the transmit- and receive-side devices. In either case, the error sign values generated by the positive and negative LSB samplers 561 and 565 may be applied in the same manner as in the live adaptation mode to adapt the T+ and T− thresholds to the upper and lower binary signal levels, and to update the pre-emphasis tap weights.

Alternative Indicator Functions

In the signaling system embodiments described above, error samples generated by an adaptive sampler within a multi-sample receiver are applied to update transmit pre-emphasis tap weights in repeated sign-sign LMS update operations. Because the adaptive sampler generates errors with respect to an expected data level, logical filtering of data is used to ensure that the incoming signal in fact corresponds to the expected data level. For example, in a binary signaling embodiment in which the adaptive sampler receives a target data level threshold that corresponds to a logic '1' data transmission, the error sample generated by the adaptive sampler is applied in a tap weight update if the corresponding data sample is a logic '1'. Similarly, in a multi-PAM signaling embodiment, the error sample is applied in a tap weight update operation if the corresponding data sample corresponds to the adaptive sampler threshold level (e.g., +⅓ the normalized signal level in the embodiment of FIG. 19). In effect, the logical filtering of incoming data samples constitutes an indicator function that may be expressed as part of the sign-sign LMS operation. For example, indicator functions for the 2-PAM (i.e., binary) and 4-PAM signaling systems described in reference to FIGS. 3 and 19 may be expressed as follows:

$I_{LMS}=(x'_n \geq 0)$, (2-PAM; DLEV adapted to logic '1' signal level);

$I_{LMS}=(T+>x'_n \geq 0)$ (4-PAM; TA adapted to logic '11' signal level).

These indicator functions may be combined with the update expression (3) above, as follows:

$\underline{W}_{N+1}=\underline{W}_N+I_{LMS} \cdot (\text{stepsize}*\text{sign}(e_n)*\text{sign}(\underline{x}'))$ (9).

In alternative embodiments, other indicator functions may be used, and the indicator function may be omitted altogether, for example, by providing one or more additional adaptive samplers having thresholds set at all (or a subset) of the expected incoming data levels.

Figure 30:
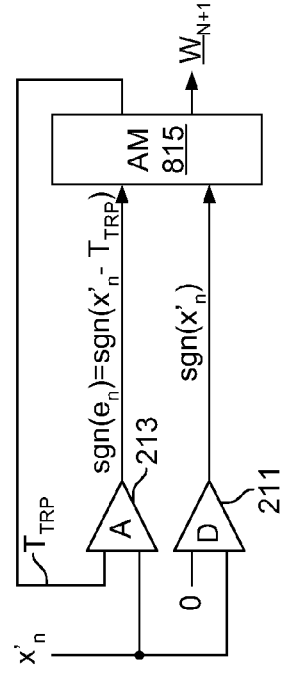
FIG. 30 illustrates a multi-sample receiver that generates a trap threshold according to an embodiment of the invention.
Figure 29:
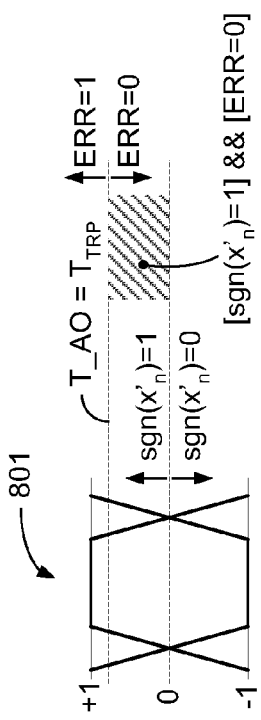
FIG. 29 illustrates an error trap zone and its relationship with an exemplary 2-PAM data waveform.

In another alternative embodiment, a trap indicator function is used to filter errors applied in tap weight update operations (i.e., update-triggering errors) according to the error magnitude and direction. Referring to the normalized 2-PAM data eye 801 illustrated in FIG. 29, update-triggering errors are limited to those errors for which the corresponding sample value is positive (i.e., $\text{sgn}(x'_n)=1$), but falls below the normalized, +1 signal level by more than a threshold amount. That is, the incoming signal level falls within a trap zone defined by the zero threshold and a trap threshold, $T_{TRP}$, and therefore corresponds to a relatively closed data eye. In one embodiment, illustrated in FIG. 30, the trap threshold, $T_{TRP}$, is adaptively generated by an adaptive module 815 according to the rate of errors falling within the trap zone, and is supplied to the adaptive sampler 213 as shown in FIG. 30. Overall, the trap indicator function may be expressed as follows:

$(\text{sgn}(x'_n)=1)$ && $(\text{sgn}(e_n)=0)$ (10), where '&&' denotes a logical AND operation. The error sign value, $\text{sgn}(e_n)$ may be expressed as the sign of the incoming signal less the trap threshold, so that expression 10 becomes:

$(\text{sgn}(x'_n)=1)$ && $(\text{sgn}(x'_n-T_{TRP})=0)$ (11), which corresponds to $T_{TRP}>x'_n \geq 0$ (12).

In one embodiment, the adaptive module 815 adaptively adjusts the trap threshold to obtain a target count of update-triggering errors per unit time, referred to herein as the target error count. The target error count may be a predetermined value that is programmed within the receive-side IC device (or transmit-side IC device) during run-time configuration or during a production-time programming operation (e.g., fuse blowing operation, or storage in a nonvolatile memory), or hardwired within the receive-side IC device (or transmit-side IC device). In one embodiment, the target error count is initially set to a relatively high number so that the adaptive module 815 drives the trap threshold higher (thereby increasing the number of incoming signals that fall within the trap zone) and the trap threshold quickly converges to a stable level. After the trap threshold has converged, the target error count is lowered (e.g., one time or iteratively) so that fewer errors, having more substantial offset from the normalized +1 signal level, are counted as errors. The error samples (i.e., sgn ($x'_n - T_{TRP}$)) are applied within the adaptive module 815 along with data sign values generated by the data sampler 211 in tap weight update operations.

Figure 32:
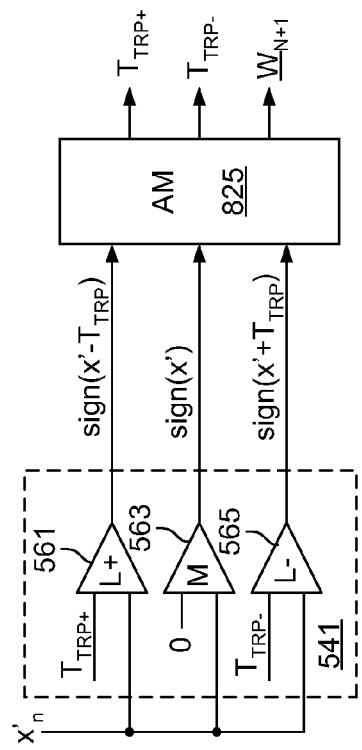
FIG. 32 illustrates a multi-sample, multi-level receiver that generates a trap threshold according to an embodiment of the invention.
Figure 31:
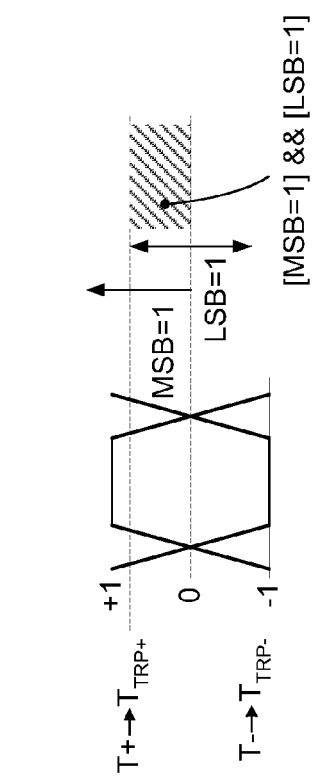
FIG. 31 illustrates an error trap zone and its relationship with an exemplary 4-PAM data waveform.

FIGS. 31 and 32 illustrate implementation of a trap zone in a dual mode 2-PAM/4-PAM signaling system. As discussed above, when operated in 2-PAM mode, the positive and negative LSB samplers 561 and 565 of a 4-PAM sampler 541 may be idled or used for other purposes. In the embodiment of FIG. 31, the T+ threshold is adjusted to a trap level, $T_{TRP+}$, that is offset from the normalized +1 signal level, thereby establishing a trap zone between the 0 and adjusted T+ threshold levels. Referring briefly to FIG. 21, it can be seen that signals falling between the 0 and $T_{TRP}$+ thresholds have a logic '11' sample state so the trap indicator function may be expressed as:

$$(MSB=1) \,\&\&\, (LSB=1) \tag{13}$$

In one embodiment, illustrated in FIG. 32, the $T_{TRP}$+ threshold is iteratively adjusted by an adaptive module 825 according to the rate of errors falling within the trap zone, and is supplied to the positive LSB sampler 561. In an embodiment, where the T− threshold is generated by complementing the sign of the T+ threshold, the T− threshold becomes $T_{TRP-}$, a threshold offset from the normalized −1 signal level in the same manner that $T_{TRP+}$ is offset from the normalized +1 signal level. Thus, when the 4-PAM sampler 541 is operated in 2-PAM mode, the otherwise unused positive and negative LSB samplers 561 and 563 may be used to detect signals falling within a trap zone, thereby enabling the transmit preemphasis tap weights to be updated based on errors that exceed a predetermined, or adaptively generated threshold.

Various aspects and features of embodiments disclosed herein are set forth, for example and without limitation, in the following numbered clauses:

1. A method of operation within a signaling system, the method comprising:
    sampling a first signal in a first sampling circuit to determine whether the first signal exceeds a first threshold;
    sampling the first signal in a second sampling circuit to determine whether the first signal exceeds a second threshold;
    adjusting a drive strength of at least one output driver circuit used to generate the first signal based, at least in part, on whether the first signal exceeds the first and second thresholds; and
    adjusting the second threshold based, at least in part, on whether the first signal exceeds the second threshold.
2. The method of clause 1 wherein adjusting a drive strength of at least one output driver circuit used to generate the first signal based, at least in part, on whether the first signal exceeds the first and second thresholds comprises increasing a drive strength of the at least one output driver circuit if the first signal exceeds both the first and second thresholds.
3. The method of clause 2 further comprising decreasing the drive strength of the at least one output driver circuit if the first signal exceeds only one of the first and second thresholds.
4. The method of clause 3 further comprising increasing the drive strength of the at least one output driver if the first signal exceeds neither of the first and second thresholds.
5. The method of clause 1 wherein sampling a first signal in a first sampling circuit to determine whether the first signal exceeds a first threshold comprises comparing the first signal with a threshold that is substantially centered between upper and lower steady-state signal levels.
6. The method of clause 1 wherein the first signal is a differential signal having first and second component signals, and wherein determining whether the first signal exceeds a first threshold comprises determining whether the first component signal of the differential signal exceeds a common mode of the first and second component signals.
7. The method of clause 1 wherein the at least one output driver comprises a plurality of drive transistors coupled in parallel, each of the drive transistors being enabled by a respective control line, and wherein adjusting the drive strength of the at least one output driver circuit comprises activating the control line coupled to one of the drive transistors.
8. The method of clause 1 wherein adjusting the second threshold comprises increasing the second threshold if more than a predetermined portion of N signal samples exceed the second threshold, the N signal samples including the sampling of the first signal in the second sampling circuit.
9. The method of clause 1 further comprising:
    sampling the first signal in a third sampling circuit to determine whether the first signal exceeds a third threshold;
    sampling the first signal in a fourth sampling circuit to determine whether the first signal exceeds a fourth threshold; and
    generating a two-bit digital value according to whether the first signal exceeds the first threshold, third threshold and fourth threshold.
10. The method of clause 9 wherein generating the two-bit value comprises:
    generating a most significant bit of the two-bit value in either a first state or a second state according to whether the first signal exceeds the first threshold; and
    generating a least significant bit of the two-bit value in either a first state or a second state according to whether the first signal exceeds the third and fourth thresholds.
11. The method of clause 10 wherein generating a least significant bit in either a first state or second state according to whether the first signal exceeds the third and fourth thresholds comprises:
    generating the least significant bit in the first state if the first signal exceeds both the third and fourth thresholds;
    generating the least significant bit in the first state if the first signal exceeds neither of the third and fourth thresholds; and
    generating the least significant bit in the second state if the first signal exceeds only one of the third and fourth thresholds.
12. A method of operation within a signaling system, the method comprising:
    outputting a first signal from a transmit circuit having a plurality of output drivers;
    determining whether the first signal exceeds a threshold level;
    adjusting the threshold level according to whether the first signal exceeds the threshold level; and
    adjusting a drive strength of at least one output driver of the plurality of output drivers according to whether the first signal exceeds the threshold level.
13. The method of clause 12 wherein outputting a first signal from the transmit circuit comprises outputting a plurality of component signals from the plurality of output drivers, respectively, the plurality of component signals each contributing to the first signal.
14. The method of clause 13 wherein outputting a plurality of component signals from the plurality of output drivers comprises sinking a plurality of currents within the plurality of output drivers to generate a voltage level on a first signal line.

15. The method of clause 14 wherein sinking a plurality of currents within the plurality of output drivers to generate a voltage level on the first signal line comprises drawing a total current from the first signal line that is a sum of the plurality of currents, the first signal line being coupled to a reference voltage via a termination impedance such that the voltage level generated on the first signal line is a function of the total current, the termination impedance and the reference voltage.

16. The method of clause 15 wherein the first signal line has a first end and a second end, and wherein the first signal line is coupled to the reference voltage at the first end.

17. The method of clause 16 wherein the first signal line is additionally coupled to the reference voltage at the second end.

18. The method of clause 12 wherein outputting a first signal from a transmit circuit comprises outputting the first signal onto a signal path, and wherein determining whether the first signal exceeds a threshold level comprises sampling the first signal within a sampling circuit coupled to the signal path.

19. The method of clause 18 wherein sampling the first signal within a sampling circuit comprises generating a sample value having either a first state or a second state according to whether the first signal exceeds the threshold level.

20. The method of clause 19 wherein generating a sample value having either a first state or a second state comprises:
comparing the first signal with the threshold level;
generating the sample value in the first state if the first signal exceeds the threshold level; and
generating the sample value in the second state if the threshold level exceeds the first signal.

21. The method of clause 19 wherein adjusting the threshold level comprises:
increasing the threshold level if the first signal exceeds the threshold level; and
decreasing the threshold level if the threshold level exceeds the first signal.

22. The method of clause 18 wherein the first signal is a differential signal having first and second component signals, and wherein outputting the first signal onto the signal path comprises outputting the first component signal onto a first signal line of the signal path and outputting the second component signal onto a second signal line of the signal path.

23. The method of clause 22 wherein sampling the first signal comprises generating a sample value having either a first state or a second state according to whether the first component signal exceeds the second component signal by more than the threshold level.

24. The method of clause 23 wherein generating a sample value having either a first state or a second state according to whether the first component signal exceeds the second component signal by more than the threshold level comprises biasing a differential amplifier within the sampling circuit such that output nodes of the differential amplifier are driven to substantially the same voltage levels when the first component signal exceeds the second component signal by the threshold level.

25. The method of clause 23 wherein adjusting the threshold level comprises:
increasing the threshold level if the first component signal exceeds the second component signal by more than the threshold level; and
decreasing the threshold level if the first component signal does not exceed the second component signal by more than the threshold level.

26. The method of clause 12 wherein adjusting a drive strength of at least one output driver comprises updating a plurality of drive strength values that respectively control drive strengths of the plurality of output drivers.

27. The method of clause 26 wherein updating a plurality of drive strength values comprises incrementing a first drive strength value of the plurality of drive strength values to increase the drive strength of the at least one output driver.

28. The method of clause 27 wherein updating the plurality of drive strength values comprises decrementing a second drive strength value of the plurality of drive strength values to decrease the drive strength of a corresponding one of the plurality of output drivers.

29. The method of clause 27 further comprising adjusting one or more others of the drive strength values to maintain a sum of the drive strength values within a predetermined maximum value.

30. The method of clause 28 further comprising scaling the drive strength values according to a scaling factor to maintain a sum of the drive strength values within a predetermined maximum value.

31. A method of operation within an integrated circuit device, the method comprising:
generating a first plurality of drive strength values to control signal levels generated by a plurality of output drivers included within a transmit circuit, the first plurality of drive strength values representing a first level of power consumption in the transmit circuit,
incrementally adjusting one or more drive strength values of the first plurality of drive strength values to generate a second plurality of drive strength values, the second plurality of drive strength values representing a second level of power consumption in the transmit circuit; and
scaling the second plurality of drive strength values by a ratio of the first level of power consumption to the second level of power consumption.

32. The method of clause 31 wherein scaling the drive strength values according to a ratio of the first level of power consumption to the second level of power consumption comprises:
generating a residue value that corresponds to a difference between the first level of power consumption and the second level of power consumption;
generating a plurality of adjustment values by multiplying each of the second plurality of drive strength values by an approximate ratio of the residue value to the first level of power consumption; and
subtracting the plurality of adjustment values from the second plurality of drive strength values, respectively.

33. The method of clause 32 wherein the first level of power consumption represents a maximum power to be consumed by the plurality of output drivers.

34. The method of clause 33 wherein the maximum power is a peak power to be consumed by the plurality of output drivers.

35. The method of clause 33 wherein the maximum power is an average power to be consumed by the plurality of output drivers.

36. The method of clause 32 wherein multiplying each of the second plurality of drive strength values by an approximate ratio of the residue value to the first level of power consumption comprises right shifting each of the second plurality of drive strength values by a number of bits indicated by the residue value.

37. A method of operation within an integrated circuit device, the method comprising:
incrementally adjusting a plurality of drive strength values used to control signal levels generated by a corresponding plurality of output drivers included within a transmit circuit, the adjusted plurality of drive strength values representing a first level of power consumption in the transmit circuit;
determining whether the first level of power consumption exceeds a maximum level of power consumption in the transmit circuit; and
reducing a predetermined one of the plurality of drive strength values if the first level of power consumption exceeds the maximum level of power consumption.

38. The method of clause 37 wherein incrementally adjusting the plurality of drive strength values comprises adjusting a subset of the plurality of drive strength values that excludes the predetermined one of the plurality of drive strength values.

39. The method of clause 38 wherein the subset of the plurality of drive strength values are provided to a subset of the plurality of output drivers used to mitigate inter-symbol interference resulting from transmission of a signal by a primary output driver of the plurality of output drivers.

40. The method of clause 39 wherein the predetermine one of the plurality of drive strength values is provided to the primary output driver.

41. The method of clause 37 further comprising:
determining whether the first level of power consumption is below a minimum level of power consumption in the transmit circuit; and
increasing the predetermined one of the plurality of drive strength values if the first level of power consumption is below the minimum level of power consumption.

42. The method of clause 37 wherein the maximum level of power consumption is a programmed value.

43. The method of clause 37 wherein the maximum level of power consumption corresponds to a peak power constraint of the transmit circuit.

44. The method of clause 37 wherein the maximum level of power consumption corresponds to an average power constraint of the transmit circuit.

45. A method of operation within a signaling system, the method comprising:
sampling a first signal in a first sampling circuit to determine whether the first signal exceeds a first threshold;
sampling the first signal in a second sampling circuit to determine whether the first signal falls below a second threshold; and
adjusting a drive strength of at least one output driver circuit used to generate the first signal based, at least in part, on whether the first signal falls between the first and second thresholds.

46. The method of clause 45 method further comprising adjusting the second threshold based, at least in part, on a difference between the first signal and the second threshold.

47. The method of clause 46 further comprising:
sampling a plurality of additional signals over a first time interval;
determining whether the additional signals fall between the first and second thresholds; and
adjusting the second threshold in a first direction if a predetermined number of the additional signals fall between the first and second thresholds.

48. The method of clause 47 wherein adjusting the second threshold in a first direction comprises decreasing the second threshold.

49. The method of clause 47 further comprising adjusting the second threshold in a second direction if the predetermined number of the additional signals do not fall between the first and second thresholds.

50. The method of clause 47 wherein the first signal is a differential signal and wherein sampling the first signal in a first sampling circuit to determine whether the first signal exceeds a first threshold comprises sampling the first signal in a first differential sampling circuit to determine whether a first component signal of the differential signal exceeds a second component signal of the differential signal.

51. The method of clause 50 wherein sampling the first signal in a second sampling circuit to determine whether the first signal falls below a second threshold comprises sampling the first signal in a second differential sampling circuit to determine whether a difference between the first component signal and the second component signal is less than the second threshold.

52. A signal receiving apparatus comprising:
a first sampling circuit to determine whether a first signal exceeds a first threshold;
a second sampling circuit to determine whether the first signal exceeds a second threshold;
first update circuitry coupled to the first and second sampling circuits and configured to adjust a drive strength value based, at least in part, on whether the first signal exceeds the first and second thresholds, the drive strength value corresponding to a first output driver circuit used to generate the first signal; and
second update circuitry coupled to the second sampling circuit and configured to adjust the second threshold based, at least in part, on whether the first signal exceeds the second threshold.

53. The signal receiving apparatus of clause 52 wherein the first update circuitry is configured to increase the drive strength value if the first signal exceeds both the first and second thresholds.

54. The signal receiving apparatus of clause 53 wherein the first update circuitry is further configured to decrease the drive strength value if the first signal exceeds only one of the first and second thresholds.

55. The signal receiving apparatus of clause 54 wherein the first update circuitry is further configured to increase the drive strength value if the first signal exceeds neither of the first and second thresholds.

56. The signal receiving apparatus of clause 52 wherein the first sampling circuit includes a comparator circuit to compare the first signal with a threshold that is substantially centered between upper and lower steady-state signal levels.

57. The signal receiving apparatus of clause 52 wherein the first signal is a differential signal having first and second component signals, and wherein the first sampling circuit is configured to determine whether the first component signal of the differential signal exceeds a common mode of the first and second component signals.

58. The signal receiving apparatus of clause 52 wherein the first signal is a differential signal having first and second component signals, and wherein the first sampling circuit is configured to determine whether the first signal exceeds a first threshold by determining whether the first component signal exceeds the second component signal by an amount greater than the first threshold.

59. The signal receiving apparatus of clause 52 wherein the second sampling circuit is configured to generate a plurality of samples of the first signal, and wherein the second update circuitry is configured to increase the second threshold if more than a predetermined portion of the plurality of samples of the first signal exceed the second threshold.

60. The signal receiving apparatus of clause 52 further comprising:
   a third sampling circuit to determine whether the first signal exceeds a third threshold;
   a fourth sampling circuit to determine whether the first signal exceeds a fourth threshold; and
   logic circuitry coupled to the first, third and fourth sampling circuits and configured to generate a two-bit digital value according to whether the first signal exceeds the first threshold, third threshold and fourth threshold.

61. The signal receiving apparatus of clause 60 wherein the logic circuitry to generate the two-bit digital value is configured to generate a least significant bit of the two-bit value in either a first state or a second state according to whether the first signal exceeds the third and fourth thresholds.

62. The signal receiving apparatus of clause 61 wherein the logic circuitry to generate the two-bit digital value is configured to generate the least significant bit in the first state if the first signal is determined to exceed both the third and fourth thresholds.

63. The signal receiving apparatus of clause 62 wherein the logic circuitry to generate the two-bit digital value is further configured to generate the least significant bit in the first state if the first signal is determined to exceed neither of the third and fourth thresholds.

64. The signal receiving apparatus of clause 62 wherein the logic circuitry to generate the two-bit digital value is further configured to generate the least significant bit in the second state if the first signal is determined to exceed only one of the third and fourth thresholds.

65. An apparatus comprising:
   an update circuit to generate a first plurality of drive strength values to control signal levels generated by a plurality of output drivers, the first plurality of drive strength values representing a first level of power consumption in the plurality of output drivers, the update circuit being configured to incrementally adjust one or more drive strength values of the first plurality of drive strength values to generate a second plurality of drive strength values that represent a second level of power consumption in the plurality of output drivers; and
   a scaling circuit coupled to receive the second plurality of drive strength values from the update circuit and configured to scale the second plurality of drive strength values by a ratio of the first level of power consumption to the second level of power consumption.

66. The apparatus of clause 65 wherein the scaling circuit is configured to generate a residue value that corresponds to a difference between the first level of power consumption and second level of power consumption.

67. The apparatus of clause 66 wherein the scaling circuit is further configured to generate a plurality of adjustment values by multiplying each of the second plurality of drive strength values by an approximate ratio of the residue value to the first level of power consumption.

68. The apparatus of clause 67 wherein the scaling circuit is further configured to subtract the plurality of adjustment values from the second plurality of drive strength values, respectively.

69. The apparatus of clause 67 wherein the scaling circuit comprises a shift circuit to right-shift each of the second plurality of drive strength values by a number of bits indicated by the residue value.

70. The apparatus of clause 65 wherein the first level of power consumption represents a maximum power to be consumed by the plurality of output drivers.

71. The apparatus of clause 70 wherein the maximum power is a peak power to be consumed by the plurality of output drivers.

72. The apparatus of clause 71 wherein the maximum power is an average power to be consumed by the plurality of output drivers.

73. An apparatus comprising:
   an update circuit to incrementally adjust a plurality of drive strength values that control signal levels generated by a plurality of output drivers, the first plurality of drive strength values representing a first level of power consumption in the plurality of output drivers; and
   a scaling circuit coupled to receive the incrementally adjusted plurality of drive strength values and configured to reduce a predetermined one of the plurality of drive strength values if the first level of power consumption exceeds a maximum level of power consumption for the plurality of output drivers.

74. The apparatus of clause 73 wherein the an update circuit is configured to incrementally adjust a subset of the plurality of drive strength values that excludes the predetermined one of the plurality of drive strength values.

75. The apparatus of clause 74 wherein the scaling circuit is further configured to increase the predetermined one of the plurality of drive strength values if the first level of power consumption is below a minimum level of power consumption for the plurality of output drivers.

76. The apparatus of clause 73 further comprising a programmable configuration circuit to store the maximum level of power consumption.

77. The apparatus of clause 73 wherein the maximum level of power consumption represents a maximum peak power to be consumed by the plurality of output drivers.

78. The apparatus of clause 73 wherein the maximum level of power consumption represents a maximum average power to be consumed by the plurality of output drivers.

79. A signaling system comprising:
   a signal path;
   a transmit circuit including a plurality of output drivers coupled to output a first signal onto the signal path;
   a first sampling circuit coupled to receive the first signal from the signal path and configured to generate a first sample value that indicates whether the first signal exceeds a first threshold;
   a second sampling circuit coupled to receive the first signal from the signal path and configured to generate a second sample value that indicates whether the first signal falls below a second threshold; and
   a control circuit coupled to receive the first and second sample values and configured to adjust a drive strength of at least one of the plurality of output drivers base, at least in part, on whether the first and second sample values indicate that the first signal falls between the first and second thresholds.

80. The signaling system of clause 79 wherein the control circuit is further configured to adjust the second threshold based, at least in part, on a difference between the first signal and the second threshold.

81. A signaling system comprising:
    means for sampling a first signal to determine whether the first signal exceeds a first threshold;
    means for sampling the first signal to determine whether the first signal falls below a second threshold; and
    means for adjusting a drive strength of at least one output driver circuit used to generate the first signal based, at least in part, on whether the first signal falls between the first and second thresholds.
82. The system of clause 81 further comprising means for 88 adjusting the second threshold based, at least in part, on a difference between the first signal and the second threshold.

Section headings have been provided in this detailed description for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. An integrated circuit, comprising:
   a transmitter to transmit bits of a digital sequence onto a conductive path external to the integrated circuit to a receiver, using a signal level that is a logical function of binary state of a current bit to be transmitted and binary state of another bit of the digital sequence, the transmitter characterized by a peak power constraint;
   circuitry to receive a request from the receiver to change a tap weight used to generate the signal level, and to change the tap weight responsive to the request; and
   circuitry to set the tap weight in a manner responsive to the request so as to maintain operation of the transmitter within the peak power constraint.

2. The integrated circuit of claim 1, where:
   the tap weight is a first tap weight of multiple tap weights, the signal level generated as a function of the multiple tap weights.

3. The integrated circuit of claim 2, where:
   the transmitter is characterized by a predefined range associated with the peak power constraint; and
   the circuitry to set the multiple tap weights is operable to maintain overall transmit power level within the predefined range notwithstanding change of the first tap weight.

4. The integrated circuit of claim 1, where:
   the other bit of the digital sequence is a post-tap bit that is to be transmitted to the receiver prior to the current bit of the digital sequence; and
   the transmitter comprises multiple drivers that contribute to the signal level including a first driver to be driven in dependence on the post-tap bit, and a second driver to be driven in dependence on the current bit.

5. The integrated circuit of claim 4, where:
   the other bit of the digital sequence is a first other bit of the digital sequence;
   the logical function is also dependent on a second other bit of the digital sequence that is a pre-tap bit that is to be transmitted to the receiver after the current bit of the digital sequence; and
   the multiple drivers further include a third driver driven in dependence on the pre-tap bit, such that the signal level is also dependent on binary state of the pre-tap bit.

6. The integrated circuit of claim 5, where:
   the post-tap bit is a first post-tap bit;
   the logical function is also dependent on a third other bit of the digital sequence that is a second post-tap bit that is to be transmitted to the receiver before the current bit of the digital sequence; and
   the multiple drivers further include a fourth driver driven in dependence on the second post-tap bit, such that the signal level is also dependent on binary state of the second post-tap bit and is dependent on at least four different bits of the digital sequence.

7. The integrated circuit of claim 5, where:
   the tap weight is a first tap weight used to weight dependence of the signal level on binary state of the pre-tap bit;
   the integrated circuit further comprises at least one register to store a first digital setting that defines the first tap weight;
   a second tap weight is used to weight contribution of the current bit to the transmission;
   a third tap weight is used to weight contribution of the post-tap data value to the transmission;
   the at least one register is also to store a second digital setting and a third digital setting that respectively define the second tap weight and the third tap weight; and
   each of the first, second and third digital settings is represented by multiple bits, including multiple bits representing tap weight magnitude and, for at least the first tap weight and third tap weight, a sign bit indicating whether a corresponding one of the first tap weight and the third tap weight is positive or negative.

8. The integrated circuit of claim 7, where the at least one register is capable of storing respective values for the first, second and third digital settings corresponding to zero power, full power, and zero power, respectively.

9. The integrated circuit of claim 1, where the pre-tap bit immediately follows the current bit and the post-tap bit immediately precedes the current bit in the digital sequence, such that each of the post-tap bit, the current bit and the pre-tap bit are three consecutive bits in the digital sequence.

10. The integrated circuit of claim 4, where:
    the transmitter is operable to weight contribution of the post-tap bit to the signal level; and
    the integrated circuit comprises at least one register to store a digital setting that defines the tap weight.

11. The integrated circuit of claim 10, where:
    the tap weight is a first tap weight;
    the digital setting is a first digital setting;
    the post-tap bit is a first post-tap bit of the digital sequence;
    a second tap weight is used to weight contribution of a second post-tap bit to the signal level;
    the at least one register is to store a second digital setting that defines the second tap weight; and
    each of the first and second digital settings is represented by multiple bits, including a sign bit and multiple bits representing tap weight magnitude.

12. The integrated circuit of claim 1, where:
    at least one of the first and second digital settings is represented by at least four bits representing at least sixteen steps in tap weight magnitude.

13. The integrated circuit of claim 1, where:
    the transmitter comprises a driver for each of the current bit and the other bit, and circuitry to wire-sum outputs of the respective drivers to generate the signal level;
    the conductive path comprises a differential signal path; and
    the transmitter comprises a differential transmitter.

14. The integrated circuit of claim 1, where the circuitry is to receive the request from the receiver via a back channel.

15. The integrated circuit of claim 1, where the request specifies at least one of an update to a previous value for the tap weight or a complete value for the tap weight.

16. The integrated circuit of claim 1, where:
the tap weight is a first tap weight of a set of multiple tap weights, the signal level generated as a function of the set of multiple tap weights;
the request represents a request to change the set of multiple tap weights; and
the circuitry to receive the request from the receiver is to change the set of multiple tap weights responsive to the request.

17. The integrated circuit of claim 1, where:
the transmitter is operable to transmit a predetermined pattern to the receiver; and
the circuitry is to receive the request responsive to transmission of the predetermined pattern.

18. An integrated circuit, comprising:
a transmitter to transmit bits of a digital sequence as a series of signal levels to a receiver via a conductive path external to the integrated circuit, the transmitter having multiple drivers driven in response to respective bits of the digital sequence to generate each signal level of the series, the transmitter characterized by a peak power constraint; and
circuitry to receive a request from the receiver to change a tap weight setting for at least one driver of the multiple drivers to a specific value, where the request is sufficient to specify at least one of an update amount or a complete value for the tap weight setting, and to change the tap weight setting responsive to the request in a manner that does not exceed the peak power constraint.

19. The integrated circuit of claim 18, where:
the other bit of the digital sequence is a post-tap bit that is to be transmitted to the receiver prior to the current bit of the digital sequence;
the first driver is to be driven in dependence on the post-tap bit; and
the second driver is to be driven in dependence on the current bit.

20. The integrated circuit of claim 19, where:
the other bit of the digital sequence is a first other bit of the digital sequence;
the multiple drivers further include a third driver driven in dependence on a second other bit of the digital sequence, the second other bit being a pre-tap bit that is to be transmitted to the receiver after the current bit of the digital sequence.

21. The integrated circuit of claim 20, where:
the post-tap bit is a first post-tap bit;
the multiple drivers further include a fourth driver driven in dependence on a third other bit of the digital sequence, the third other bit being a second post-tap bit that is to be transmitted to the receiver before the current bit of the digital sequence;
the integrated circuit further comprises at least one register to store first, second, third and fourth digital settings that respectively define drive strength settings associated with each of the first, second, third and fourth drivers; and
the tap weight setting corresponds to at least one of the first, third or fourth digital settings.

22. The integrated circuit of claim 21, where:
at least one of the first, second, third and fourth digital settings is represented by at least four bits that define drive strength magnitude.

23. An integrated circuit for use in a signaling system having a signal path coupling the integrated circuit to a receiver external to the integrated circuit, the integrated circuit comprising:
a transmitter to transmit bits of a digital sequence onto the signal path to the receiver using a signal level dependent on a logical function of binary state of a current bit to be transmitted and binary state of another bit of the respective digital sequence, and respective first and second tap weight settings, the transmitter characterized by a peak power constraint;
at least one register to store the first and second tap weight settings;
circuitry to receive a request from the receiver to change at least one of the first tap weight setting and the second tap weight setting, and to responsively change the at least one of the first tap weight setting and the second tap weight setting in the at least one register, so as to change dependence of the signal level on each of the binary state of the current bit and the binary state of the other bit and so as to maintain operation of the transmitter within the peak power constraint.

24. The integrated circuit of claim 23, where:
the transmitter further comprises multiple drivers, including a first driver corresponding to the first tap weight setting and a second driver corresponding to the second tap weight setting;
the request represents a request to change the set of multiple tap weights stored in the at least one register; and
the circuitry to receive the request from the receiver is operable to change plural tap weights responsive to the request.

25. The integrated circuit of claim 23, where:
the other bit of the digital sequence is a first other bit of the digital sequence;
the signal level is also dependent on a logical function of the binary state of the current bit, the binary state of the first other bit, and a binary state of a second other bit of the digital sequence, the first and second tap weight settings and a third tap weight setting corresponding to the second other bit;
the first other bit is post-tap bit that is to be transmitted to the receiver prior to the current bit, and the second other bit is a pre-tap bit that is to be transmitted to the receiver after the current bit; and
the pre-tap bit, the current bit and the post-tap bit represent three consecutive bits of the digital sequence.

* * * * *